United States Patent
Girgel et al.

(10) Patent No.: US 12,372,778 B2
(45) Date of Patent: Jul. 29, 2025

(54) ACTUATORS AND COUPLERS FOR SCANNING MIRRORS

(71) Applicant: Innoviz Technologies Ltd., Rosh Ha'Ayin (IL)

(72) Inventors: Michael Girgel, Kiryat Motzkin (IL); Sergey Dubrovskiy, Kiryat Motzkin (IL)

(73) Assignee: Innoviz Technologies Ltd., Rosh Ha'Ayin (IL)

( * ) Notice: Subject to any disclaimer, the term of this patent is extended or adjusted under 35 U.S.C. 154(b) by 694 days.

(21) Appl. No.: 17/587,726

(22) Filed: Jan. 28, 2022

(65) Prior Publication Data

US 2022/0244525 A1 Aug. 4, 2022

Related U.S. Application Data

(60) Provisional application No. 63/144,562, filed on Feb. 2, 2021, provisional application No. 63/144,556, filed on Feb. 2, 2021.

(51) Int. Cl.
  *G02B 26/08* (2006.01)
  *G01S 7/481* (2006.01)
(52) U.S. Cl.
  CPC ........ *G02B 26/0833* (2013.01); *G01S 7/4817* (2013.01)

(58) Field of Classification Search
  CPC ............ G02B 26/0833; G02B 26/0858; G02B 26/101; G01S 7/4817; G01S 17/931
  See application file for complete search history.

(56) References Cited

U.S. PATENT DOCUMENTS

| | | |
|---|---|---|
| 2018/0081037 A1 | 3/2018 | Medina et al. |
| 2018/0081038 A1 | 3/2018 | Medina et al. |
| 2018/0100928 A1 | 4/2018 | Keilaf et al. |
| 2018/0113216 A1 | 4/2018 | Kremer et al. |
| 2020/0310110 A1* | 10/2020 | Carminati .......... G02B 26/0858 |

\* cited by examiner

*Primary Examiner* — Euncha P Cherry
(74) *Attorney, Agent, or Firm* — Meitar Patents Ltd.; Daniel Kligler

(57) ABSTRACT

A deflector unit for a light scanning system includes a mirror and at least one actuator arm. The actuator arm may include an anchor end and a coupler end. The at least one actuator arm may include an anchor end, a coupler end, and an actuator axis that extends from a first midpoint to a second midpoint, the first midpoint being a midpoint of an edge of the at least one actuator arm at the coupler end and the second midpoint being a midpoint of an edge of the at least one actuator arm at the anchor end, the mirror being coupled to the coupler end of the at least one actuator arm, wherein the mirror is configured to tilt about at least one tilting axis in response to a movement of the at least one actuator arm, and wherein a shortest distance of the mirror from the first midpoint is less than a shortest distance of the mirror from the second midpoint.

21 Claims, 40 Drawing Sheets

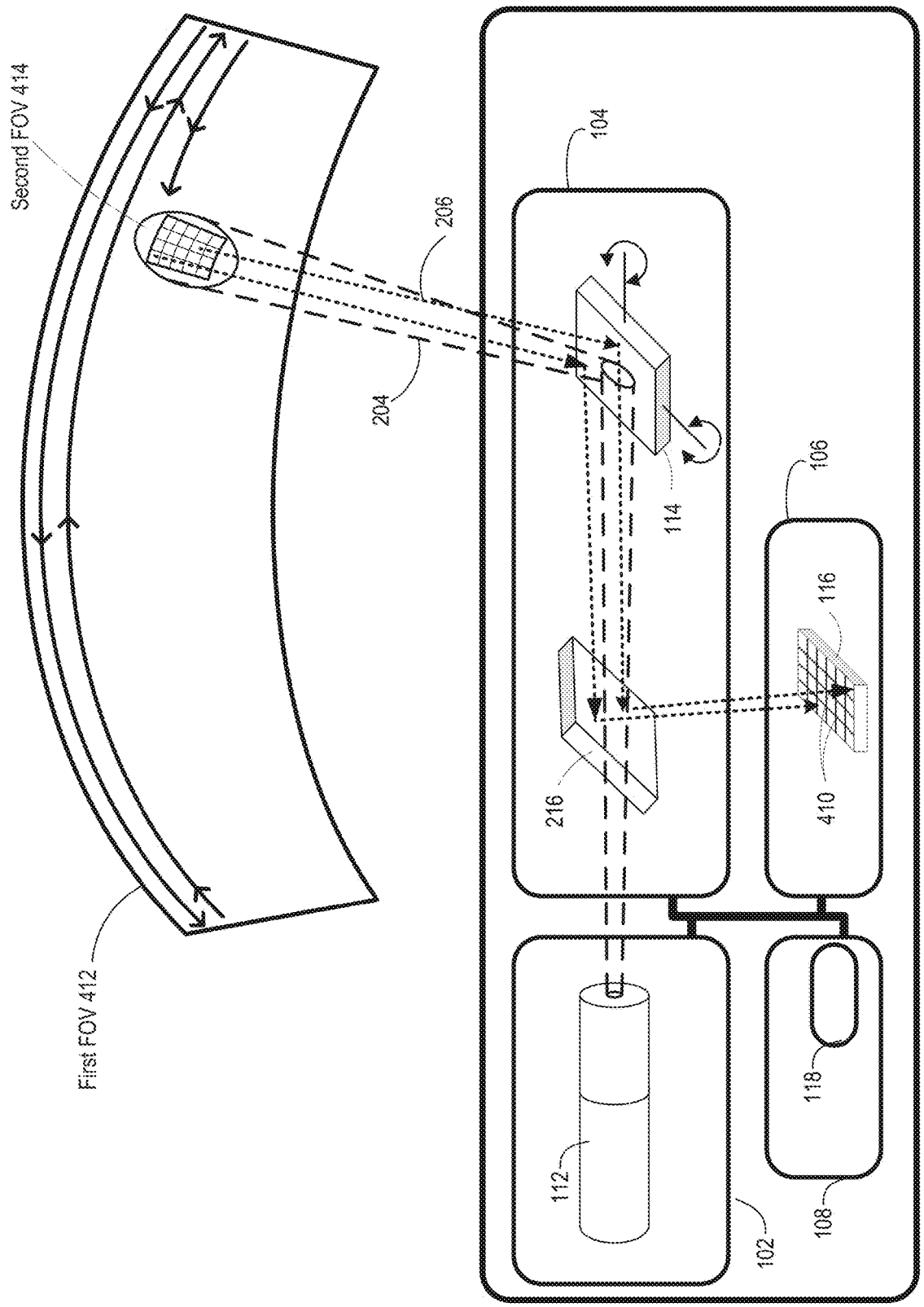

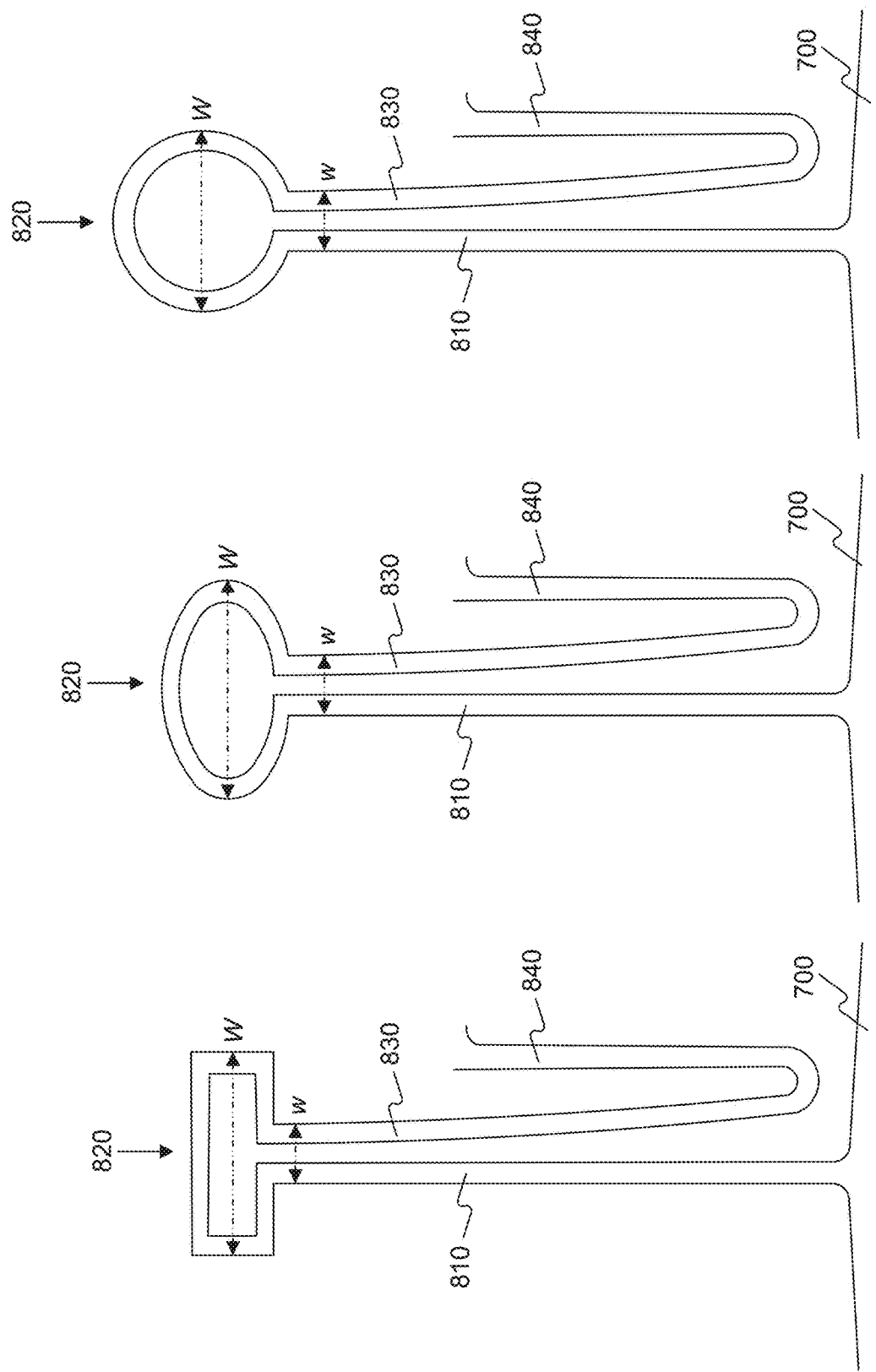

ACTUATORS AND COUPLERS FOR SCANNING MIRRORS

CROSS REFERENCES TO RELATED APPLICATIONS

The present application claims priority to U.S. Provisional Patent Application No. 63/144,556, filed Feb. 2, 2021, and U.S. Provisional Patent Application No. 63/144,562, filed Feb. 2, 2021, both of which are incorporated herein by reference in their entirety.

BACKGROUND

I. Technical Field

The present disclosure relates generally to technology for scanning a surrounding environment and, for example, to systems and methods that use LIDAR technology to detect objects in the surrounding environment.

II. Background Information

With the advent of driver assist systems and autonomous vehicles, automobiles need to be equipped with systems capable of reliably sensing and interpreting their surroundings, including identifying obstacles, hazards, objects, and other physical parameters that might impact navigation of the vehicle. To this end, a number of differing technologies have been suggested including radar, LIDAR, camera-based systems, operating alone or in a redundant manner.

One consideration with driver assistance systems and autonomous vehicles is an ability of the system to determine surroundings across different conditions including, rain, fog, darkness, bright light, and snow. A light detection and ranging system, (LIDAR a/k/a LADAR) is an example of technology that can work well in differing conditions, by measuring distances to objects by illuminating objects with light and measuring the reflected pulses with a sensor. A laser is one example of a light source that can be used in a LIDAR system. An electro-optical system such as a LIDAR system may include a light deflector for projecting light emitted by a light source into the environment of the electro-optical system. The light deflector may be controlled to tilt to scan a region of interest in the environment. It may be desirable to design improved systems and methods for controlling the scanning of the region of interest.

The systems and methods of the present disclosure are directed towards systems and methods to improve the accuracy of scanning the region of interest using a light deflector used in electro-optical systems.

SUMMARY

In an embodiment, a deflector unit for a light scanning system is disclosed. The deflector unit may comprise a mirror and at least one actuator arm. The at least one actuator arm may include an anchor end, a coupler end, and an actuator axis that extends from a first midpoint to a second midpoint, the first midpoint being a midpoint of an edge of the at least one actuator arm at the coupler end and the second midpoint being a midpoint of an edge of the at least one actuator arm at the anchor end, the mirror being coupled to the coupler end of the at least one actuator arm, wherein the mirror is configured to tilt about at least one tilting axis in response to a movement of the at least one actuator arm, and wherein a shortest distance of the mirror from the first midpoint is less than a shortest distance of the mirror from the second midpoint.

In another embodiment, a deflector unit for a light scanning system is disclosed. The deflector unit may include a mirror and at least one actuator arm. The at least one actuator arm may include an anchor end, a coupler end, and an actuator axis that extends from a first midpoint to a second midpoint, the first midpoint being a midpoint of an edge of the at least one actuator arm at the coupler end and the second midpoint being a midpoint of an edge of the at least one actuator arm at the anchor end, the mirror being coupled to the coupler end of the at least one actuator arm, wherein the mirror is configured to tilt about at least one tilting axis in response to a movement of the at least one actuator arm, wherein a virtual line between a midpoint of the actuator axis and a center of the mirror intersects an outer profile of the mirror at a first point, wherein the actuator axis is inclined at an angle greater than zero degrees and less than ninety degrees with respect to a tangent to the outer profile of the mirror at the first point.

In yet another embodiment, a deflector unit for a light scanning system is disclosed. The deflector unit may include a mirror and at least one actuator arm. The at least one actuator arm may include an anchor end and a coupler end. A coupling member may couple the at least one actuator arm to the mirror, wherein the coupling member includes a first portion, a second portion, and a third portion, wherein the first portion includes a first end coupled to the mirror and a second end extending away from the mirror, the second portion includes a third end coupled to the second end of the first portion and a fourth end extending towards the mirror, and the third portion includes a fifth end coupled to the fourth end of the second portion and a sixth end coupled to the coupler end of the at least one actuator arm.

In yet another embodiment, a deflector unit for a light scanning system is disclosed. The deflector unit may include a mirror and at least one actuator arm. The at least one actuator arm may include an anchor end and a coupler end. A coupling member couples the at least one actuator arm to the mirror. The coupling member may include a first portion, a second portion, a head portion, and a third portion. The second portion may be angled with respect to at least one of the first portion and the third portion. The first portion may include a first end coupled to the mirror and a second end extending away from the mirror. The second portion may include a third end positioned proximate the second end of the first portion and a fourth end extending towards the mirror. The head portion may include one end connected to the second end of the first portion and another end connected to the third end of the second portion. The third portion may include a fifth end coupled to the fourth end of the second portion and a sixth end coupled to the coupler end of the at least one actuator arm.

In a further embodiment, a deflector unit for a light scanning system is disclosed. The deflector unit may include a mirror and at least one actuator arm having an anchor end, a coupler end, and an actuator axis that extends from a first midpoint to a second midpoint. The first midpoint may be a midpoint of an edge of the at least one actuator arm at the coupler end and the second midpoint may be a midpoint of an edge of the at least one actuator arm at the anchor end. The mirror may be coupled to the coupler end of the at least one actuator arm. The mirror may be configured to tilt about at least one tilting axis in response to a movement of the at least one actuator arm. A shortest distance of the mirror from the first midpoint may be less than a shortest distance of the mirror from the second midpoint. The deflector unit may also include a coupling member coupling the at least one actuator arm to the mirror. The coupling member may include a first portion, a second portion, and a third portion. The first portion may include a first end coupled to the mirror and a second end extending away from the mirror. The second portion may include a third end coupled to the second end of the first portion and a fourth end extending towards the mirror. And the third portion may include a fifth end coupled to the fourth end of the second portion and a sixth end coupled to the coupler end of the at least one actuator arm.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIGS. 4A, 4B, 4C, 4D, and 4E are diagrams illustrating different configurations of sensing units in accordance with some embodiments of the present disclosure.

FIGS. 14A, 14B, and 14C illustrate other exemplary coupling members of the current disclosure.

DETAILED DESCRIPTION

Figure 1A:
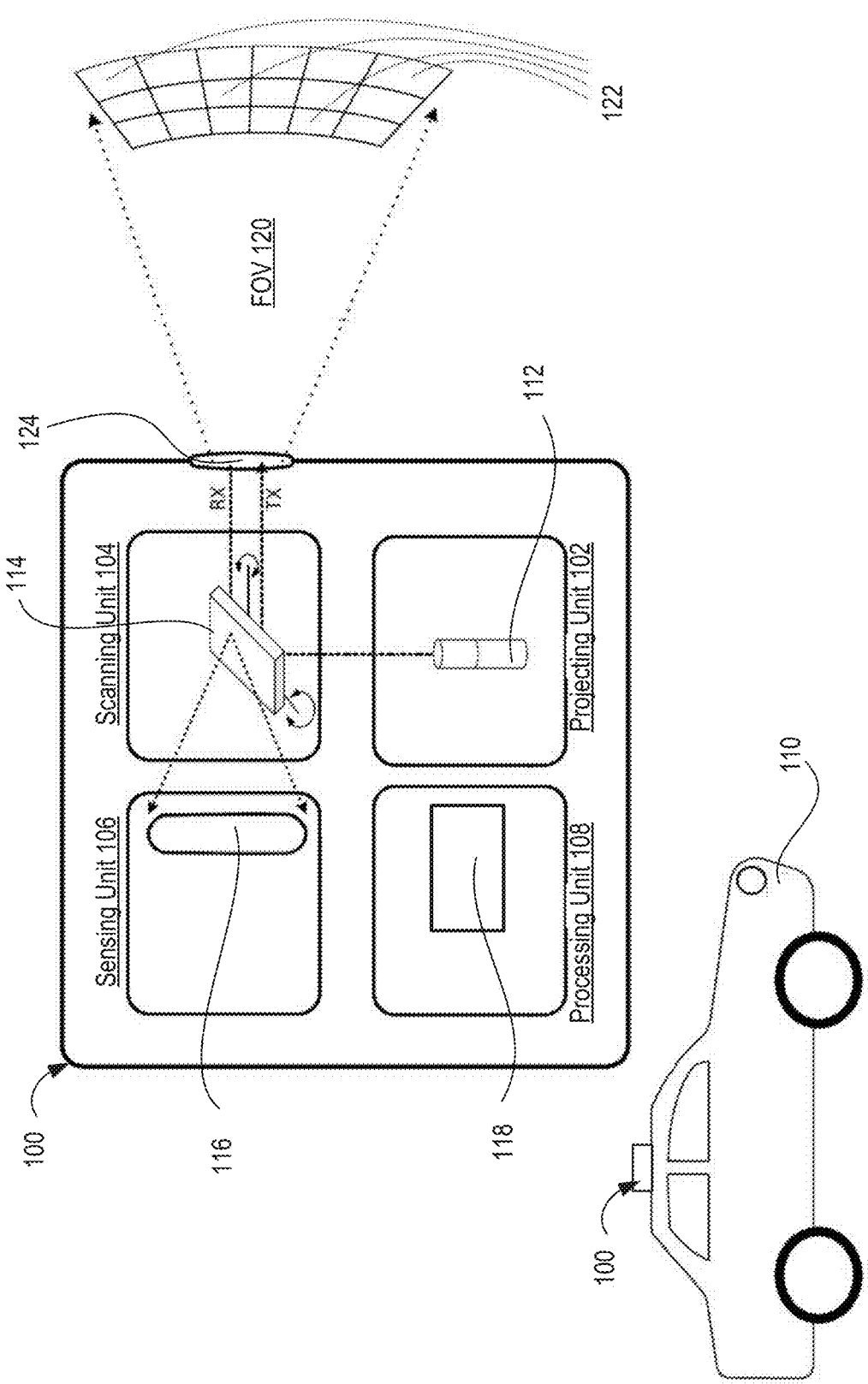
FIG. 1A is a diagram illustrating an exemplary LIDAR system consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Terms Definitions

Disclosed embodiments may involve an optical system. As used herein, the term "optical system" broadly includes any system that is used for the generation, detection and/or manipulation of light. By way of example only, an optical system may include one or more optical components for generating, detecting and/or manipulating light. For example, light sources, lenses, mirrors, prisms, beam splitters, collimators, polarizing optics, optical modulators, optical switches, optical amplifiers, optical detectors, optical sensors, fiber optics, semiconductor optic components, while each not necessarily required, may each be part of an optical system. In addition to the one or more optical components, an optical system may also include other non-optical components such as electrical components, mechanical components, chemical reaction components, and semiconductor components. The non-optical components may cooperate with optical components of the optical system. For example, the optical system may include at least one processor for analyzing detected light.

Consistent with the present disclosure, the optical system may be a LIDAR system. As used herein, the term "LIDAR system" broadly includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" broadly includes generating outputs which are indicative of distances between pairs of tangible objects. The determined distance may represent the physical dimension between a pair of tangible objects. By way of example only, the determined distance may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g. number of meters, number of inches, number of kilometers, number of millimeters), a number of arbitrary length units (e.g. number of LIDAR system lengths), a ratio between the distance to another length (e.g. a ratio to a length of an object detected in a field of view of the LIDAR system), an amount of time (e.g. given as standard unit, arbitrary units or ratio, for example, the time it takes light to travel between the tangible objects), one or more locations (e.g. specified using an agreed coordinate system, specified in relation to a known location), and more.

The LIDAR system may determine the distance between a pair of tangible objects based on reflected light. In one embodiment, the LIDAR system may process detection results of a sensor which creates temporal information indicative of a period of time between the emission of a light signal and the time of its detection by the sensor. The period of time is occasionally referred to as "time of flight" of the light signal. In one example, the light signal may be a short pulse, whose rise and/or fall time may be detected in reception. Using known information about the speed of light in the relevant medium (usually air), the information regarding the time of flight of the light signal can be processed to provide the distance the light signal traveled between emission and detection. In another embodiment, the LIDAR system may determine the distance based on frequency phase-shift (or multiple frequency phase-shift). Specifically, the LIDAR system may process information indicative of one or more modulation phase shifts (e.g., by solving some simultaneous equations to give a final measure) of the light signal. For example, the emitted optical signal may be modulated with one or more constant frequencies. The at least one phase shift of the modulation between the emitted signal and the detected reflection may be indicative of the distance the light traveled between emission and detection. The modulation may be applied to a continuous wave light signal, to a quasi-continuous wave light signal, or to another type of emitted light signal. It is noted that additional information may be used by the LIDAR system for determining the distance, e.g., location information (e.g., relative positions) between the projection location, the detection location of the signal (especially if distanced from one another), and more.

In some embodiments, the LIDAR system may be used for detecting a plurality of objects in an environment of the LIDAR system. The term "detecting an object in an environment of the LIDAR system" broadly includes generating information which is indicative of an object that reflected light toward a detector associated with the LIDAR system. If more than one object is detected by the LIDAR system, the generated information pertaining to different objects may be interconnected, for example a car is driving on a road, a bird is sitting on the tree, a man touches a bicycle, a van moves towards a building. The dimensions of the environment in which the LIDAR system detects objects may vary with respect to implementation. For example, the LIDAR system may be used for detecting a plurality of objects in an environment of a vehicle on which the LIDAR system is installed, up to a horizontal distance of 100 m (or 200 m, 300 m, etc.), and up to a vertical distance of 10 m (or 25 m, 50 m, etc.). In another example, the LIDAR system may be used for detecting a plurality of objects in an environment of a vehicle or within a predefined horizontal range (e.g., 25°, 50°, 100°, 180°, etc.), and up to a predefined vertical elevation (e.g., ±10°, ±20°, +40°−20°, ±90° or 0°−90°).

As used herein, the term "detecting an object" may broadly refer to determining an existence of the object (e.g., an object may exist in a certain direction with respect to the LIDAR system and/or to another reference location, or an object may exist in a certain spatial volume). Additionally, or alternatively, the term "detecting an object" may refer to determining a distance between the object and another location (e.g., a location of the LIDAR system, a location on earth, or a location of another object). Additionally, or alternatively, the term "detecting an object" may refer to identifying the object (e.g. classifying a type of object such as car, plant, tree, road; recognizing a specific object (e.g., the Washington Monument); determining a license plate number; determining a composition of an object (e.g., solid, liquid, transparent, semitransparent); determining a kinematic parameter of an object (e.g., whether it is moving, its velocity, its movement direction, expansion of the object). Additionally, or alternatively, the term "detecting an object" may refer to generating a point cloud map in which every point of one or more points of the point cloud map correspond to a location in the object or a location on a face thereof. In one embodiment, the data resolution associated with the point cloud map representation of the field of view may be associated with $0.1°×0.1°$ or $0.3°×0.3°$ of the field of view.

Consistent with the present disclosure, the term "object" broadly includes a finite composition of matter that may reflect light from at least a portion thereof. For example, an object may be at least partially solid (e.g., cars, trees); at least partially liquid (e.g., puddles on the road, rain); at least partly gaseous (e.g., fumes, clouds); made from a multitude of distinct particles (e.g., sandstorm, fog, spray); and may be of one or more scales of magnitude, such as ~1 millimeter (mm), ~5 mm, ~10 mm, ~50 mm, ~100 mm, ~500 mm, ~1 meter (m), ~5 m, ~10 m, ~50 m, ~100 m, and so on. Smaller or larger objects, as well as any size in between those examples, may also be detected. It is noted that for various reasons, the LIDAR system may detect only part of the object. For example, in some cases, light may be reflected from only some sides of the object (e.g., only the side opposing the LIDAR system will be detected); in other cases, light may be projected on only part of the object (e.g. laser beam projected onto a road or a building); in other cases, the object may be partly blocked by another object between the LIDAR system and the detected object; in other cases, the LIDAR's sensor may only detect light reflected from a portion of the object, e.g., because ambient light or other interferences interfere with detection of some portions of the object.

Consistent with the present disclosure, a LIDAR system may be configured to detect objects by scanning the environment of the LIDAR system. The term "scanning the environment of the LIDAR system" broadly includes illuminating the field of view or a portion of the field of view of the LIDAR system. In one example, scanning the environment of the LIDAR system may be achieved by moving or pivoting a light deflector to deflect light in differing directions toward different parts of the field of view. In another example, scanning the environment of the LIDAR system may be achieved by changing a positioning (i.e., location and/or orientation) of a sensor with respect to the field of view. In another example, scanning the environment of the LIDAR system may be achieved by changing a positioning (i.e., location and/or orientation) of a light source with respect to the field of view. In yet another example, scanning the environment of the LIDAR system may be achieved by changing the positions of at least one light source and of at least one sensor to move rigidly with respect to the field of view (i.e., the relative distance and orientation of the at least one sensor and of the at least one light source remains).

As used herein the term "field of view of the LIDAR system" may broadly include an extent of the observable environment of the LIDAR system in which objects may be detected. It is noted that the field of view (FOV) of the LIDAR system may be affected by various conditions such as but not limited to: an orientation of the LIDAR system (e.g., is the direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The field of view of LIDAR system may be defined, for example, by a solid angle (e.g., defined using $\phi$, $\theta$ angles, in which $\phi$ and $\theta$ are angles defined in perpendicular planes, e.g., with respect to symmetry axes of the LIDAR system and/or its FOV). In one example, the field of view may also be defined within a certain range (e.g., up to 200 m).

Similarly, the term "instantaneous field of view" may broadly include an extent of the observable environment in which objects may be detected by the LIDAR system at any given moment. For example, for a scanning LIDAR system, the instantaneous field of view is narrower than the entire FOV of the LIDAR system, and it can be moved within the FOV of the LIDAR system in order to enable detection in other parts of the FOV of the LIDAR system. The movement of the instantaneous field of view within the FOV of the LIDAR system may be achieved by moving a light deflector of the LIDAR system (or external to the LIDAR system), so as to deflect beams of light to and/or from the LIDAR system in differing directions. In one embodiment, the LIDAR system may be configured to scan scene in the environment in which the LIDAR system is operating. As used herein the term "scene" may broadly include some or all of the objects within the field of view of the LIDAR system, in their relative positions and in their current states, within an operational duration of the LIDAR system. For example, the scene may include ground elements (e.g., earth, roads, grass, sidewalks, road surface marking), sky, man-made objects (e.g., vehicles, buildings, signs), vegetation, people, animals, light projecting elements (e.g., flashlights, sun, other LIDAR systems), and so on.

Disclosed embodiments may involve obtaining information for use in generating reconstructed three-dimensional models. Examples of types of reconstructed three-dimensional models which may be used include point cloud models, and Polygon Mesh (e.g., a triangle mesh). The terms "point cloud" and "point cloud model" are widely known in the art, and should be construed to include a set of data points located spatially in some coordinate system (i.e., having an identifiable location in a space described by a respective coordinate system). The term "point cloud point" refer to a point in space (which may be dimensionless, or a miniature cellular space, e.g. 1 cm$^3$), and whose location may be described by the point cloud model using a set of coordinates (e.g. (X,Y,Z), (r,$\varphi$,$\theta$)). By way of example only, the point cloud model may store additional information for some or all of its points (e.g., color information for points generated from camera images). Likewise, any other type of reconstructed three-dimensional model may store additional information for some or all of its objects. Similarly, the terms "polygon mesh" and "triangle mesh" are widely known in the art, and are to be construed to include, among other things, a set of vertices, edges and faces that define the shape of one or more 3D objects (such as a polyhedral object). The faces may include one or more of the following: triangles (triangle mesh), quadrilaterals, or other simple convex polygons, since this may simplify rendering. The faces may also include more general concave polygons, or polygons with holes. Polygon meshes may be represented using differing techniques, such as: Vertex-vertex meshes, Face-vertex meshes, Winged-edge meshes and Render dynamic meshes. Different portions of the polygon mesh (e.g., vertex, face, edge) are located spatially in some coordinate system (i.e., having an identifiable location in a space described by the respective coordinate system), either directly and/or relative to one another. The generation of the reconstructed three-dimensional model may be implemented using any standard, dedicated and/or novel photogrammetry technique, many of which are known in the art. It is noted that other types of models of the environment may be generated by the LIDAR system.

Consistent with disclosed embodiments, the LIDAR system may include at least one projecting unit with a light source configured to project light. As used herein the term "light source" broadly refers to any device configured to emit light. In one embodiment, the light source may be a laser such as a solid-state laser, laser diode, a high power laser, or an alternative light source such as, a light emitting diode (LED)-based light source. In addition, light source 112 as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. Unless indicated otherwise, the term "about" with regards to a numeric value is defined as a variance of up to 5% with respect to the stated value. Additional details on the projecting unit and the at least one light source are described below with reference to FIGS. 2A-2C.

Consistent with disclosed embodiments, the LIDAR system may include at least one scanning unit with at least one light deflector configured to deflect light from the light source in order to scan the field of view. The term "light deflector" broadly includes any mechanism or module which is configured to make light deviate from its original path; for example, a mirror, a prism, controllable lens, a mechanical mirror, mechanical scanning polygons, active diffraction (e.g., controllable LCD), Risley prisms, non-mechanical-electro-optical beam steering (such as made by Vscent), polarization grating (such as offered by Boulder Non-Linear Systems), optical phased array (OPA), and more. In one embodiment, a light deflector may include a plurality of optical components, such as at least one reflecting element (e.g., a mirror), at least one refracting element (e.g., a prism, a lens), and so on. In one example, the light deflector may be movable, to cause light to deviate to differing degrees (e.g., discrete degrees, or over a continuous span of degrees). The light deflector may optionally be controllable in different ways (e.g., deflect to a degree a, change deflection angle by Aa, move a component of the light deflector by M millimeters, change speed in which the deflection angle changes). In addition, the light deflector may optionally be operable to change an angle of deflection within a single plane (e.g., θ coordinate). The light deflector may optionally be operable to change an angle of deflection within two non-parallel planes (e.g., θ and φ coordinates). Alternatively, or in addition, the light deflector may optionally be operable to change an angle of deflection between predetermined settings (e.g., along a predefined scanning route) or otherwise. With respect to the use of light deflectors in LIDAR systems, it is noted that a light deflector may be used in the outbound direction (also referred to as transmission direction, or TX) to deflect light from the light source to at least a part of the field of view. However, a light deflector may also be used in the inbound direction (also referred to as reception direction, or RX) to deflect light from at least a part of the field of view to one or more light sensors. Additional details on the scanning unit and the at least one light deflector are described below with reference to FIGS. 3A-3C.

Disclosed embodiments may involve pivoting the light deflector in order to scan the field of view. As used herein the term "pivoting" broadly includes rotating of an object (especially a solid object) about one or more axis of rotation, while substantially maintaining a center of rotation fixed. In one embodiment, the pivoting of the light deflector may include rotation of the light deflector about a fixed axis (e.g., a shaft), but this is not necessarily so. For example, in some MEMS mirror implementation, the MEMS mirror may move by actuation of a plurality of benders connected to the mirror, the mirror may experience some spatial translation in addition to rotation. Nevertheless, such mirror may be designed to rotate about a substantially fixed axis, and therefore consistent with the present disclosure it considered to be pivoted. In other embodiments, some types of light deflectors (e.g., non-mechanical-electro-optical beam steering, OPA) do not require any moving components or internal movements in order to change the deflection angles of deflected light. It is noted that any discussion relating to moving or pivoting a light deflector is also mutatis mutandis applicable to controlling the light deflector such that it changes a deflection behavior of the light deflector. For example, controlling the light deflector may cause a change in a deflection angle of beams of light arriving from at least one direction.

Disclosed embodiments may involve receiving reflections associated with a portion of the field of view corresponding to a single instantaneous position of the light deflector. As used herein, the term "instantaneous position of the light deflector" (also referred to as "state of the light deflector") broadly refers to the location or position in space where at least one controlled component of the light deflector is situated at an instantaneous point in time, or over a short span of time. In one embodiment, the instantaneous position of the light deflector may be gauged with respect to a frame of reference. The frame of reference may pertain to at least one fixed point in the LIDAR system. Or, for example, the frame of reference may pertain to at least one fixed point in the scene. In some embodiments, the instantaneous position of the light deflector may include some movement of one or more components of the light deflector (e.g., mirror, prism), usually to a limited degree with respect to the maximal degree of change during a scanning of the field of view. For example, a scanning of the entire field of view of the LIDAR system may include changing deflection of light over a span of 30°, and the instantaneous position of the at least one light deflector may include angular shifts of the light deflector within 0.05°. In other embodiments, the term "instantaneous position of the light deflector" may refer to the positions of the light deflector during acquisition of light which is processed to provide data for a single point of a point cloud (or another type of 3D model) generated by the LIDAR system. In some embodiments, an instantaneous position of the light deflector may correspond with a fixed position or orientation in which the deflector pauses for a short time during illumination of a particular sub-region of the LIDAR field of view. In other cases, an instantaneous position of the light deflector may correspond with a certain position/orientation along a scanned range of positions/orientations of the light deflector that the light deflector passes through as part of a continuous or semi-continuous scan of the LIDAR field of view. In some embodiments, the light deflector may be moved such that during a scanning cycle of the LIDAR FOV the light deflector is located at a plurality of different instantaneous positions. In other words, during the period of time in which a scanning cycle occurs, the deflector may be moved through a series of different instantaneous positions/orientations, and the deflector may reach each different instantaneous position/orientation at a different time during the scanning cycle.

Consistent with disclosed embodiments, the LIDAR system may include at least one sensing unit with at least one sensor configured to detect reflections from objects in the field of view. The term "sensor" broadly includes any device, element, or system capable of measuring properties (e.g., power, frequency, phase, pulse timing, pulse duration) of electromagnetic waves and to generate an output relating to the measured properties. In some embodiments, the at least one sensor may include a plurality of detectors constructed from a plurality of detecting elements. The at least one sensor may include light sensors of one or more types. It is noted that the at least one sensor may include multiple sensors of the same type which may differ in other characteristics (e.g., sensitivity, size). Other types of sensors may also be used. Combinations of several types of sensors can be used for different reasons, such as improving detection over a span of ranges (especially in close range); improving the dynamic range of the sensor; improving the temporal response of the sensor; and improving detection in varying environmental conditions (e.g. atmospheric temperature, rain, etc.). In one embodiment, the at least one sensor includes a SiPM (Silicon photomultipliers) which is a solid-state single-photon-sensitive device built from an array of avalanche photodiode (APD), single photon avalanche diode (SPAD), serving as detection elements on a common silicon substrate. In one example, a typical distance between SPADs may be between about 10 µm and about 50 µm, wherein each SPAD may have a recovery time of between about 20 ns and about 100 ns. Similar photomultipliers from other, non-silicon materials may also be used. Although a SiPM device works in digital/switching mode, the SiPM is an analog device because all the microcells may be read in parallel, making it possible to generate signals within a dynamic range from a single photon to hundreds and thousands of photons detected by the different SPADs. It is noted that outputs from different types of sensors (e.g., SPAD, APD, SiPM, PIN diode, Photodetector) may be combined together to a single output which may be processed by a processor of the LIDAR system. Additional details on the sensing unit and the at least one sensor are described below with reference to FIGS. 4A-4C.

Consistent with disclosed embodiments, the LIDAR system may include or communicate with at least one processor configured to execute differing functions. The at least one processor may constitute any physical device having an electric circuit that performs a logic operation on input or inputs. For example, the at least one processor may include one or more integrated circuits (IC), including Application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the memory is configured to store representative data about objects in the environment of the LIDAR system. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact. Additional details on the processing unit and the at least one processor are described below with reference to FIGS. 5A-5C.

System Overview

FIG. 1A illustrates a LIDAR system 100 including a projecting unit 102, a scanning unit 104, a sensing unit 106, and a processing unit 108. LIDAR system 100 may be mountable on a vehicle 110. Consistent with embodiments of the present disclosure, projecting unit 102 may include at least one light source 112, scanning unit 104 may include at least one light deflector 114, sensing unit 106 may include at least one sensor 116, and processing unit 108 may include at least one processor 118. In one embodiment, at least one processor 118 may be configured to coordinate operation of the at least one light source 112 with the movement of at least one light deflector 114 in order to scan a field of view 120. During a scanning cycle, each instantaneous position of at least one light deflector 114 may be associated with a particular portion 122 of field of view 120. In addition, LIDAR system 100 may include at least one optional optical window 124 for directing light projected towards field of view 120 and/or receiving light reflected from objects in field of view 120. Optional optical window 124 may serve different purposes, such as collimation of the projected light and focusing of the reflected light. In one embodiment, optional optical window 124 may be an opening, a flat window, a lens, or any other type of optical window.

Consistent with the present disclosure, LIDAR system 100 may be used in autonomous or semi-autonomous road-vehicles (for example, cars, buses, vans, trucks and any other terrestrial vehicle). Autonomous road-vehicles with LIDAR system 100 may scan their environment and drive to a destination without human input. Similarly, LIDAR system 100 may also be used in autonomous/semi-autonomous aerial-vehicles (for example, UAV, drones, quadcopters, and any other airborne vehicle or device); or in an autonomous or semi-autonomous water vessel (e.g., boat, ship, submarine, or any other watercraft). Autonomous aerial-vehicles and watercraft with LIDAR system 100 may scan their environment and navigate to a destination autonomously or using a remote human operator. According to one embodiment, vehicle 110 (either a road-vehicle, aerial-vehicle, or watercraft) may use LIDAR system 100 to aid in detecting and scanning the environment in which vehicle 110 is operating.

It should be noted that LIDAR system 100 or any of its components may be used together with any of the example embodiments and methods disclosed herein. Further, while some aspects of LIDAR system 100 are described relative to an exemplary vehicle-based LIDAR platform, LIDAR system 100, any of its components, or any of the processes described herein may be applicable to LIDAR systems of other platform types.

In some embodiments, LIDAR system 100 may include one or more scanning units 104 to scan the environment around vehicle 110. LIDAR system 100 may be attached or mounted to any part of vehicle 110. Sensing unit 106 may receive reflections from the surroundings of vehicle 110, and transfer reflection signals indicative of light reflected from objects in field of view 120 to processing unit 108. Consistent with the present disclosure, scanning units 104 may be mounted to or incorporated into a bumper, a fender, a side panel, a spoiler, a roof, a headlight assembly, a taillight assembly, a rear-view mirror assembly, a hood, a trunk or any other suitable part of vehicle 110 capable of housing at least a portion of the LIDAR system. In some cases, LIDAR system 100 may capture a complete surround view of the environment of vehicle 110. Thus, LIDAR system 100 may have a 360-degree horizontal field of view. In one example, as shown in FIG. 1A, LIDAR system 100 may include a single scanning unit 104 mounted on a roof of vehicle 110. Alternatively, LIDAR system 100 may include multiple scanning units (e.g., two, three, four, or more scanning units 104) each with a field of few such that in the aggregate the horizontal field of view is covered by a 360-degree scan around vehicle 110. One skilled in the art will appreciate that LIDAR system 100 may include any number of scanning units 104 arranged in any manner, each with an 80° to 120° field of view or less, depending on the number of units employed. Moreover, a 360-degree horizontal field of view may be also obtained by mounting a multiple LIDAR systems 100 on vehicle 110, each with a single scanning unit 104. It is nevertheless noted that the one or more LIDAR systems 100 do not have to provide a complete 360° field of view, and that narrower fields of view may be useful in some situations. For example, vehicle 110 may require a first LIDAR system 100 having a field of view of 75° looking ahead of the vehicle, and possibly a second LIDAR system 100 with a similar FOV looking backward (optionally with a lower detection range). It is also noted that different vertical field of view angles may also be implemented.

Figure 1B:
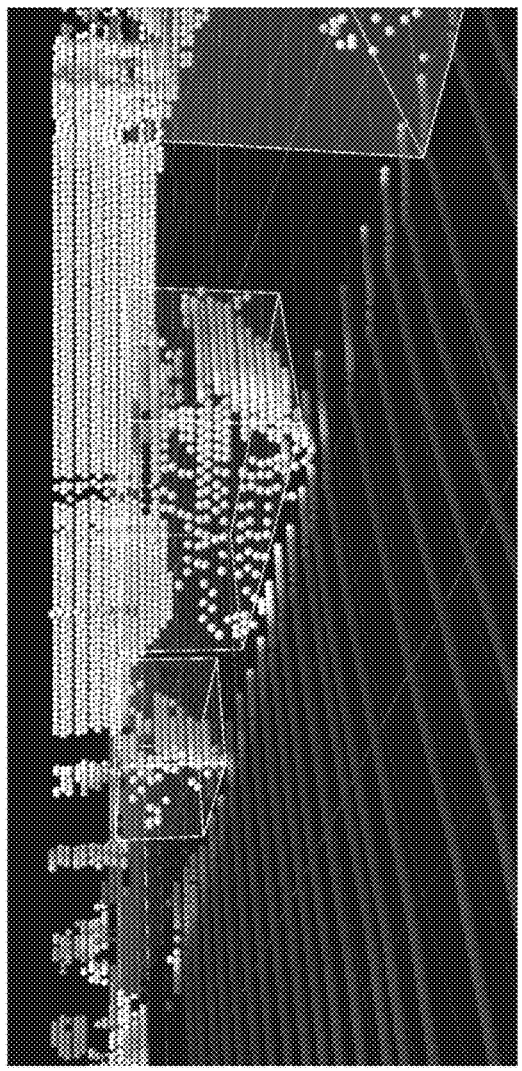
FIG. 1B is an image showing an exemplary output of a single scanning cycle of a LIDAR system mounted on a vehicle consistent with disclosed embodiments.

FIG. 1B is an image showing an exemplary output from a single scanning cycle of LIDAR system 100 mounted on vehicle 110 consistent with disclosed embodiments. In this example, scanning unit 104 is incorporated into a right headlight assembly of vehicle 110. Every gray dot in the image corresponds to a location in the environment around vehicle 110 determined from reflections detected by sensing unit 106. In addition to location, each gray dot may also be associated with different types of information, for example, intensity (e.g., how much light returns back from that location), reflectivity, proximity to other dots, and more. In one embodiment, LIDAR system 100 may generate a plurality of point-cloud data entries from detected reflections of multiple scanning cycles of the field of view to enable, for example, determining a point cloud model of the environment around vehicle 110.

Figure 1C:
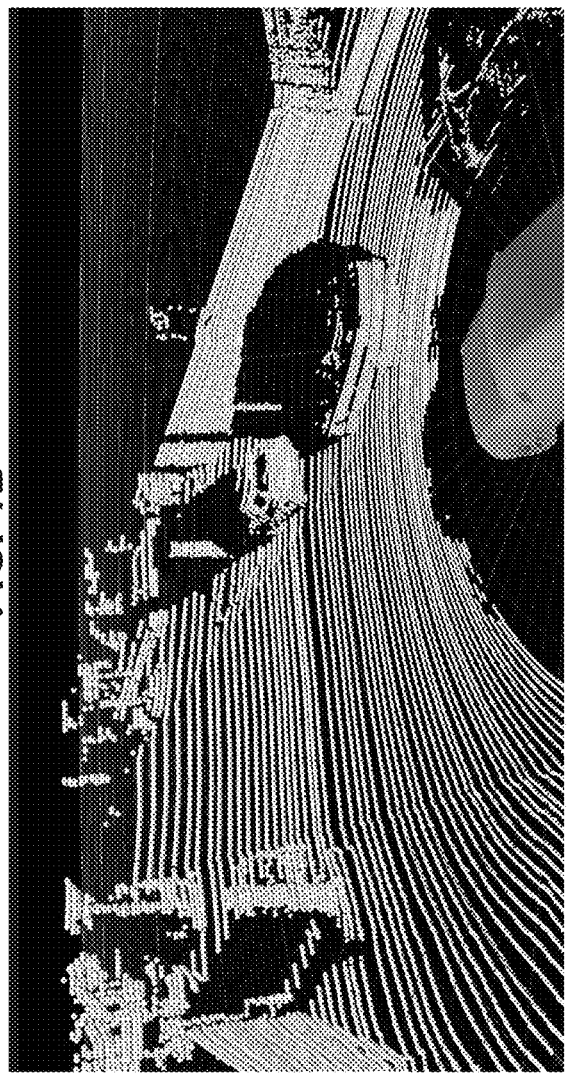
FIG. 1C is another image showing a representation of a point cloud model determined from output of a LIDAR system consistent with disclosed embodiments.

FIG. 1C is an image showing a representation of the point cloud model determined from the output of LIDAR system 100. Consistent with disclosed embodiments, by processing the generated point-cloud data entries of the environment around vehicle 110, a surround-view image may be produced from the point cloud model. In one embodiment, the point cloud model may be provided to a feature extraction module, which processes the point cloud information to identify a plurality of features. Each feature may include data about different aspects of the point cloud and/or of objects in the environment around vehicle 110 (e.g., cars, trees, people, and roads). Features may have the same resolution of the point cloud model (i.e., having the same number of data points, optionally arranged into similar sized 2D arrays), or may have different resolutions. The features may be stored in any kind of data structure (e.g., raster, vector, 2D array, 1D array). In addition, virtual features, such as a representation of vehicle 110, border lines, or bounding boxes separating regions or objects in the image (e.g., as depicted in FIG. 1B), and icons representing one or more identified objects, may be overlaid on the representation of the point cloud model to form the final surround-view image. For example, a symbol of vehicle 110 may be overlaid at a center of the surround-view image.

The Projecting Unit

Figure 2A:
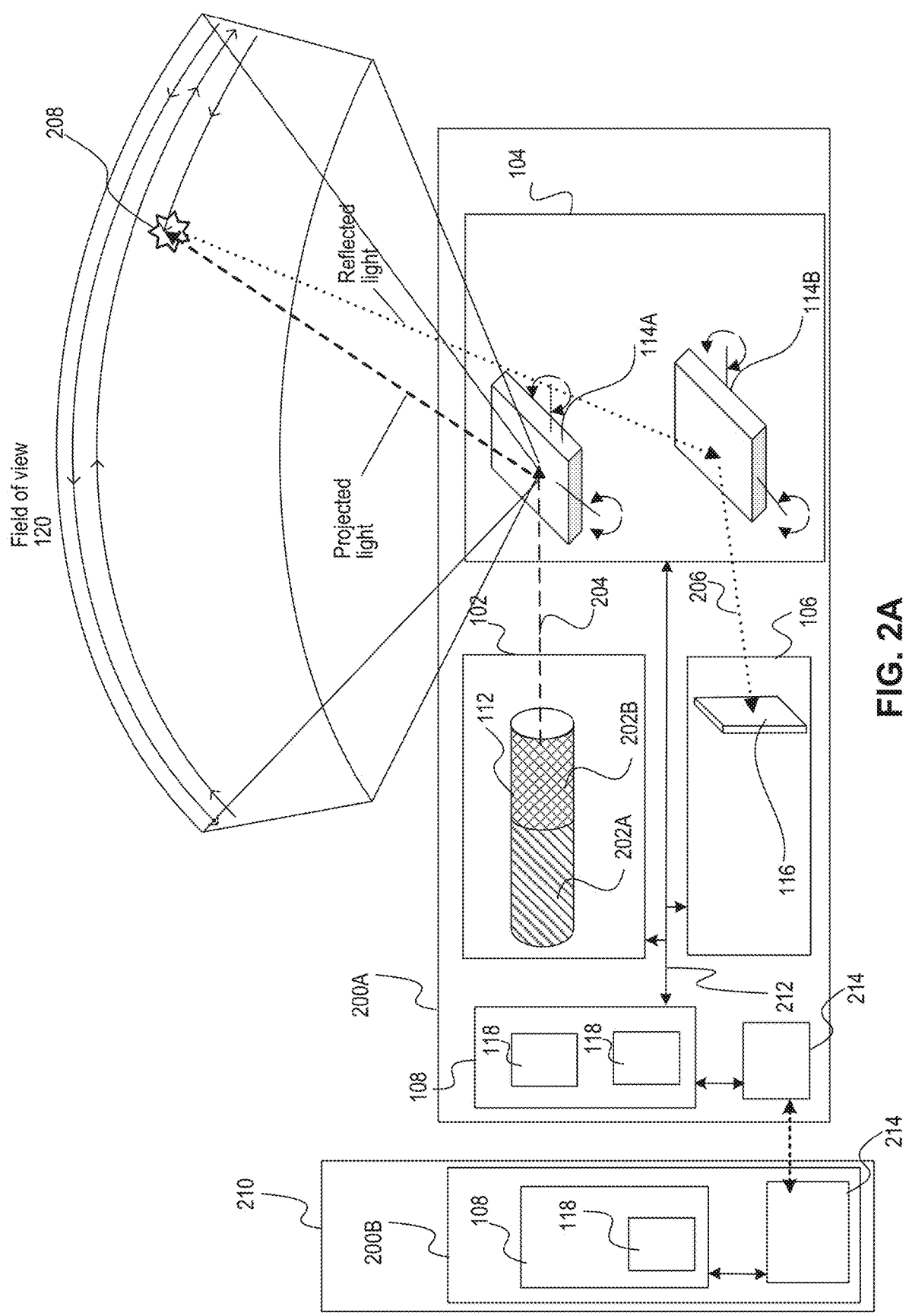
FIGS. 2A, 2B, 2C, 2D, 2E, 2F, and 2G are diagrams illustrating different configurations of projecting units in accordance with some embodiments of the present disclosure.
Figure 2B:
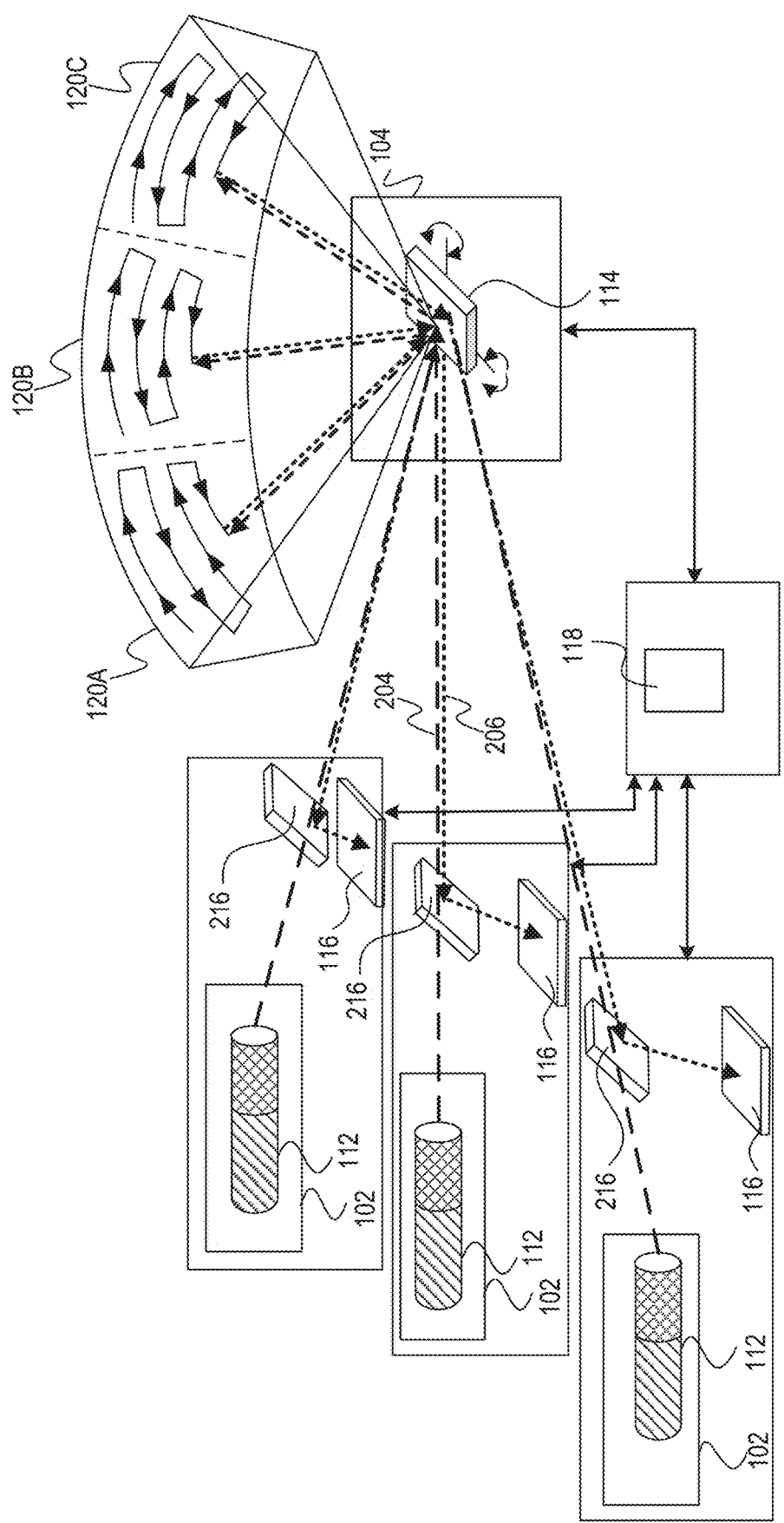
Figure 2C:
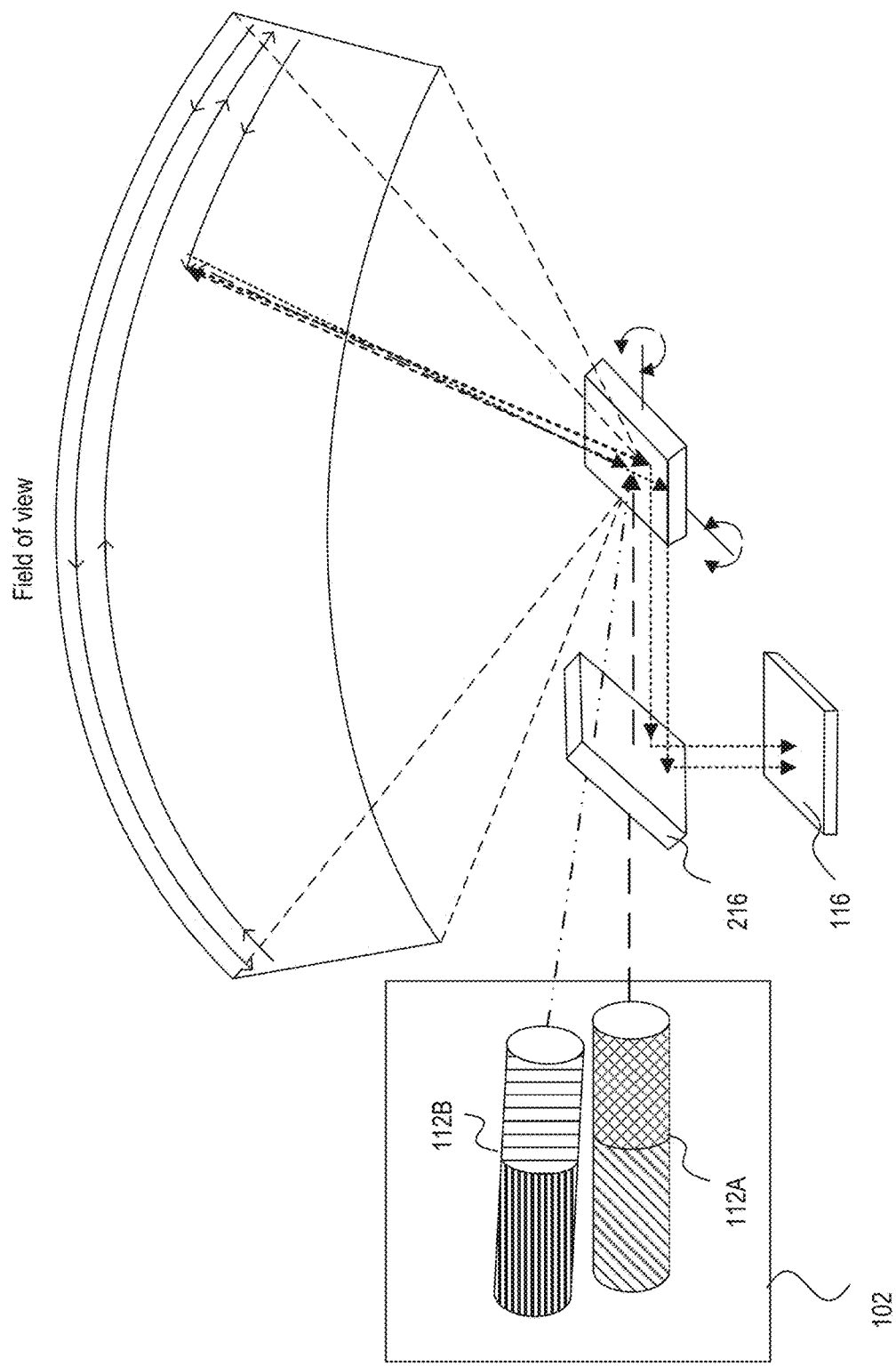
Figure 2D:
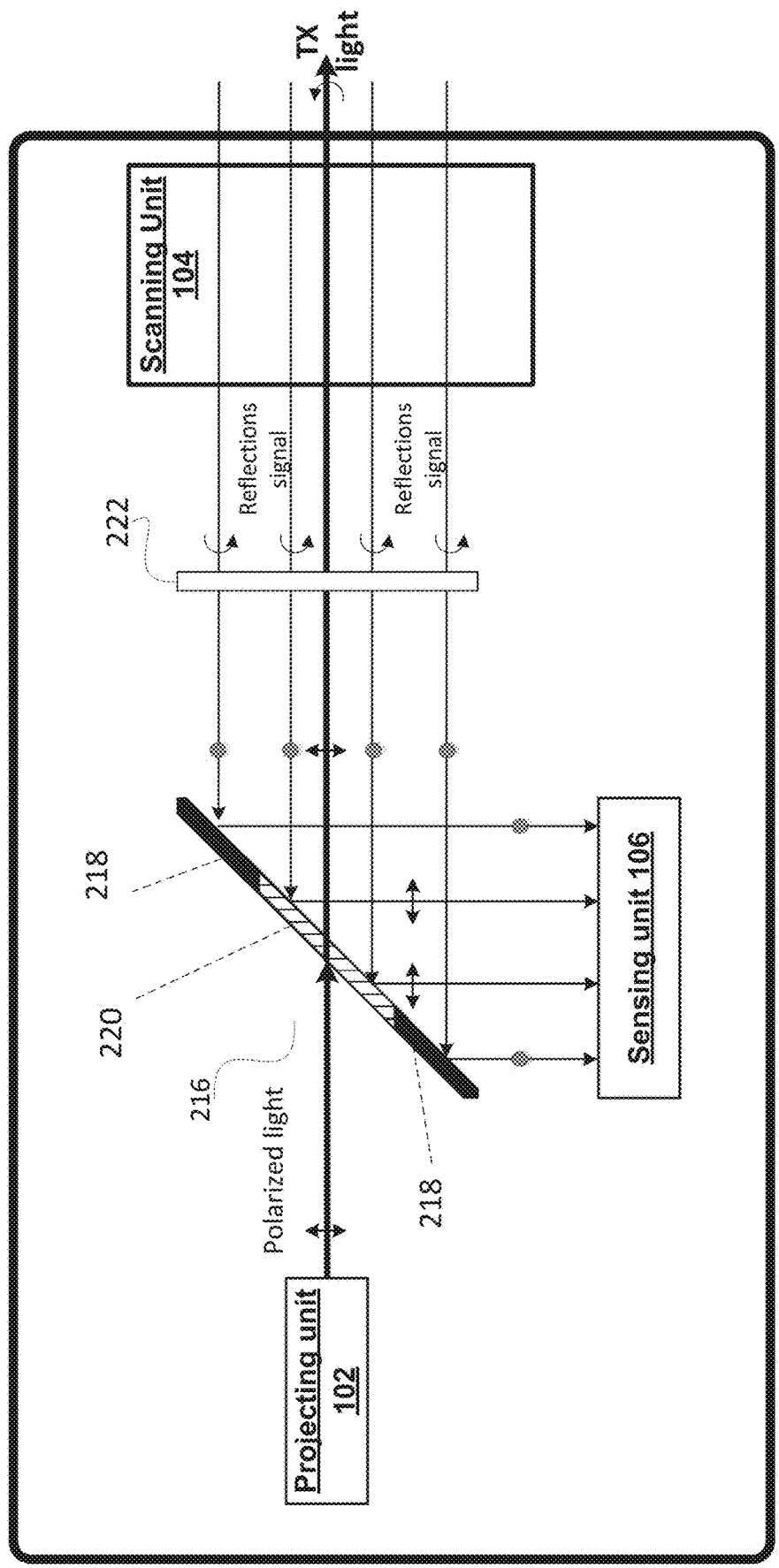
Figure 2E:
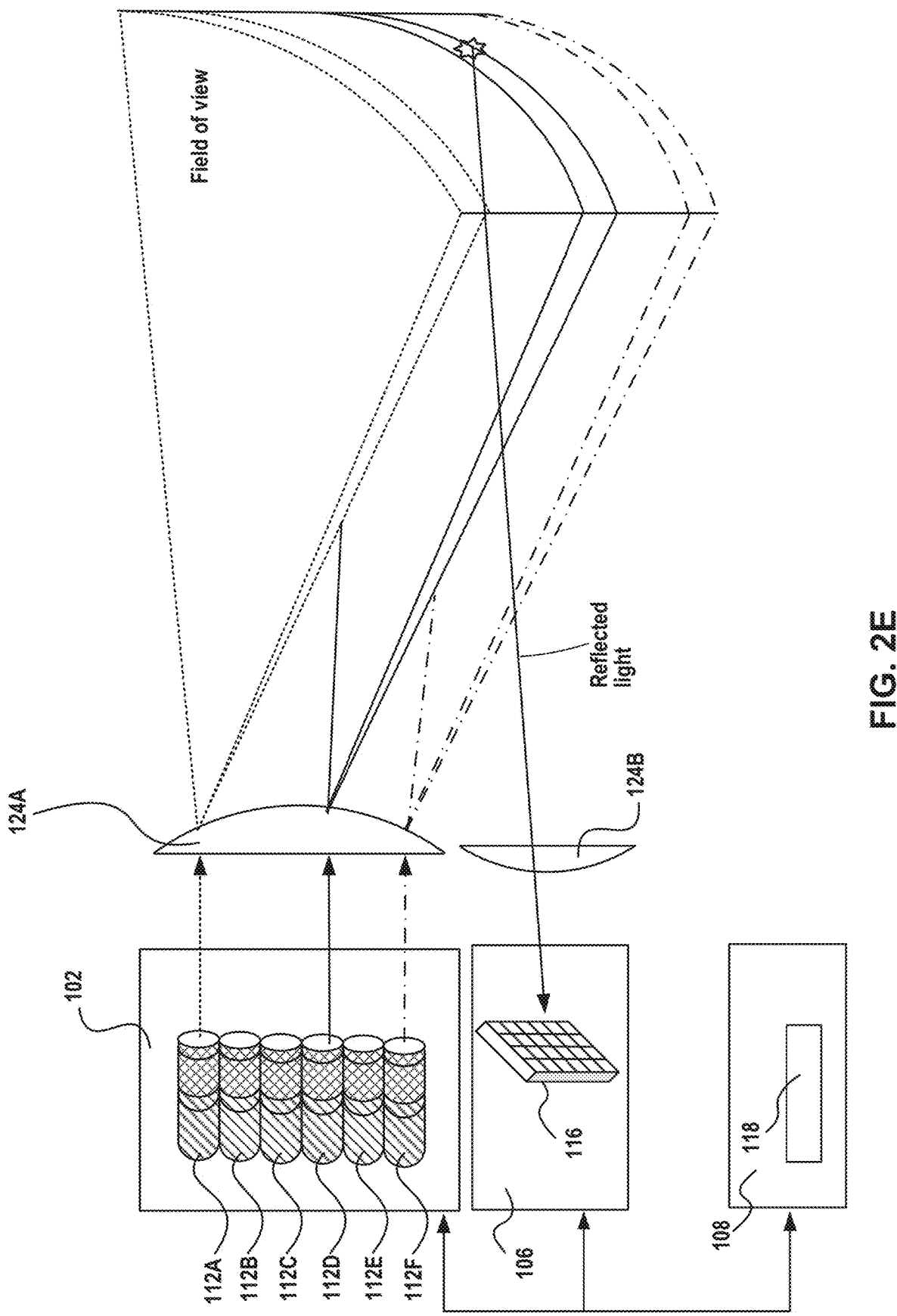
Figure 2F:
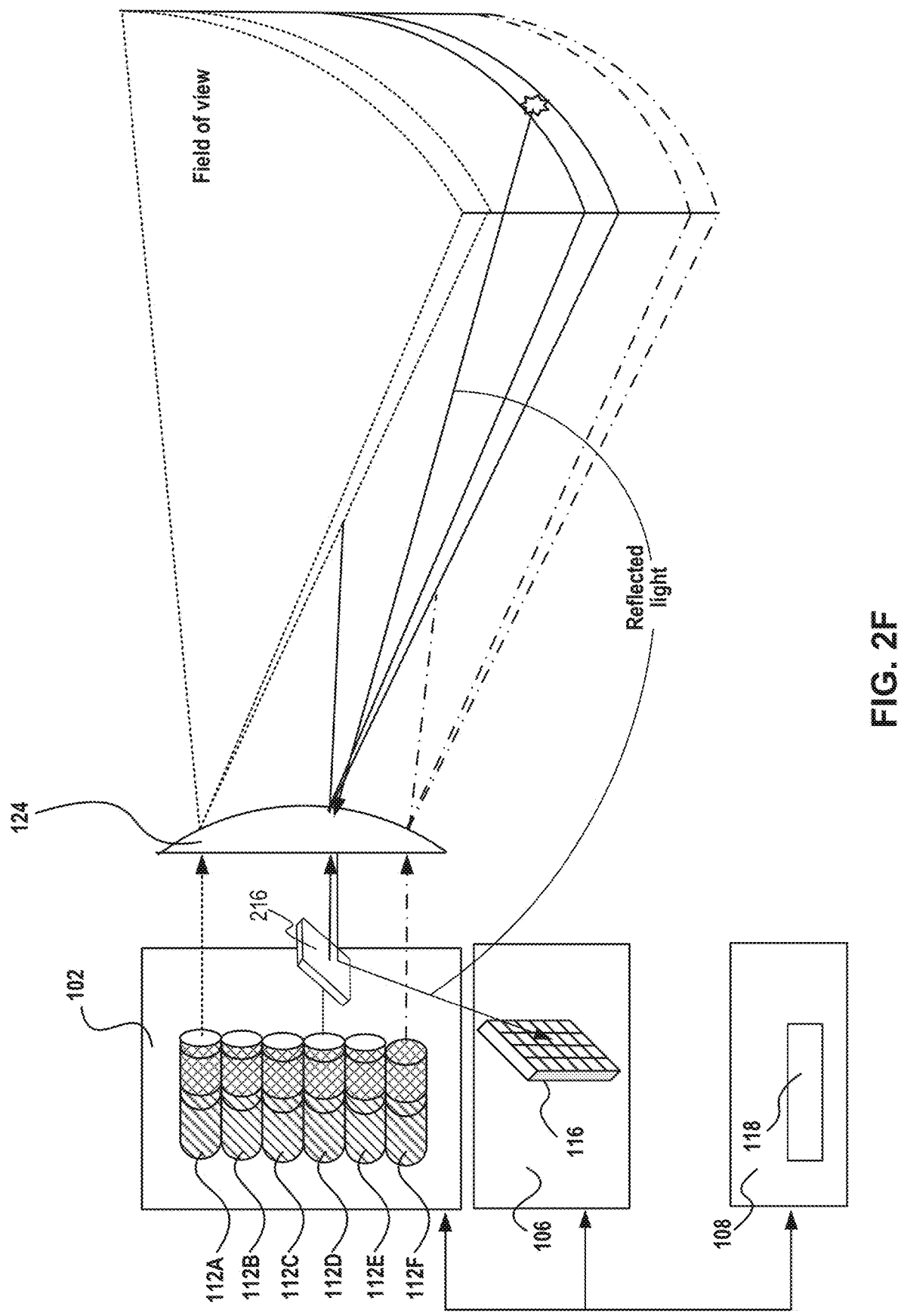
Figure 2G:
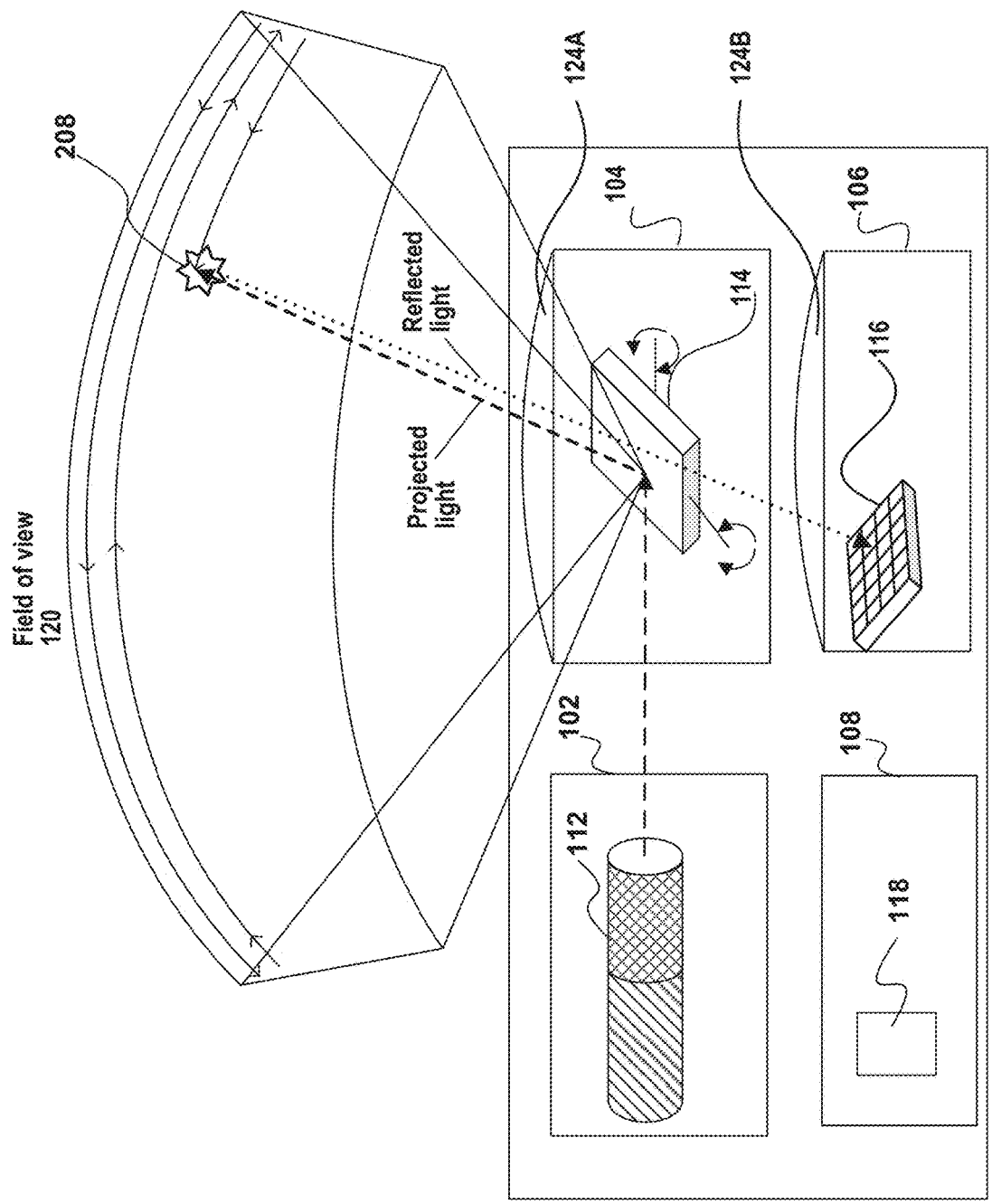

FIGS. 2A-2G depict various configurations of projecting unit 102 and its role in LIDAR system 100. Specifically, FIG. 2A is a diagram illustrating projecting unit 102 with a single light source; FIG. 2B is a diagram illustrating a plurality of projecting units 102 with a plurality of light sources aimed at a common light deflector 114; FIG. 2C is a diagram illustrating projecting unit 102 with a primary and a secondary light sources 112; FIG. 2D is a diagram illustrating an asymmetrical deflector used in some configurations of projecting unit 102; FIG. 2E is a diagram illustrating a first configuration of a non-scanning LIDAR system; FIG. 2F is a diagram illustrating a second configuration of a non-scanning LIDAR system; and FIG. 2G is a diagram illustrating a LIDAR system that scans in the outbound direction and does not scan in the inbound direction. One skilled in the art will appreciate that the depicted configurations of projecting unit 102 may have numerous variations and modifications.

FIG. 2A illustrates an example of a bi-static configuration of LIDAR system 100 in which projecting unit 102 includes a single light source 112. The term "bi-static configuration" broadly refers to LIDAR systems configurations in which the projected light exiting the LIDAR system and the reflected light entering the LIDAR system pass through substantially different optical paths. In some embodiments, a bi-static configuration of LIDAR system 100 may include a separation of the optical paths by using completely different optical components, by using parallel but not fully separated optical components, or by using the same optical components for only part of the of the optical paths (optical components may include, for example, windows, lenses, mirrors, beam splitters, etc.). In the example depicted in FIG. 2A, the bi-static configuration includes a configuration where the outbound light and the inbound light pass through a single optical window 124 but scanning unit 104 includes two light deflectors, a first light deflector 114A for outbound light and a second light deflector 114B for inbound light (the inbound light in LIDAR system includes emitted light reflected from objects in the scene, and may also include ambient light arriving from other sources). In the examples depicted in FIGS. 2E and 2G, the bi-static configuration includes a configuration where the outbound light passes through a first optical window 124A, and the inbound light passes through a second optical window 124B. In all the example configurations above, the inbound and outbound optical paths differ from one another.

In this embodiment, all the components of LIDAR system 100 may be contained within a single housing 200, or may be divided among a plurality of housings. As shown, projecting unit 102 is associated with a single light source 112 that includes a laser diode 202A (or two or more laser diodes coupled together) configured to emit light (projected light 204). In one non-limiting example, the light projected by light source 112 may be at a wavelength between about 800 nm and 950 nm, have an average power between about 50 mW and about 500 mW, have a peak power between about 50 W and about 200 W, and a pulse width of between about 2 ns and about 100 ns. In addition, light source 112 may optionally be associated with optical assembly 202B used for manipulation of the light emitted by laser diode 202A (e.g., for collimation, focusing, etc.). It is noted that other types of light sources 112 may be used, and that the disclosure is not restricted to laser diodes. In addition, light source 112 may emit its light in different formats, such as light pulses, frequency modulated, continuous wave (CW), quasi-CW, or any other form corresponding to the particular light source employed. The projection format and other parameters may be changed by the light source from time to time based on different factors, such as instructions from processing unit 108. The projected light is projected towards an outbound deflector 114A that functions as a steering element for directing the projected light in field of view 120. In this example, scanning unit 104 may also include a pivotable return deflector 114B that directs photons (reflected light 206) reflected back from an object 208 within field of view 120 toward sensor 116. The reflected light is detected by sensor 116 and information about the object (e.g., the distance to object 212) is determined by processing unit 108.

In this figure, LIDAR system 100 is connected to a host 210. Consistent with the present disclosure, the term "host" refers to any computing environment that may interface with LIDAR system 100, it may be a vehicle system (e.g., part of vehicle 110), a testing system, a security system, a surveillance system, a traffic control system, an urban modelling system, or any system that monitors its surroundings. Such computing environment may include at least one processor and/or may be connected LIDAR system 100 via the cloud. In some embodiments, host 210 may also include interfaces to external devices such as camera and sensors configured to measure different characteristics of host 210 (e.g., acceleration, steering wheel deflection, reverse drive, etc.). Consistent with the present disclosure, LIDAR system 100 may be fixed to a stationary object associated with host 210 (e.g., a building, a tripod) or to a portable system associated with host 210 (e.g., a portable computer, a movie camera). Consistent with the present disclosure, LIDAR system 100 may be connected to host 210, to provide outputs of LIDAR system 100 (e.g., a 3D model, a reflectivity image) to host 210. Specifically, host 210 may use LIDAR system 100 to aid in detecting and scanning the environment of host 210 or any other environment. In addition, host 210 may integrate, synchronize or otherwise use together the outputs of LIDAR system 100 with outputs of other sensing systems (e.g., cameras, microphones, radar systems). In one example, LIDAR system 100 may be used by a security system. An example of such an embodiment is described below with reference to FIG. 6D.

LIDAR system 100 may also include a bus 212 (or other communication mechanisms) that interconnect subsystems and components for transferring information within LIDAR system 100. Optionally, bus 212 (or another communication mechanism) may be used for interconnecting LIDAR system 100 with host 210. In the example of FIG. 2A, processing unit 108 includes two processors 118 to regulate the operation of projecting unit 102, scanning unit 104, and sensing unit 106 in a coordinated manner based, at least partially, on information received from internal feedback of LIDAR system 100. In other words, processing unit 108 may be configured to dynamically operate LIDAR system 100 in a closed loop. A closed loop system is characterized by having feedback from at least one of the elements and updating one or more parameters based on the received feedback. Moreover, a closed loop system may receive feedback and update its own operation, at least partially, based on that feedback. A dynamic system or element is one that may be updated during operation.

According to some embodiments, scanning the environment around LIDAR system 100 may include illuminating field of view 120 with light pulses. The light pulses may have parameters such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. Scanning the environment around LIDAR system 100 may also include detecting and characterizing various aspects of the reflected light. Characteristics of the reflected light may include, for example: time-of-flight (i.e., time from emission until detection), instantaneous power (e.g., power signature), average power across entire return pulse, and photon distribution/signal over return pulse period. By comparing characteristics of a light pulse with characteristics of corresponding reflections, a distance and possibly a physical characteristic, such as reflected intensity of object 212 may be estimated. By repeating this process across multiple adjacent portions 122, in a predefined pattern (e.g., raster, Lissajous or other patterns) an entire scan of field of view 120 may be achieved. As discussed below in greater detail, in some situations LIDAR system 100 may direct light to only some of the portions 122 in field of view 120 at every scanning cycle. These portions may be adjacent to each other, but not necessarily so.

In another embodiment, LIDAR system 100 may include network interface 214 for communicating with host 210 (e.g., a vehicle controller). The communication between LIDAR system 100 and host 210 is represented by a dashed arrow. In one embodiment, network interface 214 may include an integrated service digital network (ISDN) card, cable modem, satellite modem, or a modem to provide a data communication connection to a corresponding type of telephone line. As another example, network interface 214 may include a local area network (LAN) card to provide a data communication connection to a compatible LAN. In another embodiment, network interface 214 may include an Ethernet port connected to radio frequency receivers and transmitters and/or optical (e.g., infrared) receivers and transmitters. The specific design and implementation of network interface 214 depends on the communications network(s) over which LIDAR system 100 and host 210 are intended to operate. For example, network interface 214 may be used, for example, to provide outputs of LIDAR system 100 to the external system, such as a 3D model, operational parameters of LIDAR system 100, and so on. In other embodiment, the communication unit may be used, for example, to receive instructions from the external system, to receive information regarding the inspected environment, to receive information from another sensor, etc.

FIG. 2B illustrates an example of a monostatic configuration of LIDAR system 100 including a plurality projecting units 102. The term "monostatic configuration" broadly refers to LIDAR system configurations in which the projected light exiting from the LIDAR system and the reflected light entering the LIDAR system pass through substantially similar optical paths. In one example, the outbound light beam and the inbound light beam may share at least one optical assembly through which both outbound and inbound light beams pass. In another example, the outbound light may pass through an optical window (not shown) and the inbound light radiation may pass through the same optical window. A monostatic configuration may include a configuration where the scanning unit 104 includes a single light deflector 114 that directs the projected light towards field of view 120 and directs the reflected light towards a sensor 116. As shown, both projected light 204 and reflected light 206 hit an asymmetrical deflector 216. The term "asymmetrical deflector" refers to any optical device having two sides capable of deflecting a beam of light hitting it from one side in a different direction than it deflects a beam of light hitting it from the second side. In one example, the asymmetrical deflector does not deflect projected light 204 and deflects reflected light 206 towards sensor 116. One example of an asymmetrical deflector may include a polarization beam splitter. In another example, asymmetrical deflector 216 may include an optical isolator that allows the passage of light in only one direction. A diagrammatic representation of asymmetrical deflector 216 is illustrated in FIG. 2D. Consistent with the present disclosure, a monostatic configuration of LIDAR system 100 may include an asymmetrical deflector to prevent reflected light from hitting light source 112, and to direct all the reflected light toward sensor 116, thereby increasing detection sensitivity.

In the embodiment of FIG. 2B, LIDAR system 100 includes three projecting units 102 each with a single light source 112 aimed at a common light deflector 114. In one embodiment, the plurality of light sources 112 (including two or more light sources) may project light with substantially the same wavelength and each light source 112 is generally associated with a differing area of the field of view (denoted in the figure as 120A, 120B, and 120C). This enables scanning of a broader field of view than can be achieved with a light source 112. In another embodiment, the plurality of light sources 102 may project light with differing wavelengths, and all the light sources 112 may be directed to the same portion (or overlapping portions) of field of view 120.

FIG. 2C illustrates an example of LIDAR system 100 in which projecting unit 102 includes a primary light source 112A and a secondary light source 112B. Primary light source 112A may project light with a longer wavelength to which the human eye is not sensitive in order to optimize SNR and detection range. For example, primary light source 112A may project light with a wavelength between about 750 nm and 1100 nm. In contrast, secondary light source 112B may project light with a wavelength visible to the human eye. For example, secondary light source 112B may project light with a wavelength between about 400 nm and 700 nm. In one embodiment, secondary light source 112B may project light along substantially the same optical path the as light projected by primary light source 112A. Both light sources may be time-synchronized and may project light emission together or in interleaved pattern. An interleave pattern means that the light sources are not active at the same time which may mitigate mutual interference. A person who is of skill in the art would readily see that other combinations of wavelength ranges and activation schedules may also be implemented.

Consistent with some embodiments, secondary light source 112B may cause human eyes to blink when it is too close to the LIDAR optical output port. This may ensure an eye safety mechanism not feasible with typical laser sources that utilize the near-infrared light spectrum. In another embodiment, secondary light source 112B may be used for calibration and reliability at a point of service, in a manner somewhat similar to the calibration of headlights with a special reflector/pattern at a certain height from the ground with respect to vehicle 110. An operator at a point of service could examine the calibration of the LIDAR by simple visual inspection of the scanned pattern over a featured target such as a test pattern board at a designated distance from LIDAR system 100. In addition, secondary light source 112B may provide means for operational confidence that the LIDAR is working for the end-user. For example, the system may be configured to permit a human to place a hand in front of light deflector 114 to test its operation.

Secondary light source 112B may also have a non-visible element that can double as a backup system in case primary light source 112A fails. This feature may be useful for fail-safe devices with elevated functional safety ratings. Given that secondary light source 112B may be visible and also due to reasons of cost and complexity, secondary light source 112B may be associated with a smaller power compared to primary light source 112A. Therefore, in case of a failure of primary light source 112A, the system functionality will rely on the functionalities and capabilities of the secondary light source 112B. While the capabilities of secondary light source 112B may be inferior to the capabilities of primary light source 112A, LIDAR system 100 system may be designed in such a fashion to enable vehicle 110 to safely arrive at its destination.

FIG. 2D illustrates asymmetrical deflector 216 that may be part of LIDAR system 100. In the illustrated example, asymmetrical deflector 216 includes a reflective surface 218 (such as a mirror) and a one-way deflector 220. While not necessarily so, asymmetrical deflector 216 may optionally be a static deflector. Asymmetrical deflector 216 may be used in a monostatic configuration of LIDAR system 100, in order to allow a common optical path for transmission and for reception of light via the at least one deflector 114, e.g., as illustrated in FIGS. 2B and 2C. However, typical asymmetrical deflectors such as beam splitters are characterized by energy losses, especially in the reception path, which may be more sensitive to power loses than the transmission path.

As depicted in FIG. 2D, LIDAR system 100 may include asymmetrical deflector 216 positioned in the transmission path, which includes one-way deflector 220 for separating between the transmitted and received light signals. Optionally, one-way deflector 220 may be substantially transparent to the transmission light and substantially reflective to the received light. The transmitted light is generated by projecting unit 102 and may travel through one-way deflector 220 to scanning unit 104 which deflects it towards the optical outlet. The received light arrives through the optical inlet, to the at least one deflecting element 114, which deflects the reflections signal into a separate path away from the light source and towards sensing unit 106. Optionally, asymmetrical deflector 216 may be combined with a polarized light source 112 which is linearly polarized with the same polarization axis as one-way deflector 220. Notably, the cross-section of the outbound light beam is much smaller than that of the reflection signals. Accordingly, LIDAR system 100 may include one or more optical components (e.g., lens, collimator) for focusing or otherwise manipulating the emitted polarized light beam to the dimensions of the asymmetrical deflector 216. In one embodiment, one-way deflector 220 may be a polarizing beam splitter that is virtually transparent to the polarized light beam.

Consistent with some embodiments, LIDAR system 100 may further include optics 222 (e.g., a quarter wave plate retarder) for modifying a polarization of the emitted light. For example, optics 222 may modify a linear polarization of the emitted light beam to circular polarization. Light reflected back to system 100 from the field of view would arrive back through deflector 114 to optics 222, bearing a circular polarization with a reversed handedness with respect to the transmitted light. Optics 222 would then convert the received reversed handedness polarization light to a linear polarization that is not on the same axis as that of the polarized beam splitter 216. As noted above, the received light-patch is larger than the transmitted light-patch, due to optical dispersion of the beam traversing through the distance to the target.

Some of the received light will impinge on one-way deflector 220 that will reflect the light towards sensor 106 with some power loss. However, another part of the received patch of light will fall on a reflective surface 218 which surrounds one-way deflector 220 (e.g., polarizing beam splitter slit). Reflective surface 218 will reflect the light towards sensing unit 106 with substantially zero power loss. One-way deflector 220 would reflect light that is composed of various polarization axes and directions that will eventually arrive at the detector. Optionally, sensing unit 106 may include sensor 116 that is agnostic to the laser polarization, and is primarily sensitive to the amount of impinging photons at a certain wavelength range.

It is noted that the proposed asymmetrical deflector 216 provides far superior performance when compared to a simple mirror with a passage hole in it. In a mirror with a hole, all of the reflected light which reaches the hole is lost to the detector. However, in deflector 216, one-way deflector 220 deflects a significant portion of that light (e.g., about 50%) toward the respective sensor 116. In LIDAR systems, the number of photons reaching the LIDAR from remote distances is very limited, and therefore the improvement in photon capture rate is important.

According to some embodiments, a device for beam splitting and steering is described. A polarized beam may be emitted from a light source having a first polarization. The emitted beam may be directed to pass through a polarized beam splitter assembly. The polarized beam splitter assembly includes on a first side a one-directional slit and on an opposing side a mirror. The one-directional slit enables the polarized emitted beam to travel toward a quarter-waveplate/wave-retarder which changes the emitted signal from a circular polarization to a linear polarization (or vice versa) so that subsequently reflected beams cannot travel through the one-directional slit.

FIG. 2E shows an example of a bi-static configuration of LIDAR system 100 without scanning unit 104. In order to illuminate an entire field of view (or substantially the entire field of view) without deflector 114, projecting unit 102 may optionally include an array of light sources (e.g., 112A-112F). In one embodiment, the array of light sources may include a linear array of light sources controlled by processor 118. For example, processor 118 may cause the linear array of light sources to sequentially project collimated laser beams towards first optional optical window 124A. First optional optical window 124A may include a diffuser lens for spreading the projected light and sequentially forming wide horizontal and narrow vertical beams. Optionally, some or all of the at least one light source 112 of system 100 may project light concurrently. For example, processor 118 may cause the array of light sources to simultaneously project light beams from a plurality of non-adjacent light sources 112. In the depicted example, light source 112A, light source 112D, and light source 112F simultaneously project laser beams towards first optional optical window 124A thereby illuminating the field of view with three narrow vertical beams. The light beam from fourth light source 112D may reach an object in the field of view. The light reflected from the object may be captured by second optical window 124B and may be redirected to sensor 116. The configuration depicted in FIG. 2E is considered to be a bi-static configuration because the optical paths of the projected light and the reflected light are substantially different. It is noted that projecting unit 102 may also include a plurality of light sources 112 arranged in non-linear configurations, such as a two dimensional array, in hexagonal tiling, or in any other way.

FIG. 2F illustrates an example of a monostatic configuration of LIDAR system 100 without scanning unit 104. Similar to the example embodiment represented in FIG. 2E, in order to illuminate an entire field of view without deflector 114, projecting unit 102 may include an array of light sources (e.g., 112A-112F). But, in contrast to FIG. 2E, this configuration of LIDAR system 100 may include a single optical window 124 for both the projected light and for the reflected light. Using asymmetrical deflector 216, the reflected light may be redirected to sensor 116. The configuration depicted in FIG. 2E is considered to be a monostatic configuration because the optical paths of the projected light and the reflected light are substantially similar to one another. The term "substantially similar" in the context of the optical paths of the projected light and the reflected light means that the overlap between the two optical paths may be more than 80%, more than 85%, more than 90%, or more than 95%.

FIG. 2G illustrates an example of a bi-static configuration of LIDAR system 100. The configuration of LIDAR system 100 in this figure is similar to the configuration shown in FIG. 2A. For example, both configurations include a scanning unit 104 for directing projected light in the outbound direction toward the field of view. But, in contrast to the embodiment of FIG. 2A, in this configuration, scanning unit 104 does not redirect the reflected light in the inbound direction. Instead, the reflected light passes through second optical window 124B and enters sensor 116. The configuration depicted in FIG. 2G is considered to be a bi-static configuration because the optical paths of the projected light and the reflected light are substantially different from one another. The term "substantially different" in the context of the optical paths of the projected light and the reflected light means that the overlap between the two optical paths may be less than 10%, less than 5%, less than 1%, or less than 0.25%.

The Scanning Unit

Figure 3A:
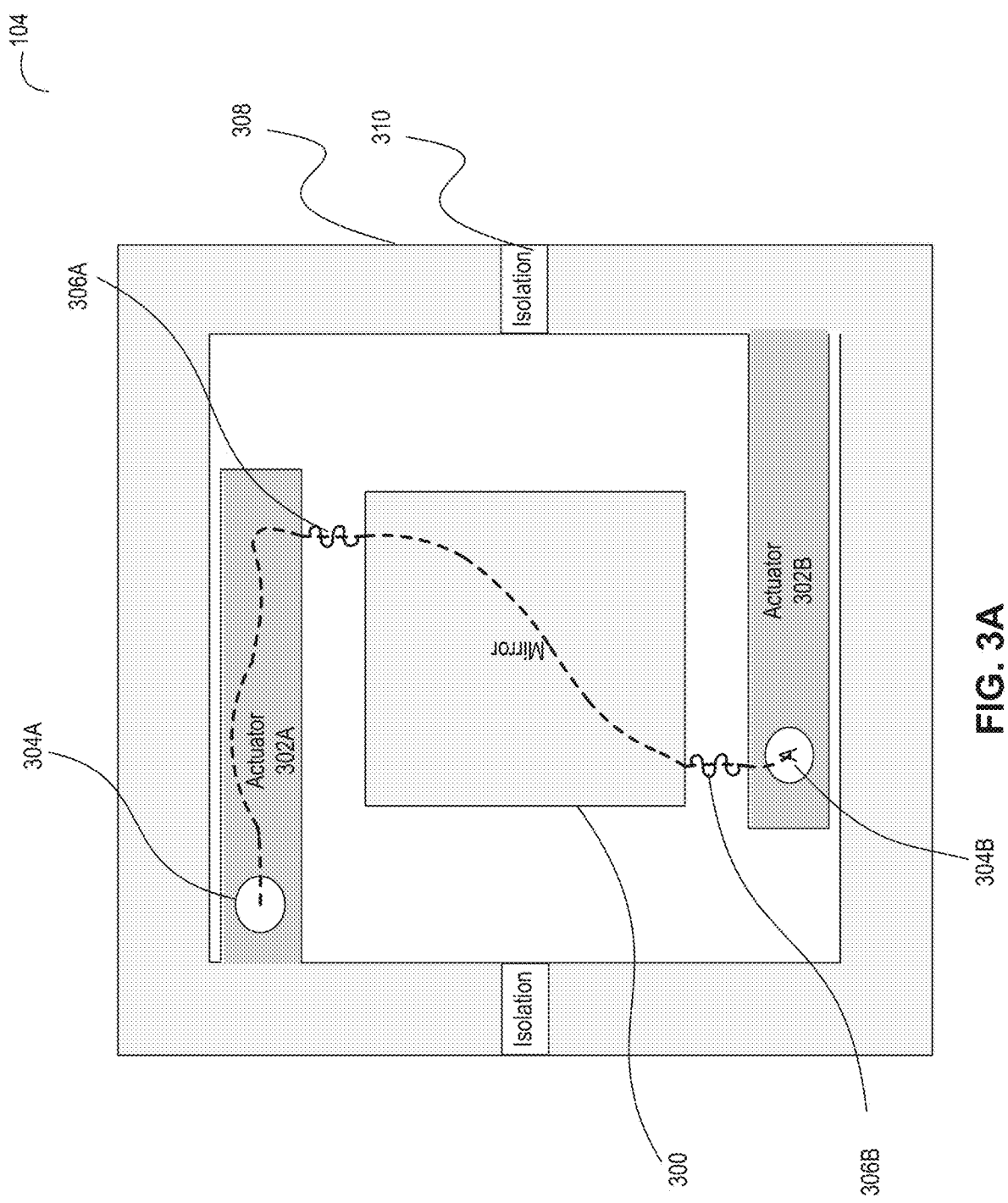
FIGS. 3A, 3B, 3C, and 3D are diagrams illustrating different configurations of scanning units in accordance with some embodiments of the present disclosure.
Figure 3B:
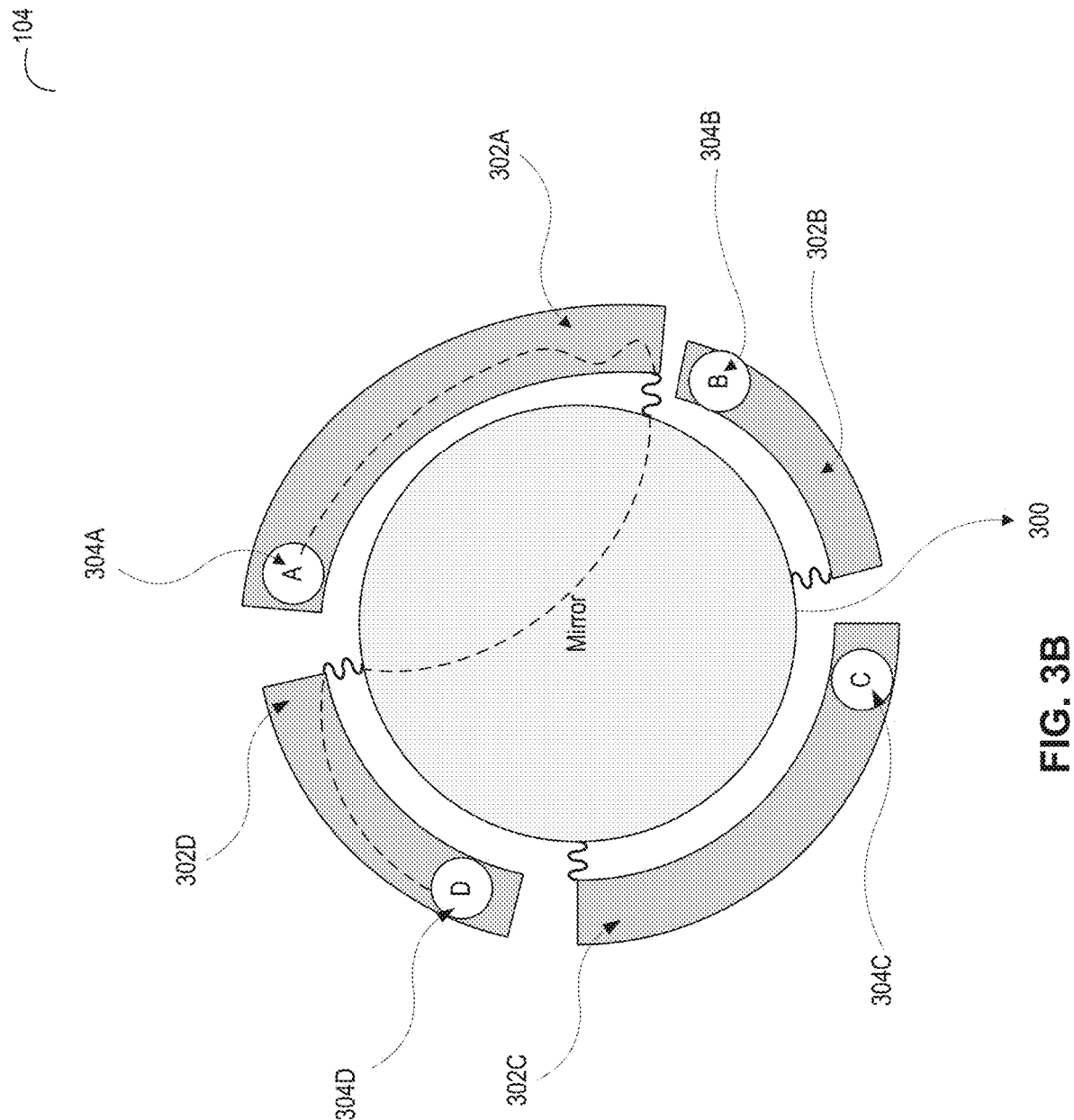
Figure 3C:
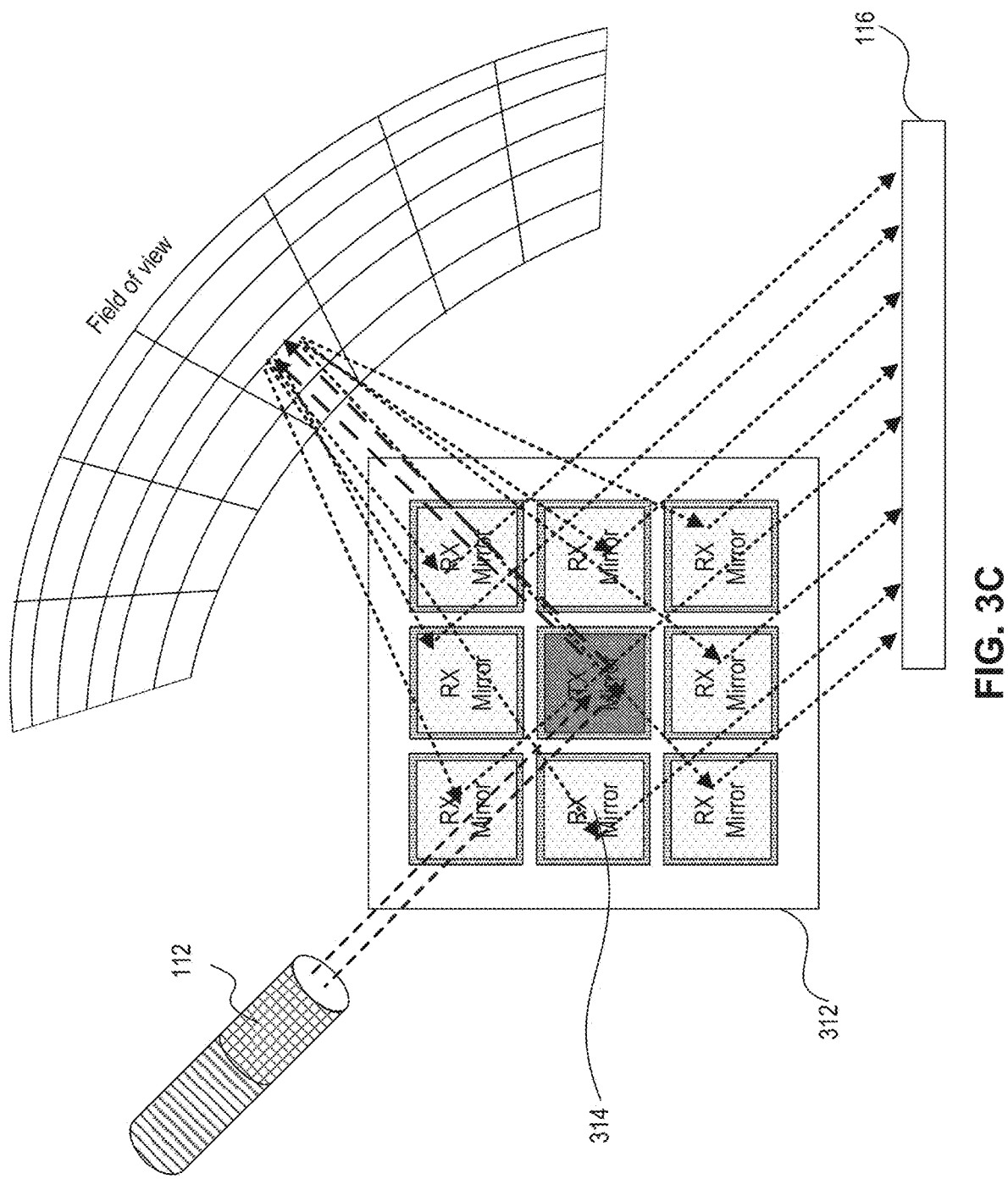
Figure 3D:
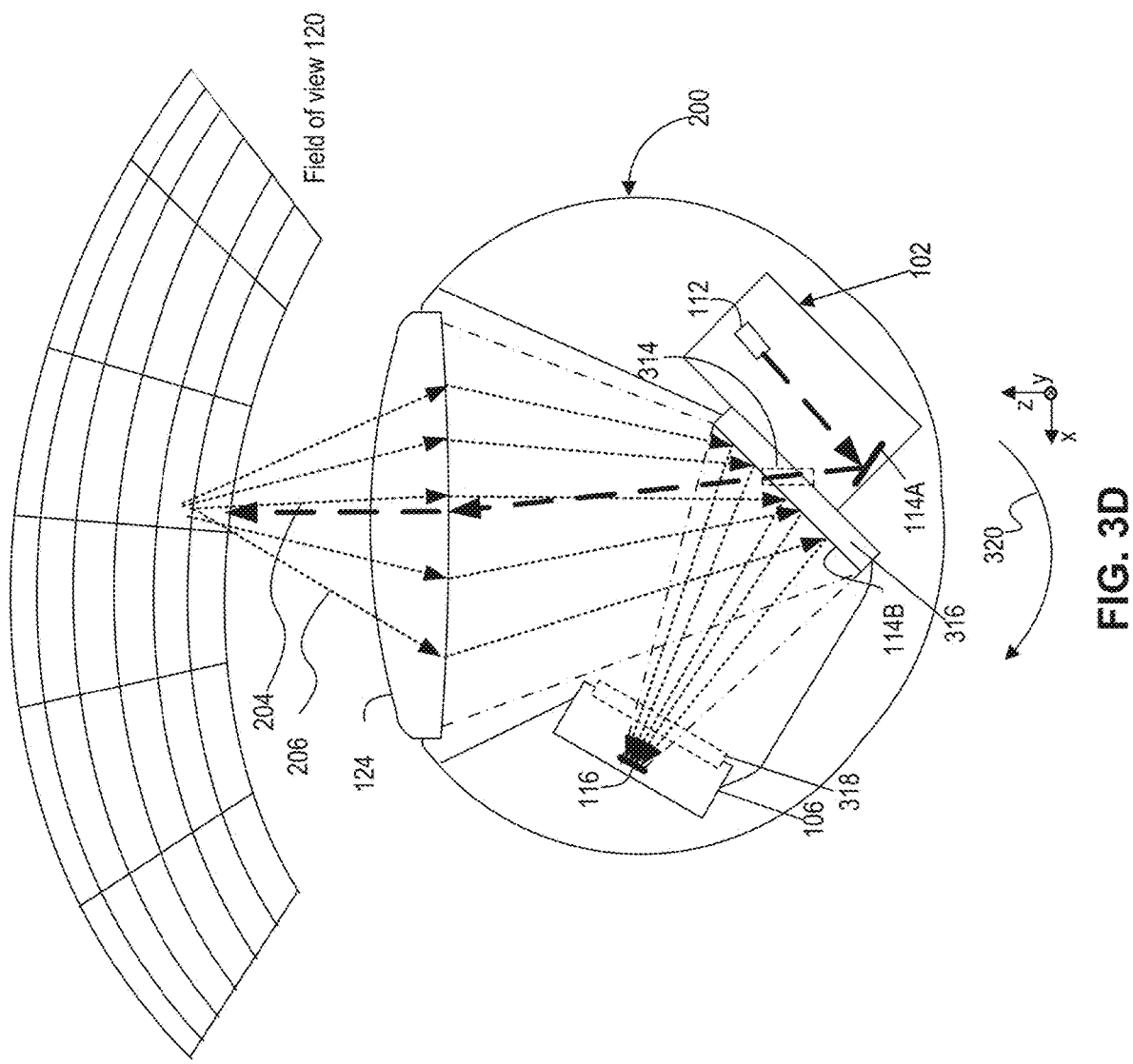

FIGS. 3A-3D depict various configurations of scanning unit 104 and its role in LIDAR system 100. Specifically, FIG. 3A is a diagram illustrating scanning unit 104 with a MEMS mirror (e.g., square shaped), FIG. 3B is a diagram illustrating another scanning unit 104 with a MEMS mirror (e.g., round shaped), FIG. 3C is a diagram illustrating scanning unit 104 with an array of reflectors used for monostatic scanning LIDAR system, and FIG. 3D is a diagram illustrating an example LIDAR system 100 that mechanically scans the environment around LIDAR system 100. One skilled in the art will appreciate that the depicted configurations of scanning unit 104 are exemplary only, and may have numerous variations and modifications within the scope of this disclosure.

FIG. 3A illustrates an example scanning unit 104 with a single axis square MEMS mirror 300. In this example MEMS mirror 300 functions as at least one deflector 114. As shown, scanning unit 104 may include one or more actuators 302 (specifically, 302A and 302B). In one embodiment, actuator 302 may be made of semiconductor (e.g., silicon) and includes a piezoelectric layer (e.g., PZT, Lead zirconate titanate, aluminum nitride), which changes its dimension in response to electric signals applied by an actuation controller, a semi conductive layer, and a base layer. In one embodiment, the physical properties of actuator 302 may determine the mechanical stresses that actuator 302 experiences when electrical current passes through it. When the piezoelectric material is activated, it exerts force on actuator 302 and causes it to bend. In one embodiment, the resistivity of one or more actuators 302 may be measured in an active state (Ractive) when mirror 300 is deflected at a certain angular position and compared to the resistivity at a resting state (Rrest). Feedback including Ractive may provide information to determine the actual mirror deflection angle compared to an expected angle, and, if needed, mirror 300 deflection may be corrected. The difference between Rrest and Ractive may be correlated by a mirror drive into an angular deflection value that may serve to close the loop. This embodiment may be used for dynamic tracking of the actual mirror position and may optimize response, amplitude, deflection efficiency, and frequency for both linear mode and resonant mode MEMS mirror schemes. This embodiment is described in greater detail below with reference to FIGS. 32-34.

During scanning, current (represented in the figure as the dashed line) may flow from contact 304A to contact 304B (through actuator 302A, spring 306A, mirror 300, spring 306B, and actuator 302B). Isolation gaps in semiconducting frame 308 such as isolation gap 310 may cause actuator 302A and 302B to be two separate islands connected electrically through springs 306 and frame 308. The current flow, or any associated electrical parameter (voltage, current frequency, capacitance, relative dielectric constant, etc.), may be controlled based on an associated scanner position feedback. In case of a mechanical failure—where one of the components is damaged—the current flow through the structure would alter and change from its functional calibrated values. At an extreme situation (for example, when a spring is broken), the current would stop completely due to a circuit break in the electrical chain by means of a faulty element.

FIG. 3B illustrates another example scanning unit 104 with a dual axis round MEMS mirror 300. In this example MEMS mirror 300 functions as at least one deflector 114. In one embodiment, MEMS mirror 300 may have a diameter of between about 1 mm to about 5 mm. As shown, scanning unit 104 may include four actuators 302 (302A, 302B, 302C, and 302D) each may be at a differing length. In the illustrated example, the current (represented in the figure as the dashed line) flows from contact 304A to contact 304D, but in other cases current may flow from contact 304A to contact 304B, from contact 304A to contact 304C, from contact 304B to contact 304C, from contact 304B to contact 304D, or from contact 304C to contact 304D. Consistent with some embodiments, a dual axis MEMS mirror may be configured to deflect light in a horizontal direction and in a vertical direction. For example, the angles of deflection of a dual axis MEMS mirror may be between about 0° to 30° in the vertical direction and between about 0° to 50° in the horizontal direction. One skilled in the art will appreciate that the depicted configuration of mirror 300 may have numerous variations and modifications. In one example, at least one deflector 114 may have a dual axis square-shaped mirror or single axis round-shaped mirror. Examples of round and square mirror are depicted in FIGS. 3A and 3B as examples only. Any shape may be employed depending on system specifications. In one embodiment, actuators 302 may be incorporated as an integral part of at least one deflector 114, such that power to move MEMS mirror 300 is applied directly towards it. In addition, MEMS mirror 300 may be connected to frame 308 by one or more rigid supporting elements. In another embodiment, at least one deflector 114 may include an electrostatic or electromagnetic MEMS mirror.

As described above, a monostatic scanning LIDAR system utilizes at least a portion of the same optical path for emitting projected light 204 and for receiving reflected light 206. The light beam in the outbound path may be collimated and focused into a narrow beam while the reflections in the return path spread into a larger patch of light, due to dispersion. In one embodiment, scanning unit 104 may have a large reflection area in the return path and asymmetrical deflector 216 that redirects the reflections (i.e., reflected light 206) to sensor 116. In one embodiment, scanning unit 104 may include a MEMS mirror with a large reflection area and negligible impact on the field of view and the frame rate performance. Additional details about the asymmetrical deflector 216 are provided below with reference to FIG. 2D.

In some embodiments (e.g., as exemplified in FIG. 3C), scanning unit 104 may include a deflector array (e.g., a reflector array) with small light deflectors (e.g., mirrors). In one embodiment, implementing light deflector 114 as a group of smaller individual light deflectors working in synchronization may allow light deflector 114 to perform at a high scan rate with larger angles of deflection. The deflector array may essentially act as a large light deflector (e.g., a large mirror) in terms of effective area. The deflector array may be operated using a shared steering assembly configuration that allows sensor 116 to collect reflected photons from substantially the same portion of field of view 120 being concurrently illuminated by light source 112. The term "concurrently" means that the two selected functions occur during coincident or overlapping time periods, either where one begins and ends during the duration of the other, or where a later one starts before the completion of the other.

FIG. 3C illustrates an example of scanning unit 104 with a reflector array 312 having small mirrors. In this embodiment, reflector array 312 functions as at least one deflector 114. Reflector array 312 may include a plurality of reflector units 314 configured to pivot (individually or together) and steer light pulses toward field of view 120. For example, reflector array 312 may be a part of an outbound path of light projected from light source 112. Specifically, reflector array 312 may direct projected light 204 towards a portion of field of view 120. Reflector array 312 may also be part of a return path for light reflected from a surface of an object located within an illumined portion of field of view 120. Specifically, reflector array 312 may direct reflected light 206 towards sensor 116 or towards asymmetrical deflector 216. In one example, the area of reflector array 312 may be between about 75 to about 150 mm$^2$, where each reflector units 314 may have a width of about 10 microns and the supporting structure may be lower than 100 microns.

According to some embodiments, reflector array 312 may include one or more sub-groups of steerable deflectors. Each sub-group of electrically steerable deflectors may include one or more deflector units, such as reflector unit 314. For example, each steerable deflector unit 314 may include at least one of a MEMS mirror, a reflective surface assembly, and an electromechanical actuator. In one embodiment, each reflector unit 314 may be individually controlled by an individual processor (not shown), such that it may tilt towards a specific angle along each of one or two separate axes. Alternatively, reflector array 312 may be associated with a common controller (e.g., processor 118) configured to synchronously manage the movement of reflector units 314 such that at least part of them will pivot concurrently and point in approximately the same direction.

In addition, at least one processor 118 may select at least one reflector unit 314 for the outbound path (referred to hereinafter as "TX Mirror") and a group of reflector units 314 for the return path (referred to hereinafter as "RX Mirror"). Consistent with the present disclosure, increasing the number of TX Mirrors may increase a reflected photons beam spread. Additionally, decreasing the number of RX Mirrors may narrow the reception field and compensate for ambient light conditions (such as clouds, rain, fog, extreme heat, and other environmental conditions) and improve the signal to noise ratio. Also, as indicated above, the emitted light beam is typically narrower than the patch of reflected light, and therefore can be fully deflected by a small portion of the deflection array. Moreover, it is possible to block light reflected from the portion of the deflection array used for transmission (e.g., the TX mirror) from reaching sensor 116, thereby reducing an effect of internal reflections of the LIDAR system 100 on system operation. In addition, at least one processor 118 may pivot one or more reflector units 314 to overcome mechanical impairments and drifts due, for example, to thermal and gain effects. In an example, one or more reflector units 314 may move differently than intended (frequency, rate, speed etc.) and their movement may be compensated for by electrically controlling the deflectors appropriately.

FIG. 3D illustrates an exemplary LIDAR system 100 that mechanically scans the environment of LIDAR system 100. In this example, LIDAR system 100 may include a motor or other mechanisms for rotating housing 200 about the axis of the LIDAR system 100. Alternatively, the motor (or other mechanism) may mechanically rotate a rigid structure of LIDAR system 100 on which one or more light sources 112 and one or more sensors 116 are installed, thereby scanning the environment. As described above, projecting unit 102 may include at least one light source 112 configured to project light emission. The projected light emission may travel along an outbound path towards field of view 120. Specifically, the projected light emission may be reflected by deflector 114A through an exit aperture 314 when projected light 204 travels towards optional optical window 124. The reflected light emission may travel along a return path from object 208 towards sensing unit 106. For example, the reflected light 206 may be reflected by deflector 114B when reflected light 206 travels towards sensing unit 106. A person skilled in the art would appreciate that a LIDAR system with a rotation mechanism for synchronically rotating multiple light sources or multiple sensors, may use this synchronized rotation instead of (or in addition to) steering an internal light deflector.

In embodiments in which the scanning of field of view 120 is mechanical, the projected light emission may be directed to exit aperture 314 that is part of a wall 316 separating projecting unit 102 from other parts of LIDAR system 100. In some examples, wall 316 can be formed from a transparent material (e.g., glass) coated with a reflective material to form deflector 114B. In this example, exit aperture 314 may correspond to the portion of wall 316 that is not coated by the reflective material. Additionally, or alternatively, exit aperture 314 may include a hole or cutaway in the wall 316. Reflected light 206 may be reflected by deflector 114B and directed towards an entrance aperture 318 of sensing unit 106. In some examples, an entrance aperture 318 may include a filtering window configured to allow wavelengths in a certain wavelength range to enter sensing unit 106 and attenuate other wavelengths. The reflections of object 208 from field of view 120 may be reflected by deflector 114B and hit sensor 116. By comparing several properties of reflected light 206 with projected light 204, at least one aspect of object 208 may be determined. For example, by comparing a time when projected light 204 was emitted by light source 112 and a time when sensor 116 received reflected light 206, a distance between object 208 and LIDAR system 100 may be determined. In some examples, other aspects of object 208, such as shape, color, material, etc. may also be determined.

In some examples, the LIDAR system 100 (or part thereof, including at least one light source 112 and at least one sensor 116) may be rotated about at least one axis to determine a three-dimensional map of the surroundings of the LIDAR system 100. For example, the LIDAR system 100 may be rotated about a substantially vertical axis as illustrated by arrow 320 in order to scan field of view 120. Although FIG. 3D illustrates that the LIDAR system 100 is rotated clockwise about the axis as illustrated by the arrow 320, additionally or alternatively, the LIDAR system 100 may be rotated in a counter-clockwise direction. In some examples, the LIDAR system 100 may be rotated 360 degrees about the vertical axis. In other examples, the LIDAR system 100 may be rotated back and forth along a sector smaller than 360-degree of the LIDAR system 100. For example, the LIDAR system 100 may be mounted on a platform that wobbles back and forth about the axis without making a complete rotation.

The Sensing Unit

Figure 4A:
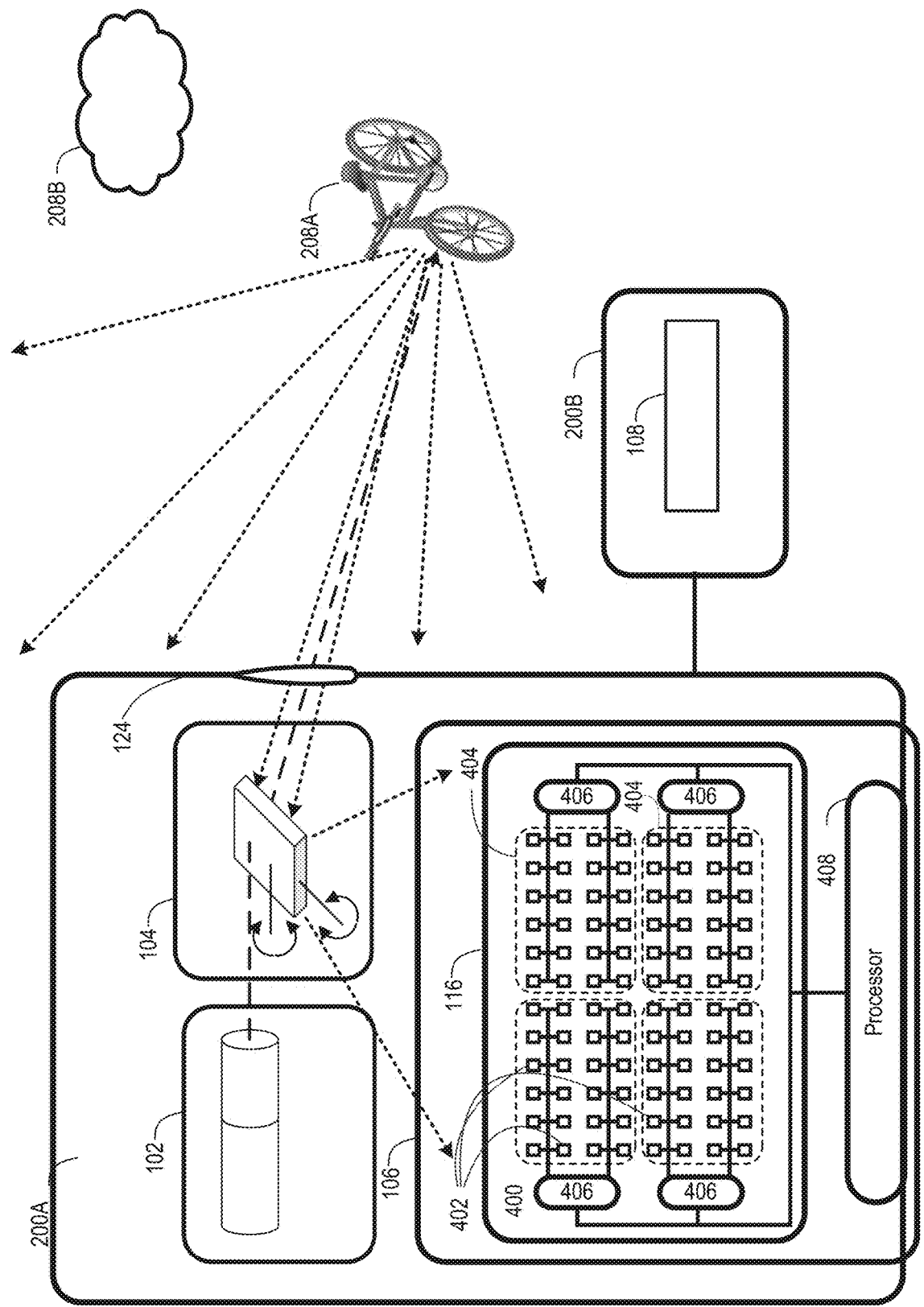
Figure 4C:
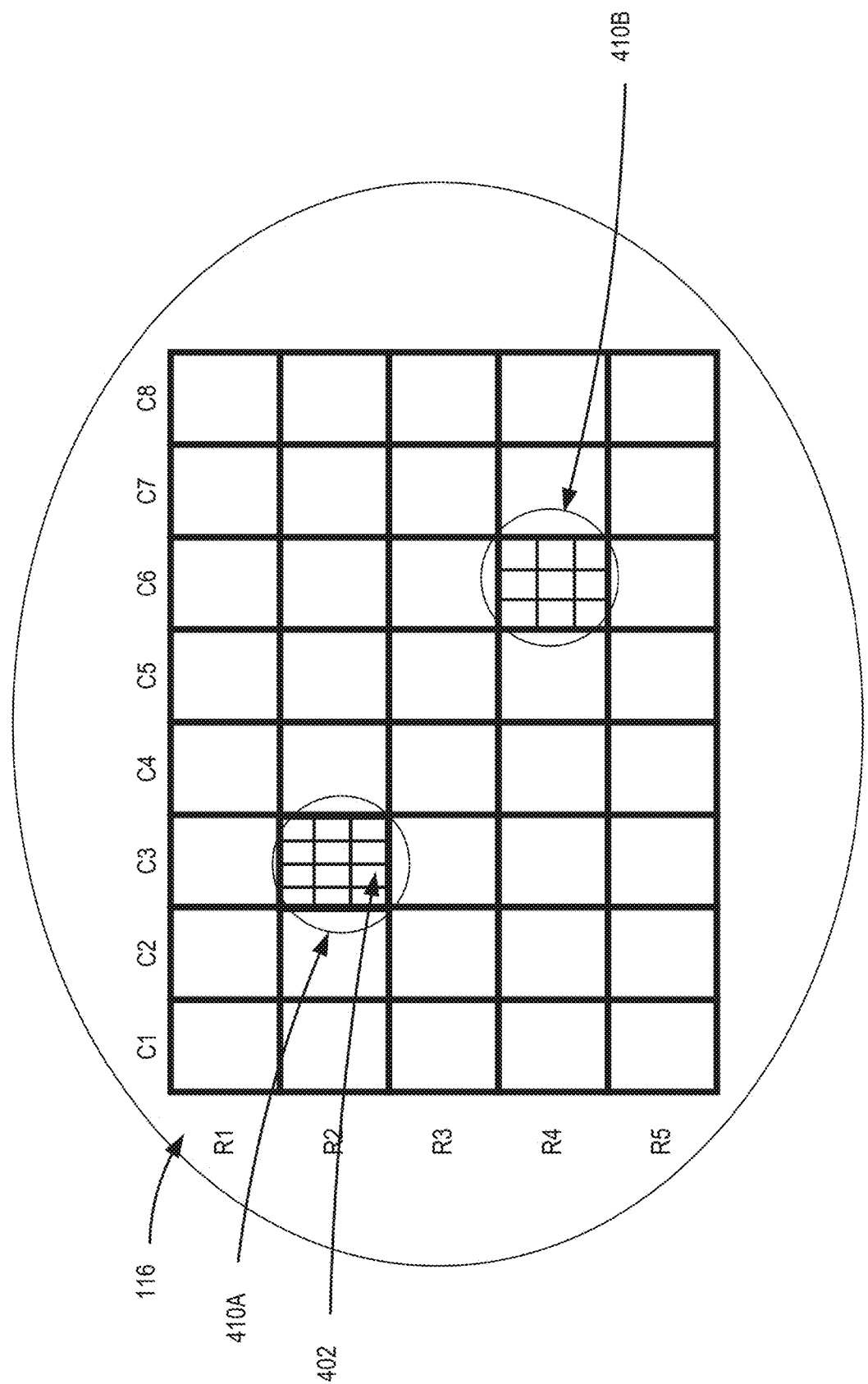
Figure 4D:
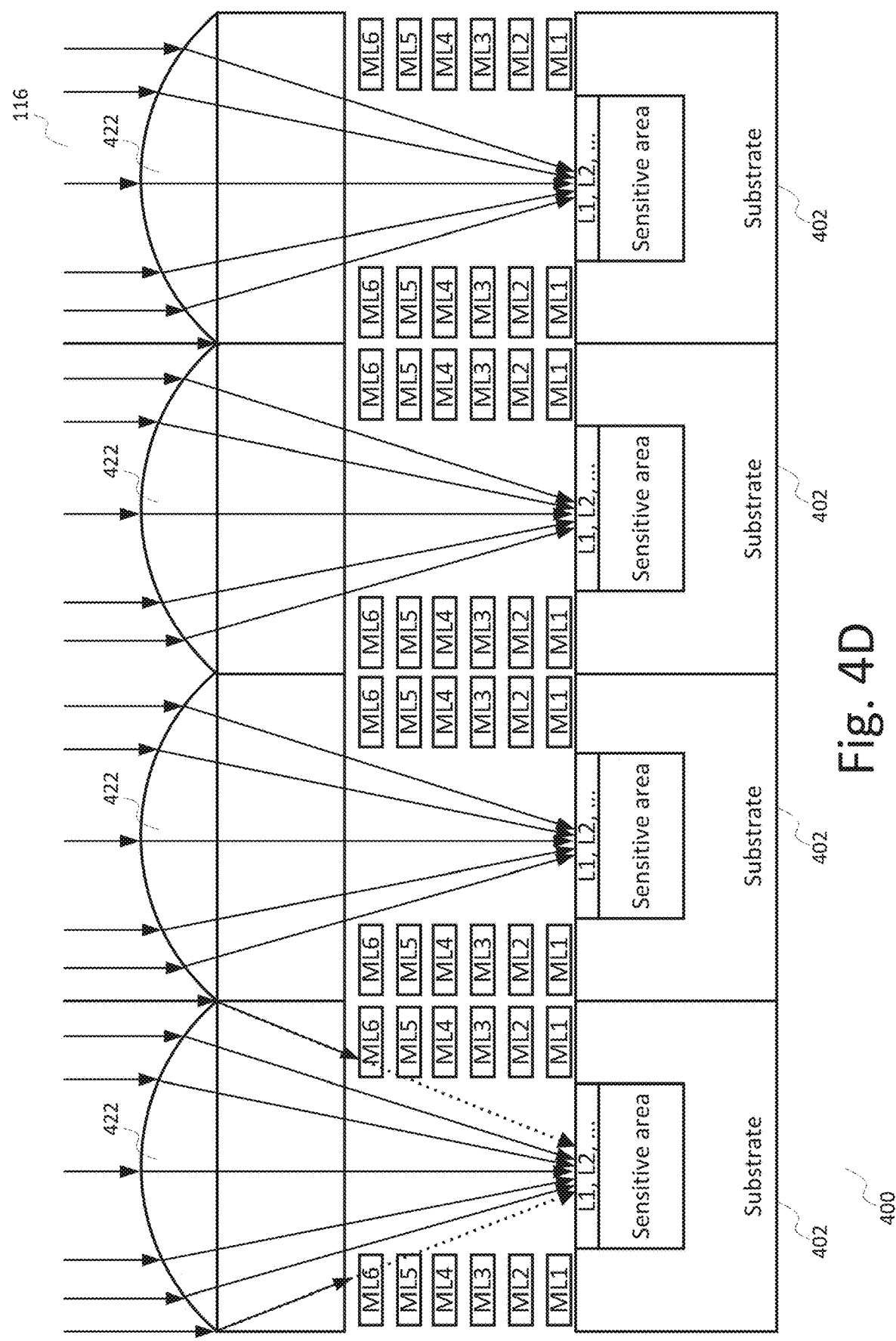

FIGS. 4A-4E depict various configurations of sensing unit 106 and its role in LIDAR system 100. Specifically, FIG. 4A is a diagram illustrating an example sensing unit 106 with a detector array, FIG. 4B is a diagram illustrating monostatic scanning using a two-dimensional sensor, FIG. 4C is a diagram illustrating an example of a two-dimensional sensor 116, FIG. 4D is a diagram illustrating a lens array associated with sensor 116, and FIG. 4E includes three diagram illustrating the lens structure. One skilled in the art will appreciate that the depicted configurations of sensing unit 106 are exemplary only and may have numerous alternative variations and modifications consistent with the principles of this disclosure.

FIG. 4A illustrates an example of sensing unit 106 with detector array 400. In this example, at least one sensor 116 includes detector array 400. LIDAR system 100 is configured to detect objects (e.g., bicycle 208A and cloud 208B) in field of view 120 located at different distances from LIDAR system 100 (could be meters or more). Objects 208 may be a solid object (e.g., a road, a tree, a car, a person), fluid object (e.g., fog, water, atmosphere particles), or object of another type (e.g., dust or a powdery illuminated object). When the photons emitted from light source 112 hit object 208 they either reflect, refract, or get absorbed. Typically, as shown in the figure, only a portion of the photons reflected from object 208A enters optional optical window 124. As each ~15 cm change in distance results in a travel time difference of 1 ns (since the photons travel at the speed of light to and from object 208), the time differences between the travel times of different photons hitting the different objects may be detectable by a time-of-flight sensor with sufficiently quick response.

Sensor 116 includes a plurality of detection elements 402 for detecting photons of a photonic pulse reflected back from field of view 120. The detection elements may all be included in detector array 400, which may have a rectangular arrangement (e.g., as shown) or any other arrangement. Detection elements 402 may operate concurrently or partially concurrently with each other. Specifically, each detection element 402 may issue detection information for every sampling duration (e.g., every 1 nanosecond). In one example, detector array 400 may be a SiPM (Silicon photomultipliers) which is a solid-state single-photon-sensitive device built from an array of single photon avalanche diodes (SPADs, serving as detection elements 402) on a common silicon substrate. Similar photomultipliers from other, non-silicon materials may also be used. Although a SiPM device works in digital/switching mode, the SiPM is an analog device because all the microcells are read in parallel, making it possible to generate signals within a dynamic range from a single photon to hundreds and thousands of photons detected by the different SPADs. As mentioned above, more than one type of sensor may be implemented (e.g., SiPM and APD). Possibly, sensing unit 106 may include at least one APD integrated into an SiPM array and/or at least one APD detector located next to a SiPM on a separate or common silicon substrate.

In one embodiment, detection elements 402 may be grouped into a plurality of regions 404. The regions are geometrical locations or environments within sensor 116 (e.g., within detector array 400)—and may be shaped in different shapes (e.g., rectangular as shown, squares, rings, and so on, or in any other shape). While not all of the individual detectors, which are included within the geometrical area of a region 404, necessarily belong to that region, in most cases they will not belong to other regions 404 covering other areas of the sensor 310—unless some overlap is desired in the seams between regions. As illustrated in FIG. 4A, the regions may be non-overlapping regions 404, but alternatively, they may overlap. Every region may be associated with a regional output circuitry 406 associated with that region. The regional output circuitry 406 may provide a region output signal of a corresponding group of detection elements 402. For example, the regional output circuitry 406 may be a summing circuit, but other forms of combined output of the individual detector into a unitary output (whether scalar, vector, or any other format) may be employed. Optionally, each region 404 is a single SiPM, but this is not necessarily so, and a region may be a sub-portion of a single SiPM, a group of several SiPMs, or even a combination of different types of detectors.

In the illustrated example, processing unit 108 is located at a separated housing 200B (within or outside) host 210 (e.g., within vehicle 110), and sensing unit 106 may include a dedicated processor 408 for analyzing the reflected light. Alternatively, processing unit 108 may be used for analyzing reflected light 206. It is noted that LIDAR system 100 may be implemented multiple housings in other ways than the illustrated example. For example, light deflector 114 may be located in a different housing than projecting unit 102 and/or sensing module 106. In one embodiment, LIDAR system 100 may include multiple housings connected to each other in different ways, such as: electric wire connection, wireless connection (e.g., RF connection), fiber optics cable, and any combination of the above.

In one embodiment, analyzing reflected light 206 may include determining a time of flight for reflected light 206, based on outputs of individual detectors of different regions. Optionally, processor 408 may be configured to determine the time of flight for reflected light 206 based on the plurality of regions of output signals. In addition to the time of flight, processing unit 108 may analyze reflected light 206 to determine the average power across an entire return pulse, and the photon distribution/signal may be determined over the return pulse period ("pulse shape"). In the illustrated example, the outputs of any detection elements 402 may not be transmitted directly to processor 408, but rather combined (e.g., summed) with signals of other detectors of the region 404 before being passed to processor 408. However, this is only an example and the circuitry of sensor 116 may transmit information from a detection element 402 to processor 408 via other routes (not via a region output circuitry 406).

FIG. 4B is a diagram illustrating LIDAR system 100 configured to scan the environment of LIDAR system 100 using a two-dimensional sensor 116. In the example of FIG. 4B, sensor 116 is a matrix of 4×6 detectors 410 (also referred to as "pixels"). In one embodiment, a pixel size may be about 1×1 mm. Sensor 116 is two-dimensional in the sense that it has more than one set (e.g., row, column) of detectors 410 in two non-parallel axes (e.g., orthogonal axes, as exemplified in the illustrated examples). The number of detectors 410 in sensor 116 may vary between differing implementations, e.g., depending on the desired resolution, signal to noise ratio (SNR), desired detection distance, and so on. For example, sensor 116 may have anywhere between 5 and 5,000 pixels. In another example (not shown in the figure), sensor 116 may be a one-dimensional matrix (e.g., 1×8 pixels).

It is noted that each detector 410 may include a plurality of detection elements 402, such as Avalanche Photo Diodes (APD), Single Photon Avalanche Diodes (SPADs), combination of Avalanche Photo Diodes (APD) and Single Photon Avalanche Diodes (SPADs) or detecting elements that measure both the time of flight from a laser pulse transmission event to the reception event and the intensity of the received photons. For example, each detector 410 may include anywhere between 20 and 5,000 SPADs. The outputs of detection elements 402 in each detector 410 may be summed, averaged, or otherwise combined to provide a unified pixel output.

In the illustrated example, sensing unit 106 may include a two-dimensional sensor 116 (or a plurality of two-dimensional sensors 116), whose field of view is smaller than field of view 120 of LIDAR system 100. In this discussion, field of view 120 (the overall field of view which can be scanned by LIDAR system 100 without moving, rotating or rolling in any direction) is denoted "first FOV 412", and the smaller FOV of sensor 116 is denoted "second FOV 414" (interchangeably "instantaneous FOV"). The coverage area of second FOV 414 relative to the first FOV 412 may differ, depending on the specific use of LIDAR system 100, and may be, for example, between 0.5% and 50%. In one example, second FOV 414 may be between about 0.05° and 1° elongated in the vertical dimension. Even if LIDAR system 100 includes more than one two-dimensional sensor 116, the combined field of view of the sensors array may still be smaller than the first FOV 412, e.g., by a factor of at least 5, by a factor of at least 10, by a factor of at least 20, or by a factor of at least 50, for example.

In order to cover first FOV 412, scanning unit 106 may direct photons arriving from different parts of the environment to sensor 116 at different times. In the illustrated monostatic configuration, together with directing projected light 204 towards field of view 120 and when at least one light deflector 114 is located in an instantaneous position, scanning unit 106 may also direct reflected light 206 to sensor 116. Typically, at every moment during the scanning of first FOV 412, the light beam emitted by LIDAR system 100 covers part of the environment which is larger than the second FOV 414 (in angular opening) and includes the part of the environment from which light is collected by scanning unit 104 and sensor 116.

FIG. 4C is a diagram illustrating an example of a two-dimensional sensor 116. In this embodiment, sensor 116 is a matrix of 8×5 detectors 410 and each detector 410 includes a plurality of detection elements 402. In one example, detector 410A is located in the second row (denoted "R2") and third column (denoted "C3") of sensor 116, which includes a matrix of 4×3 detection elements 402. In another example, detector 410B located in the fourth row (denoted "R4") and sixth column (denoted "C6") of sensor 116 includes a matrix of 3×3 detection elements 402. Accordingly, the number of detection elements 402 in each detector 410 may be constant, or may vary, and differing detectors 410 in a common array may have a different number of detection elements 402. The outputs of all detection elements 402 in each detector 410 may be summed, averaged, or otherwise combined to provide a single pixel-output value. It is noted that while detectors 410 in the example of FIG. 4C are arranged in a rectangular matrix (straight rows and straight columns), other arrangements may also be used, e.g., a circular arrangement or a honeycomb arrangement.

According to some embodiments, measurements from each detector 410 may enable determination of the time of flight from a light pulse emission event to the reception event and the intensity of the received photons. The reception event may be the result of the light pulse being reflected from object 208. The time of flight may be a timestamp value that represents the distance of the reflecting object to optional optical window 124. Time of flight values may be realized by photon detection and counting methods, such as Time Correlated Single Photon Counters (TCSPC), analog methods for photon detection such as signal integration and qualification (via analog to digital converters or plain comparators) or otherwise.

In some embodiments and with reference to FIG. 4B, during a scanning cycle, each instantaneous position of at least one light deflector 114 may be associated with a particular portion 122 of field of view 120. The design of sensor 116 enables an association between the reflected light from a single portion of field of view 120 and multiple detectors 410. Therefore, the scanning resolution of LIDAR system may be represented by the number of instantaneous positions (per scanning cycle) times the number of detectors 410 in sensor 116. The information from each detector 410 (i.e., each pixel) represents the basic data element from which the captured field of view in the three-dimensional space is built. This may include, for example, the basic element of a point cloud representation, with a spatial position and an associated reflected intensity value. In one embodiment, the reflections from a single portion of field of view 120 that are detected by multiple detectors 410 may be returning from different objects located in the single portion of field of view 120. For example, the single portion of field of view 120 may be greater than 50×50 cm at the far field, which can easily include two, three, or more objects partly covered by each other.

FIG. 4D is a crosscut diagram of a part of sensor 116, in accordance with examples of the presently disclosed subject matter. The illustrated part of sensor 116 includes a part of a detector array 400 which includes four detection elements 402 (e.g., four SPADs, four APDs). Detector array 400 may be a photodetector sensor realized in complementary metal-oxide-semiconductor (CMOS). Each of the detection elements 402 has a sensitive area, which is positioned within a substrate surrounding. While not necessarily so, sensor 116 may be used in a monostatic LiDAR system having a narrow field of view (e.g., because scanning unit 104 scans different parts of the field of view at different times). The narrow field of view for the incoming light beam—if implemented—eliminates the problem of out-of-focus imaging. As exemplified in FIG. 4D, sensor 116 may include a plurality of lenses 422 (e.g., microlenses), each lens 422 may direct incident light toward a different detection element 402 (e.g., toward an active area of detection element 402), which may be usable when out-of-focus imaging is not an issue. Lenses 422 may be used for increasing an optical fill factor and sensitivity of detector array 400, because most of the light that reaches sensor 116 may be deflected toward the active areas of detection elements 402

Detector array 400, as exemplified in FIG. 4D, may include several layers built into the silicon substrate by various methods (e.g., implant) resulting in a sensitive area, contact elements to the metal layers and isolation elements (e.g., shallow trench implant STI, guard rings, optical trenches, etc.). The sensitive area may be a volumetric element in the CMOS detector that enables the optical conversion of incoming photons into a current flow given an adequate voltage bias is applied to the device. In the case of an APD/SPAD, the sensitive area would be a combination of an electrical field that pulls electrons created by photon absorption towards a multiplication area where a photon induced electron is amplified creating a breakdown avalanche of multiplied electrons.

A front side illuminated detector (e.g., as illustrated in FIG. 4D) has the input optical port at the same side as the metal layers residing on top of the semiconductor (Silicon). The metal layers are required to realize the electrical connections of each individual photodetector element (e.g., anode and cathode) with various elements such as: bias voltage, quenching/ballast elements, and other photodetectors in a common array. The optical port through which the photons impinge upon the detector sensitive area is comprised of a passage through the metal layer. It is noted that passage of light from some directions through this passage may be blocked by one or more metal layers (e.g., metal layer ML6, as illustrated for the leftmost detector elements 402 in FIG. 4D). Such blockage reduces the total optical light absorbing efficiency of the detector.

Figure 4E:
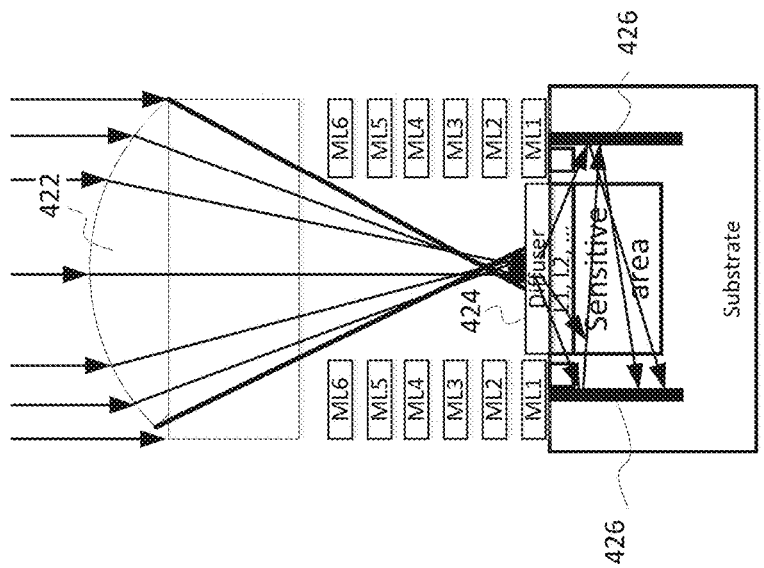
Figure 4E:
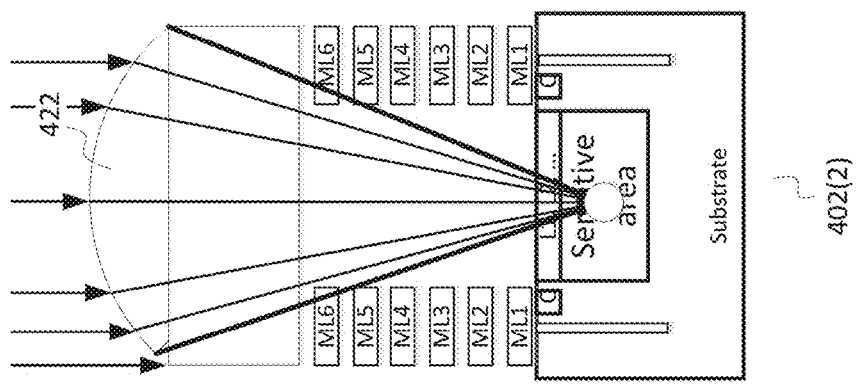
Figure 4E:
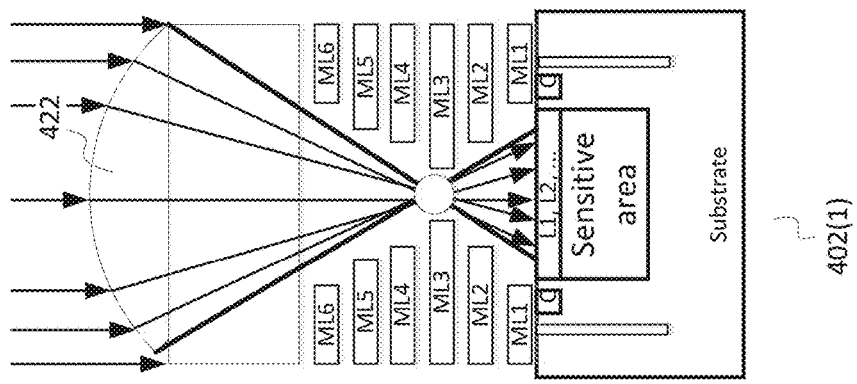

FIG. 4E illustrates three detection elements 402, each with an associated lens 422, in accordance with examples of the presently disclosed subject matter. Each of the three detection elements of FIG. 4E, denoted 402(1), 402(2), and 402(3), illustrates a lens configuration which may be implemented in associated with one or more of the detecting elements 402 of sensor 116. It is noted that combinations of these lens configurations may also be implemented.

In the lens configuration illustrated with regards to detection element 402(1), a focal point of the associated lens 422 may be located above the semiconductor surface. Optionally, openings in different metal layers of the detection element may have different sizes aligned with the cone of focusing light generated by the associated lens 422. Such a structure may improve the signal-to-noise and resolution of the array 400 as a whole device. Large metal layers may be important for delivery of power and ground shielding. This approach may be useful, e.g., with a monostatic LiDAR design with a narrow field of view where the incoming light beam is comprised of parallel rays and the imaging focus does not have any consequence to the detected signal.

In the lens configuration illustrated with regards to detection element 402(2), an efficiency of photon detection by the detection elements 402 may be improved by identifying a sweet spot. Specifically, a photodetector implemented in CMOS may have a sweet spot in the sensitive volume area where the probability of a photon creating an avalanche effect is the highest. Therefore, a focal point of lens 422 may be positioned inside the sensitive volume area at the sweet spot location, as demonstrated by detection elements 402(2). The lens shape and distance from the focal point may take into account the refractive indices of all the elements the laser beam is passing along the way from the lens to the sensitive sweet spot location buried in the semiconductor material.

In the lens configuration illustrated with regards to the detection element on the right of FIG. 4E, an efficiency of photon absorption in the semiconductor material may be improved using a diffuser and reflective elements. Specifically, a near IR wavelength requires a significantly long path of silicon material in order to achieve a high probability of absorbing a photon that travels through. In a typical lens configuration, a photon may traverse the sensitive area and may not be absorbed into a detectable electron. A long absorption path that improves the probability for a photon to create an electron renders the size of the sensitive area towards less practical dimensions (tens of um for example) for a CMOS device fabricated with typical foundry processes. The rightmost detector element in FIG. 4E demonstrates a technique for processing incoming photons. The associated lens 422 focuses the incoming light onto a diffuser element 424. In one embodiment, light sensor 116 may further include a diffuser located in the gap distant from the outer surface of at least some of the detectors. For example, diffuser 424 may steer the light beam sideways (e.g., as perpendicular as possible) towards the sensitive area and the reflective optical trenches 426. The diffuser is located at the focal point, above the focal point, or below the focal point. In this embodiment, the incoming light may be focused on a specific location where a diffuser element is located. Optionally, detector element 422 is designed to optically avoid the inactive areas where a photon induced electron may get lost and reduce the effective detection efficiency. Reflective optical trenches 426 (or other forms of optically reflective structures) cause the photons to bounce back and forth across the sensitive area, thus increasing the likelihood of detection. Ideally, the photons will get trapped in a cavity consisting of the sensitive area and the reflective trenches indefinitely until the photon is absorbed and creates an electron/hole pair.

Consistent with the present disclosure, a long path is created for the impinging photons to be absorbed and contribute to a higher probability of detection. Optical trenches may also be implemented in detecting element 422 for reducing cross talk effects of parasitic photons created during an avalanche that may leak to other detectors and cause false detection events. According to some embodiments, a photo detector array may be optimized so that a higher yield of the received signal is utilized, meaning, that as much of the received signal is received and less of the signal is lost to internal degradation of the signal. The photo detector array may be improved by: (a) moving the focal point at a location above the semiconductor surface, optionally by designing the metal layers above the substrate appropriately; (b) by steering the focal point to the most responsive/sensitive area (or "sweet spot") of the substrate and (c) adding a diffuser above the substrate to steer the signal toward the "sweet spot" and/or adding reflective material to the trenches so that deflected signals are reflected back to the "sweet spot."

While in some lens configurations, lens 422 may be positioned so that its focal point is above a center of the corresponding detection element 402, it is noted that this is not necessarily so. In other lens configuration, a position of the focal point of the lens 422 with respect to a center of the corresponding detection element 402 is shifted based on a distance of the respective detection element 402 from a center of the detection array 400. This may be useful in relatively larger detection arrays 400, in which detector elements further from the center receive light in angles which are increasingly off-axis. Shifting the location of the focal points (e.g., toward the center of detection array 400) allows correcting for the incidence angles. Specifically, shifting the location of the focal points (e.g., toward the center of detection array 400) allows correcting for the incidence angles while using substantially identical lenses 422 for all detection elements, which are positioned at the same angle with respect to a surface of the detector.

Adding an array of lenses 422 to an array of detection elements 402 may be useful when using a relatively small sensor 116 which covers only a small part of the field of view because in such a case, the reflection signals from the scene reach the detectors array 400 from substantially the same angle, and it is, therefore, easy to focus all the light onto individual detectors. It is also noted, that in one embodiment, lenses 422 may be used in LIDAR system 100 to prioritize the overall probability of detection of the entire array 400 (preventing photons from being "wasted" in the dead area between detectors/sub-detectors) at the expense of spatial distinctiveness. This embodiment is in contrast to prior art implementations such as CMOS RGB camera, which prioritize spatial distinctiveness (i.e., light that propagates in the direction of detection element A is not allowed to be directed by the lens toward detection element B, that is, to "bleed" to another detection element of the array). Optionally, sensor 116 includes an array of lenses 422, each being correlated to a corresponding detection element 402, while at least one of the lenses 422 deflects light which propagates to a first detection element 402 toward a second detection element 402 (thereby it may increase the overall probability of detection of the entire array).

Specifically, consistent with some embodiments of the present disclosure, light sensor 116 may include an array of light detectors (e.g., detector array 400), each light detector (e.g., detector 410) being configured to cause an electric current to flow when light passes through an outer surface of a respective detector. In addition, light sensor 116 may include at least one micro-lens configured to direct light toward the array of light detectors, the at least one micro-lens having a focal point. Light sensor 116 may further include at least one layer of conductive material interposed between the at least one micro-lens and the array of light detectors and having a gap therein to permit light to pass from the at least one micro-lens to the array, the at least one layer being sized to maintain a space between the at least one micro-lens and the array to cause the focal plane to be located in the gap, at a location spaced from the detecting surfaces of the array of light detectors.

In related embodiments, each detector may include a plurality of Single Photon Avalanche Diodes (SPADs) or a plurality of Avalanche Photo Diodes (APD). The conductive material may be a multi-layer metal constriction, and the at least one layer of conductive material may be electrically connected to detectors in the array. In one example, the at least one layer of conductive material includes a plurality of layers. In addition, the gap may be shaped to converge from the at least one micro-lens toward the focal point, and to diverge from a region of the focal point toward the array. In other embodiments, light sensor 116 may further include at least one reflector adjacent each photo detector. In one embodiment, a plurality of micro-lenses may be arranged in a lens array and the plurality of detectors may be arranged in a detector array. In another embodiment, the plurality of micro-lenses may include a single lens configured to project light to a plurality of detectors in the array.

Referring by way of a nonlimiting example to FIGS. 2E, 2F and 2G, it is noted that the one or more sensors 116 of system 100 may receive light from a scanning deflector 114 or directly from the FOV without scanning. Even if light from the entire FOV arrives to the at least one sensor 116 at the same time, in some implementations the one or more sensors 116 may sample only parts of the FOV for detection output at any given time. For example, if the illumination of projection unit 102 illuminates different parts of the FOV at different times (whether using a deflector 114 and/or by activating different light sources 112 at different times), light may arrive at all of the pixels or sensors 116 of sensing unit 106, and only pixels/sensors which are expected to detect the LIDAR illumination may be actively collecting data for detection outputs. This way, the rest of the pixels/sensors do not unnecessarily collect ambient noise. Referring to the scanning—in the outbound or in the inbound directions—it is noted that substantially different scales of scanning may be implemented. For example, in some implementations the scanned area may cover 1‰ or 0.1‰ of the FOV, while in other implementations the scanned area may cover 10% or 25% of the FOV. All other relative portions of the FOV values may also be implemented, of course.

The Processing Unit

Figure 5A:
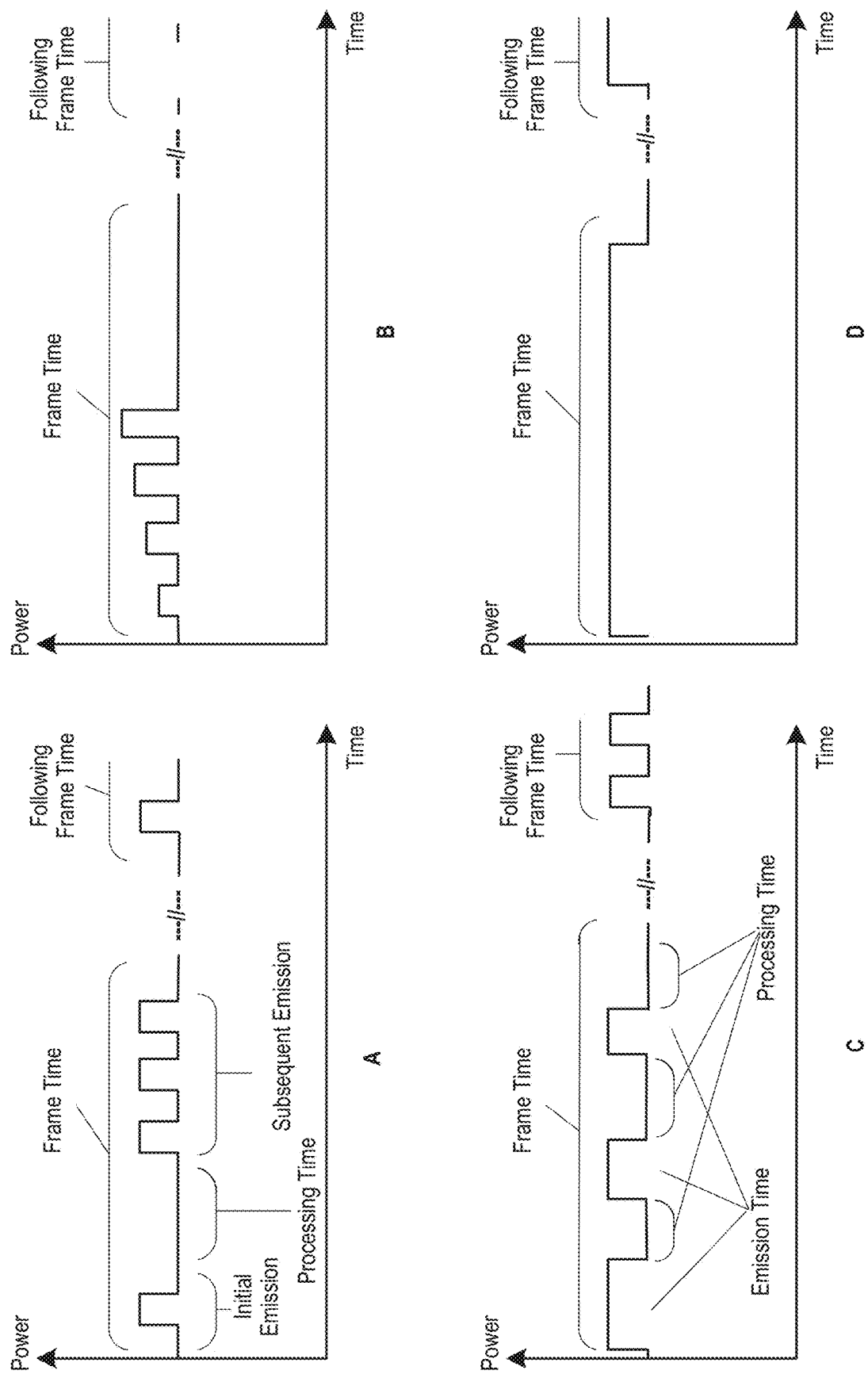
FIG. 5A includes four example diagrams illustrating emission patterns in a single frame-time for a single portion of the field of view.
Figure 5B:
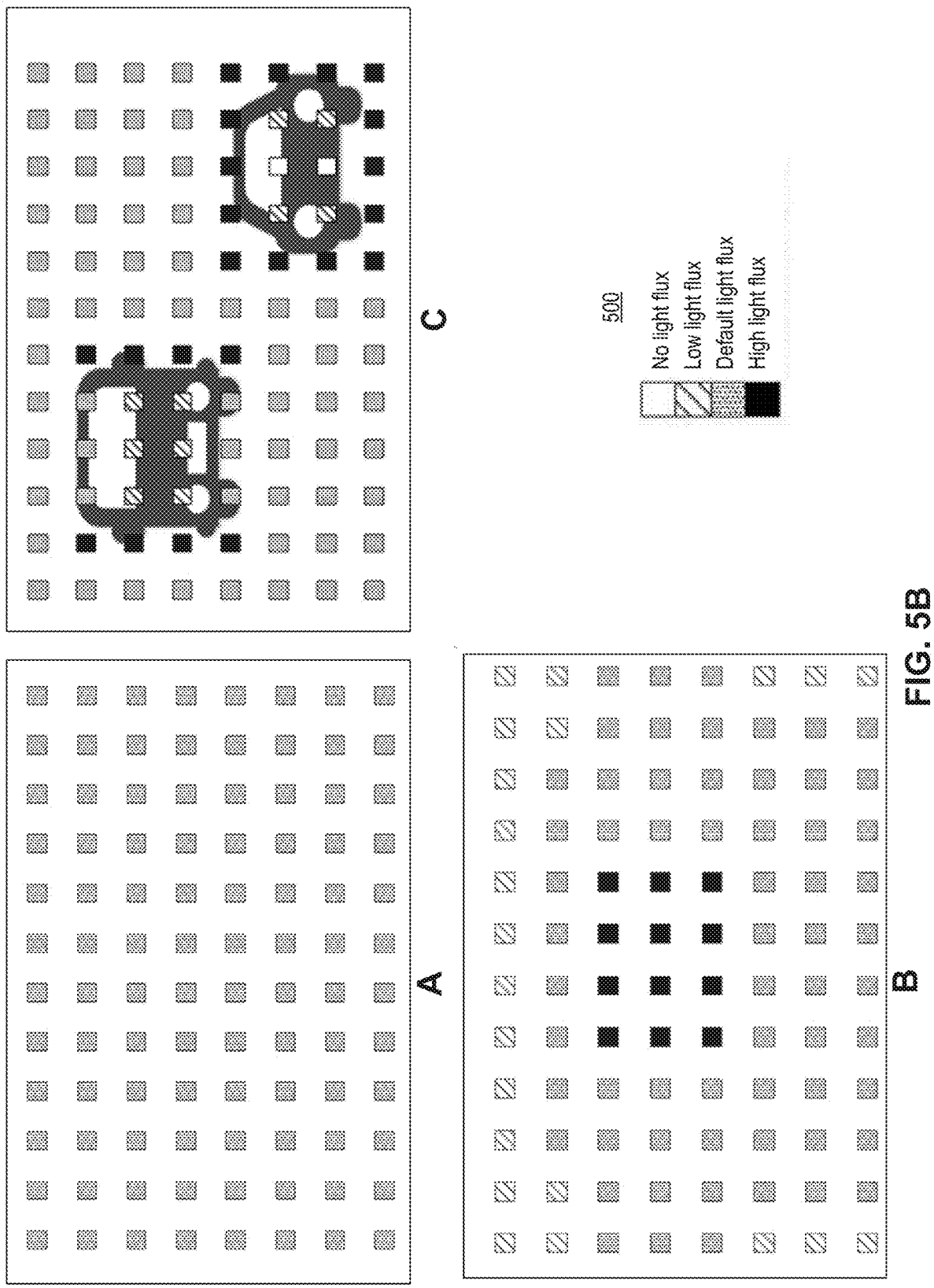
FIG. 5B includes three example diagrams illustrating emission scheme in a single frame-time for the whole field of view.
Figure 5C:
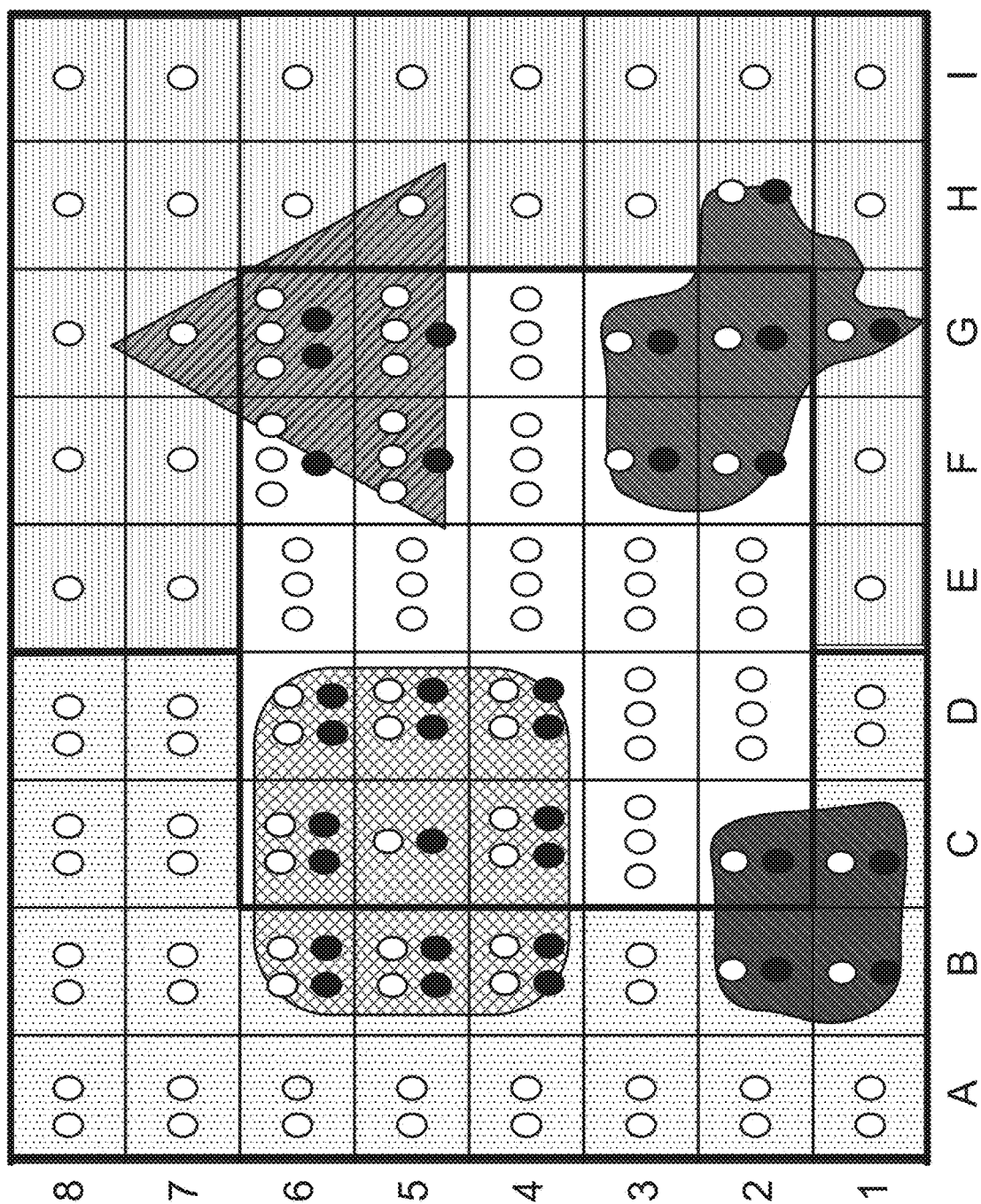
FIG. 5C is a diagram illustrating the actual light emission projected towards and reflections received during a single frame-time for the whole field of view.

FIGS. 5A-5C depict different functionalities of processing units 108 in accordance with some embodiments of the present disclosure. Specifically, FIG. 5A is a diagram illustrating emission patterns in a single frame-time for a single portion of the field of view, FIG. 5B is a diagram illustrating emission scheme in a single frame-time for the whole field of view, and. FIG. 5C is a diagram illustrating the actual light emission projected towards the field of view during a single scanning cycle.

FIG. 5A illustrates four examples of emission patterns in a single frame-time for a single portion 122 of field of view 120 associated with an instantaneous position of at least one light deflector 114. Consistent with embodiments of the present disclosure, processing unit 108 may control at least one light source 112 and light deflector 114 (or coordinate the operation of at least one light source 112 and at least one light deflector 114) in a manner enabling light flux to vary over a scan of field of view 120. Consistent with other embodiments, processing unit 108 may control only at least one light source 112 and light deflector 114 may be moved or pivoted in a fixed predefined pattern.

Diagrams A-D in FIG. 5A depict the power of light emitted towards a single portion 122 of field of view 120 over time. In Diagram A, processor 118 may control the operation of light source 112 in a manner such that during scanning of field of view 120 an initial light emission is projected toward portion 122 of field of view 120. When projecting unit 102 includes a pulsed-light light source, the initial light emission may include one or more initial pulses (also referred to as "pilot pulses"). Processing unit 108 may receive from sensor 116 pilot information about reflections associated with the initial light emission. In one embodiment, the pilot information may be represented as a single signal based on the outputs of one or more detectors (e.g., one or more SPADs, one or more APDs, one or more SiPMs, etc.) or as a plurality of signals based on the outputs of multiple detectors. In one example, the pilot information may include analog and/or digital information. In another example, the pilot information may include a single value and/or a plurality of values (e.g., for different times and/or parts of the segment).

Based on information about reflections associated with the initial light emission, processing unit 108 may be configured to determine the type of subsequent light emission to be projected towards portion 122 of field of view 120. The determined subsequent light emission for the particular portion of field of view 120 may be made during the same scanning cycle (i.e., in the same frame) or in a subsequent scanning cycle (i.e., in a subsequent frame).

In Diagram B, processor 118 may control the operation of light source 112 in a manner such that during scanning of field of view 120 light pulses in different intensities are projected towards a single portion 122 of field of view 120. In one embodiment, LIDAR system 100 may be operable to generate depth maps of one or more different types, such as any one or more of the following types: point cloud model, polygon mesh, depth image (holding depth information for each pixel of an image or of a 2D array), or any other type of 3D model of a scene. The sequence of depth maps may be a temporal sequence, in which different depth maps are generated at a different time. Each depth map of the sequence associated with a scanning cycle (interchangeably "frame") may be generated within the duration of a corresponding subsequent frame-time. In one example, a typical frame-time may last less than a second. In some embodiments, LIDAR system 100 may have a fixed frame rate (e.g., 10 frames per second, 25 frames per second, 50 frames per second) or the frame rate may be dynamic. In other embodiments, the frame-times of different frames may not be identical across the sequence. For example, LIDAR system 100 may implement a 10 frames-per-second rate that includes generating a first depth map in 100 milliseconds (the average), a second frame in 92 milliseconds, a third frame at 142 milliseconds, and so on.

In Diagram C, processor 118 may control the operation of light source 112 in a manner such that during scanning of field of view 120 light pulses associated with different durations are projected towards a single portion 122 of field of view 120. In one embodiment, LIDAR system 100 may be operable to generate a different number of pulses in each frame. The number of pulses may vary between 0 to 32 pulses (e.g., 1, 5, 12, 28, or more pulses) and may be based on information derived from previous emissions. The time between light pulses may depend on desired detection range and can be between 500 ns and 5000 ns. In one example, processing unit 108 may receive from sensor 116 information about reflections associated with each light-pulse. Based on the information (or the lack of information), processing unit 108 may determine if additional light pulses are needed. It is noted that the durations of the processing times and the emission times in diagrams A-D are not in-scale. Specifically, the processing time may be substantially longer than the emission time. In diagram D, projecting unit 102 may include a continuous-wave light source. In one embodiment, the initial light emission may include a period of time where light is emitted and the subsequent emission may be a continuation of the initial emission, or there may be a discontinuity. In one embodiment, the intensity of the continuous emission may change over time.

Consistent with some embodiments of the present disclosure, the emission pattern may be determined per each portion of field of view 120. In other words, processor 118 may control the emission of light to allow differentiation in the illumination of different portions of field of view 120. In one example, processor 118 may determine the emission pattern for a single portion 122 of field of view 120, based on detection of reflected light from the same scanning cycle (e.g., the initial emission), which makes LIDAR system 100 extremely dynamic. In another example, processor 118 may determine the emission pattern for a single portion 122 of field of view 120, based on detection of reflected light from a previous scanning cycle. The differences in the patterns of the subsequent emissions may result from determining different values for light-source parameters for the subsequent emission, such as any one of the following:

a. Overall energy of the subsequent emission.
    b. Energy profile of the subsequent emission.
    c. A number of light-pulse-repetition per frame.
    d. Light modulation characteristics such as duration, rate, peak, average power, and pulse shape.
    e. Wave properties of the subsequent emission, such as polarization, wavelength, etc.

Consistent with the present disclosure, the differentiation in the subsequent emissions may be put to different uses. In one example, it is possible to limit emitted power levels in one portion of field of view 120 where safety is a consideration, while emitting higher power levels (thus improving signal-to-noise ratio and detection range) for other portions of field of view 120. This is relevant for eye safety, but may also be relevant for skin safety, safety of optical systems, safety of sensitive materials, and more. In another example, it is possible to direct more energy towards portions of field of view 120 where it will be of greater use (e.g., regions of interest, further distanced targets, low reflection targets, etc.) while limiting the lighting energy to other portions of field of view 120 based on detection results from the same frame or previous frame. It is noted that processing unit 108 may process detected signals from a single instantaneous field of view several times within a single scanning frame time; for example, subsequent emission may be determined after each pulse emission, or after a number of pulse emissions.

FIG. 5B illustrates three examples of emission schemes in a single frame-time for field of view 120. Consistent with embodiments of the present disclosure, at least on processing unit 108 may use obtained information to dynamically adjust the operational mode of LIDAR system 100 and/or determine values of parameters of specific components of LIDAR system 100. The obtained information may be determined from processing data captured in field of view 120, or received (directly or indirectly) from host 210. Processing unit 108 may use the obtained information to determine a scanning scheme for scanning the different portions of field of view 120. The obtained information may include a current light condition, a current weather condition, a current driving environment of the host vehicle, a current location of the host vehicle, a current trajectory of the host vehicle, a current topography of road surrounding the host vehicle, or any other condition or object detectable through light reflection. In some embodiments, the determined scanning scheme may include at least one of the following: (a) a designation of portions within field of view 120 to be actively scanned as part of a scanning cycle, (b) a projecting plan for projecting unit 102 that defines the light emission profile at different portions of field of view 120; (c) a deflecting plan for scanning unit 104 that defines, for example, a deflection direction, frequency, and designating idle elements within a reflector array; and (d) a detection plan for sensing unit 106 that defines the detectors sensitivity or responsivity pattern.

In addition, processing unit 108 may determine the scanning scheme at least partially by obtaining an identification of at least one region of interest within the field of view 120 and at least one region of non-interest within the field of view 120. In some embodiments, processing unit 108 may determine the scanning scheme at least partially by obtaining an identification of at least one region of high interest within the field of view 120 and at least one region of lower-interest within the field of view 120. The identification of the at least one region of interest within the field of view 120 may be determined, for example, from processing data captured in field of view 120, based on data of another sensor (e.g., camera, GPS), received (directly or indirectly) from host 210, or any combination of the above. In some embodiments, the identification of at least one region of interest may include identification of portions, areas, sections, pixels, or objects within field of view 120 that are important to monitor. Examples of areas that may be identified as regions of interest may include, crosswalks, moving objects, people, nearby vehicles or any other environmental condition or object that may be helpful in vehicle navigation. Examples of areas that may be identified as regions of non-interest (or lower-interest) may be static (non-moving) far-away buildings, a skyline, an area above the horizon and objects in the field of view. Upon obtaining the identification of at least one region of interest within the field of view 120, processing unit 108 may determine the scanning scheme or change an existing scanning scheme. Further to determining or changing the light-source parameters (as described above), processing unit 108 may allocate detector resources based on the identification of the at least one region of interest. In one example, to reduce noise, processing unit 108 may activate detectors 410 where a region of interest is expected and disable detectors 410 where regions of non-interest are expected. In another example, processing unit 108 may change the detector sensitivity, e.g., increasing sensor sensitivity for long range detection where the reflected power is low.

Diagrams A-C in FIG. 5B depict examples of different scanning schemes for scanning field of view 120. Each square in field of view 120 represents a different portion 122 associated with an instantaneous position of at least one light deflector 114. Legend 500 details the level of light flux represented by the filling pattern of the squares. Diagram A depicts a first scanning scheme in which all of the portions have the same importance/priority and a default light flux is allocated to them. The first scanning scheme may be utilized in a start-up phase or periodically interleaved with another scanning scheme to monitor the whole field of view for unexpected/new objects. In one example, the light source parameters in the first scanning scheme may be configured to generate light pulses at constant amplitudes. Diagram B depicts a second scanning scheme in which a portion of field of view 120 is allocated with high light flux while the rest of field of view 120 is allocated with default light flux and low light flux. The portions of field of view 120 that are the least interesting may be allocated with low light flux. Diagram C depicts a third scanning scheme in which a compact vehicle and a bus (see silhouettes) are identified in field of view 120. In this scanning scheme, the edges of the vehicle and bus may be tracked with high power and the central mass of the vehicle and bus may be allocated with less light flux (or no light flux). Such light flux allocation enables concentration of more of the optical budget on the edges of the identified objects and less on their center which have less importance.

FIG. 5C illustrating the emission of light towards field of view 120 during a single scanning cycle. In the depicted example, field of view 120 is represented by an 8×9 matrix, where each of the 72 cells corresponds to a separate portion 122 associated with a different instantaneous position of at least one light deflector 114. In this exemplary scanning cycle, each portion includes one or more white dots that represent the number of light pulses projected toward that portion, and some portions include black dots that represent reflected light from that portion detected by sensor 116. As shown, field of view 120 is divided into three sectors: sector I on the right side of field of view 120, sector II in the middle of field of view 120, and sector III on the left side of field of view 120. In this exemplary scanning cycle, sector I was initially allocated with a single light pulse per portion; sector II, previously identified as a region of interest, was initially allocated with three light pulses per portion; and sector III was initially allocated with two light pulses per portion. Also as shown, scanning of field of view 120 reveals four objects 208: two free-form objects in the near field (e.g., between 5 and 50 meters), a rounded-square object in the mid field (e.g., between 50 and 150 meters), and a triangle object in the far field (e.g., between 150 and 500 meters). While the discussion of FIG. 5C uses number of pulses as an example of light flux allocation, it is noted that light flux allocation to different parts of the field of view may also be implemented in other ways such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. The illustration of the light emission as a single scanning cycle in FIG. 5C demonstrates different capabilities of LIDAR system 100. In a first embodiment, processor 118 is configured to use two light pulses to detect a first object (e.g., the rounded-square object) at a first distance, and to use three light pulses to detect a second object (e.g., the triangle object) at a second distance greater than the first distance. In a second embodiment, processor 118 is configured to allocate more light to portions of the field of view where a region of interest is identified. Specifically, in the present example, sector II was identified as a region of interest and accordingly it was allocated with three light pulses while the rest of field of view 120 was allocated with two or less light pulses. In a third embodiment, processor 118 is configured to control light source 112 in a manner such that only a single light pulse is projected toward to portions B1, B2, and C1 in FIG. 5C, although they are part of sector III that was initially allocated with two light pulses per portion. This occurs because the processing unit 108 detected an object in the near field based on the first light pulse. Allocation of less than maximal amount of pulses may also be a result of other considerations. For example, in at least some regions, detection of object at a first distance (e.g., a near field object) may result in reducing an overall amount of light emitted to this portion of field of view 120.

Additional details and examples on different components of LIDAR system 100 and their associated functionalities are included in Applicant's U.S. patent application Ser. No. 15/391,916 filed Dec. 28, 2016; Applicant's U.S. patent application Ser. No. 15/393,749 filed Dec. 29, 2016; Applicant's U.S. patent application Ser. No. 15/393,285 filed Dec. 29, 2016; and Applicant's U.S. patent application Ser. No. 15/393,593 filed Dec. 29, 2016, which are incorporated herein by reference in their entirety.

Example Implementation: Vehicle

Figure 6C:
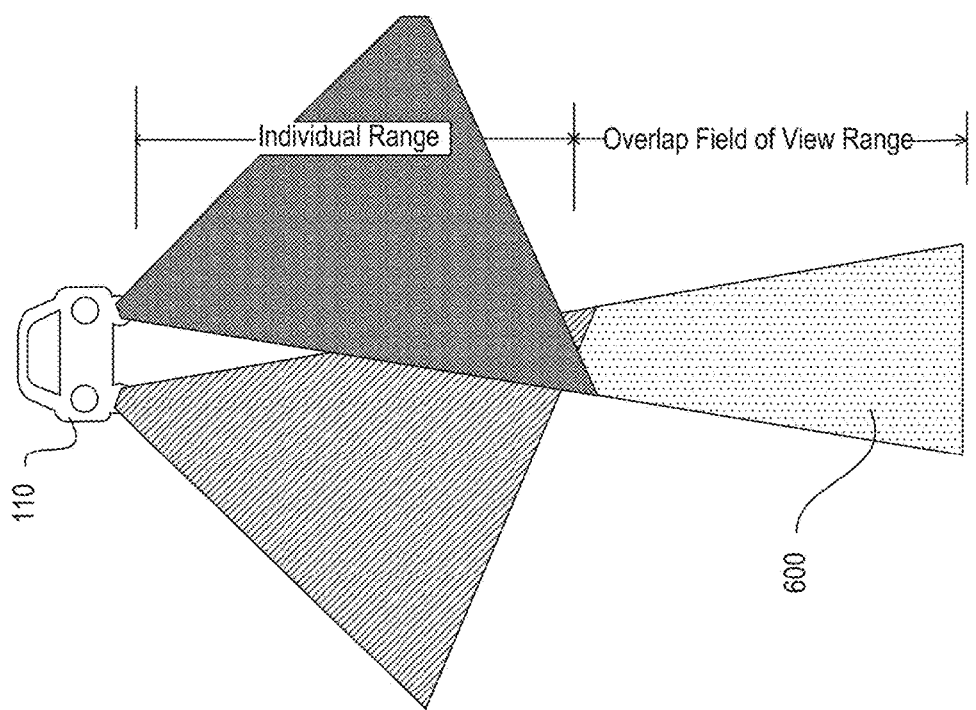
FIGS. 6A, 6B, and 6C are diagrams illustrating a first example implementation consistent with some embodiments of the present disclosure.
Figure 6A:
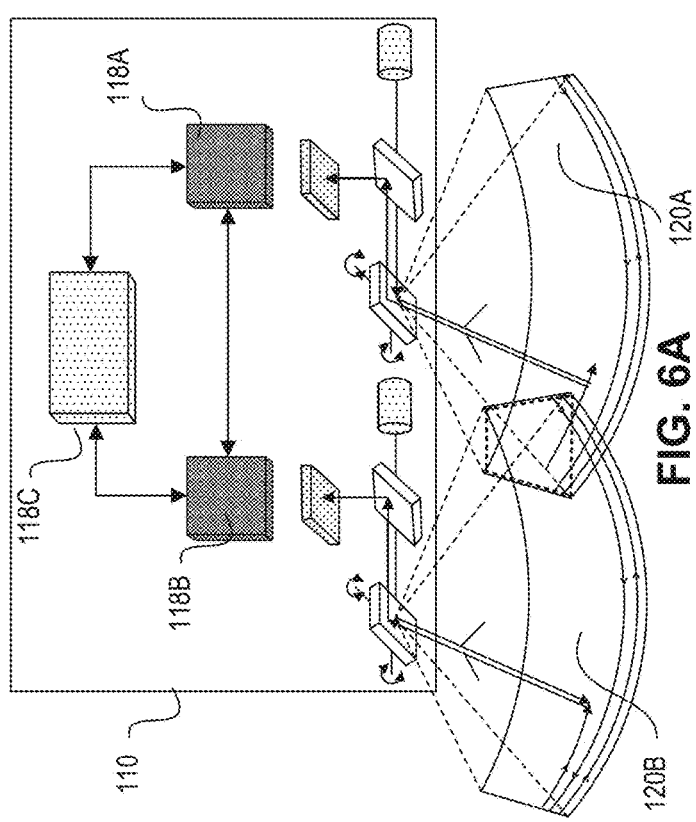
Figure 6B:
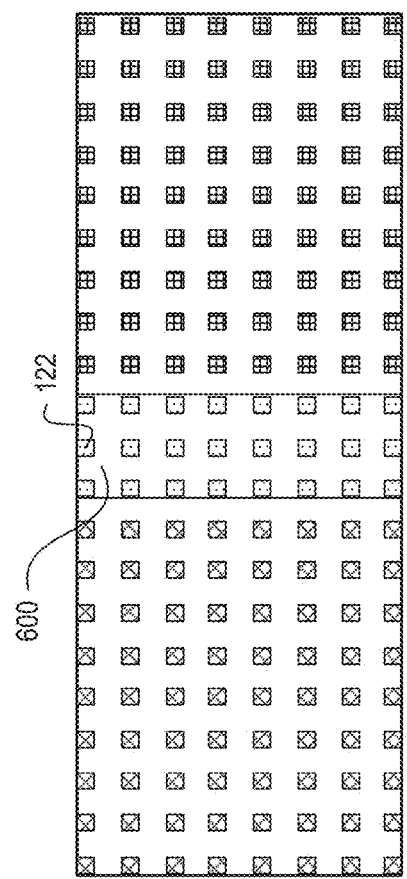

FIGS. 6A-6C illustrate the implementation of LIDAR system 100 in a vehicle (e.g., vehicle 110). Any of the aspects of LIDAR system 100 described above or below may be incorporated into vehicle 110 to provide a range-sensing vehicle. Specifically, in this example, LIDAR system 100 integrates multiple scanning units 104 and potentially multiple projecting units 102 in a single vehicle. In one embodiment, a vehicle may take advantage of such a LIDAR system to improve power, range, and accuracy in the overlap zone and beyond it, as well as redundancy in sensitive parts of the FOV (e.g., the forward movement direction of the vehicle). As shown in FIG. 6A, vehicle 110 may include a first processor 118A for controlling the scanning of field of view 120A, a second processor 118B for controlling the scanning of field of view 120B, and a third processor 118C for controlling synchronization of scanning the two fields of view. In one example, processor 118C may be the vehicle controller and may have a shared interface between first processor 118A and second processor 118B. The shared interface may enable an exchanging of data at intermediate processing levels and a synchronization of scanning of the combined field of view in order to form an overlap in the temporal and/or spatial space. In one embodiment, the data exchanged using the shared interface may be: (a) time of flight of received signals associated with pixels in the overlapped field of view and/or in its vicinity; (b) laser steering position status; (c) detection status of objects in the field of view.

FIG. 6B illustrates overlap region 600 between field of view 120A and field of view 120B. In the depicted example, the overlap region is associated with 24 portions 122 from field of view 120A and 24 portions 122 from field of view 120B. Given that the overlap region is defined and known by processors 118A and 118B, each processor may be designed to limit the amount of light emitted in overlap region 600 in order to conform with an eye safety limit that spans multiple source lights, or for other reasons such as maintaining an optical budget. In addition, processors 118A and 118B may avoid interferences between the light emitted by the two light sources by loose synchronization between the scanning unit 104A and scanning unit 104B, and/or by control of the laser transmission timing, and/or the detection circuit enabling timing.

FIG. 6C illustrates how overlap region 600 between field of view 120A and field of view 120B may be used to increase the detection distance of vehicle 110. Consistent with the present disclosure, two or more light sources 112 projecting their nominal light emission into the overlap zone may be leveraged to increase the effective detection range. The term "detection range" may include an approximate distance from vehicle 110 at which LIDAR system 100 can clearly detect an object. In one embodiment, the maximum detection range of LIDAR system 100 is about 300 meters, about 400 meters, or about 500 meters. For example, for a detection range of 200 meters, LIDAR system 100 may detect an object located 200 meters (or less) from vehicle 110 at more than 95%, more than 99%, more than 99.5% of the times even when the object's reflectivity may be less than 50% (e.g., less than 20%, less than 10%, or less than 5%). In addition, LIDAR system 100 may have less than 1% false alarm rate. In one embodiment, light projected from two light sources that are collocated in the temporal and spatial space can be utilized to improve SNR and therefore increase the range and/or quality of service for an object located in the overlap region. Processor 118C may extract high-level information from the reflected light in field of view 120A and 120B. The term "extracting information" may include any process by which information associated with objects, individuals, locations, events, etc., is identified in the captured image data by any means known to those of ordinary skill in the art. In addition, processors 118A and 118B may share the high-level information, such as objects (road delimiters, background, pedestrians, vehicles, etc.), and motion vectors, to enable each processor to become alert to the peripheral regions about to become regions of interest. For example, a moving object in field of view 120A may be determined to soon be entering field of view 120B.

Example Implementation: Surveillance System

Figure 6D:
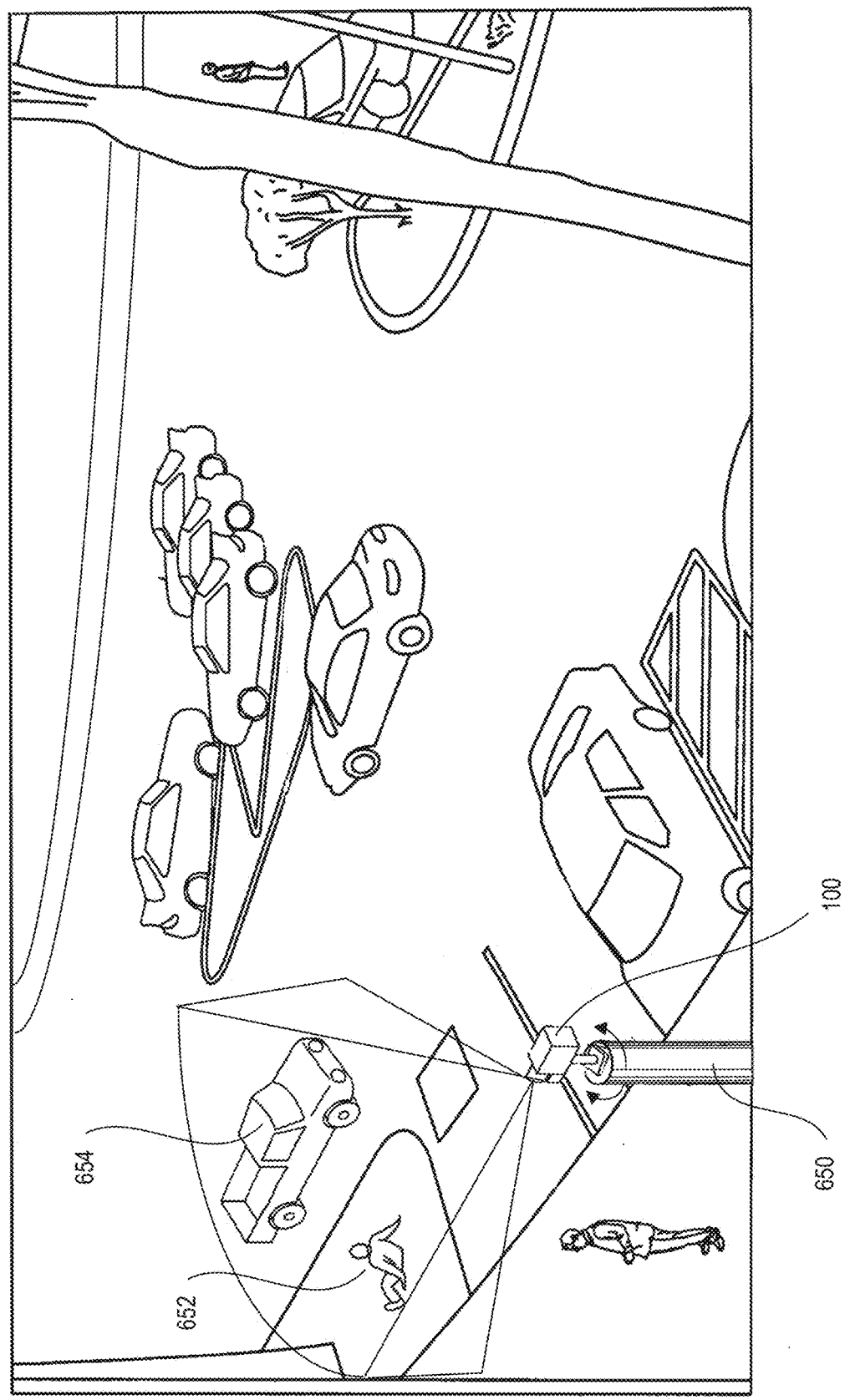
FIG. 6D is a diagram illustrating a second example implementation consistent with some embodiments of the present disclosure.

FIG. 6D illustrates the implementation of LIDAR system 100 in a surveillance system. As mentioned above, LIDAR system 100 may be fixed to a stationary object 650 that may include a motor or other mechanism for rotating the housing of the LIDAR system 100 to obtain a wider field of view. Alternatively, the surveillance system may include a plurality of LIDAR units. In the example depicted in FIG. 6D, the surveillance system may use a single rotatable LIDAR system 100 to obtain 3D data representing field of view 120 and to process the 3D data to detect people 652, vehicles 654, changes in the environment, or any other form of security-significant data.

Consistent with some embodiment of the present disclosure, the 3D data may be analyzed to monitor retail business processes. In one embodiment, the 3D data may be used in retail business processes involving physical security (e.g., detection of: an intrusion within a retail facility, an act of vandalism within or around a retail facility, unauthorized access to a secure area, and suspicious behavior around cars in a parking lot). In another embodiment, the 3D data may be used in public safety (e.g., detection of: people slipping and falling on store property, a dangerous liquid spill or obstruction on a store floor, an assault or abduction in a store parking lot, an obstruction of a fire exit, and crowding in a store area or outside of the store). In another embodiment, the 3D data may be used for business intelligence data gathering (e.g., tracking of people through store areas to determine, for example, how many people go through, where they dwell, how long they dwell, how their shopping habits compare to their purchasing habits).

Consistent with other embodiments of the present disclosure, the 3D data may be analyzed and used for traffic enforcement. Specifically, the 3D data may be used to identify vehicles traveling over the legal speed limit or some other road legal requirement. In one example, LIDAR system 100 may be used to detect vehicles that cross a stop line or designated stopping place while a red traffic light is showing. In another example, LIDAR system 100 may be used to identify vehicles traveling in lanes reserved for public transportation. In yet another example, LIDAR system 100 may be used to identify vehicles turning in intersections where specific turns are prohibited on red.

It should be noted that while examples of various disclosed embodiments have been described above and below with respect to a control unit that controls scanning of a deflector, the various features of the disclosed embodiments are not limited to such systems. Rather, the techniques for allocating light to various portions of a LIDAR FOV may be applicable to type of light-based sensing system (LIDAR or otherwise) in which there may be a desire or need to direct different amounts of light to different portions of field of view. In some cases, such light allocation techniques may positively impact detection capabilities, as described herein, but other advantages may also result.

It should also be noted that various sections of the disclosure and the claims may refer to various components or portions of components (e.g., light sources, sensors, sensor pixels, field of view portions, field of view pixels, etc.) using such terms as "first," "second," "third," etc. These terms are used only to facilitate the description of the various disclosed embodiments and are not intended to be limiting or to indicate any necessary correlation with similarly named elements or components in other embodiments. For example, characteristics described as associated with a "first sensor" in one described embodiment in one section of the disclosure may or may not be associated with a "first sensor" of a different embodiment described in a different section of the disclosure.

It is noted that LIDAR system 100, or any of its components, may be used together with any of the particular embodiments and methods disclosed below. Nevertheless, the particular embodiments and methods disclosed below are not necessarily limited to LIDAR system 100, and may possibly be implemented in or by other systems (such as but not limited to other LIDAR systems, other electrooptical systems, other optical systems, etc.—whichever is applicable). Also, while system 100 is described relative to an exemplary vehicle-based LIDAR platform, system 100, any of its components, and any of the processes described herein may be applicable to LID AR systems disposed on other platform types. Likewise, the embodiments and processes disclosed below may be implemented on or by LID AR systems (or other systems such as other electro-optical systems etc.) which are installed on systems disposed on platforms other than vehicles, or even regardless of any specific platform.

Example Implementation: Actuator for a Scanning MEMS Mirror

Some light scanning systems operate by generating one or more beams of light and directing the generated beams of light toward one or more movable deflectors (e.g., mirrors) to project the generated light toward a region of interest in an environment. By controllably moving the one or more movable deflectors (e.g., tilting/rotating the mirrors about one or more axes, etc.), the deflectors may be used to scan the region of interest in the environment with the generated light.

One example of a system operating based on these principles is a scanning LIDAR system. In some embodiments, a scanning LIDAR system may include one or more mirrors (e.g., a MEMS mirror, an array of MEMS mirrors, etc.) configured to tilt about one or more axes (e.g., X axis, Y axis, Z axis). For example, a mirror disposed on the XY plane may tilt or rotate about any axis disposed or extending in the XY plane. Laser light generated by the LIDAR system may be directed toward a MEMS mirror, which, in turn, reflects the incident laser light toward a region of interest in an environment of the LIDAR system. Tilting of the mirror along a first axis may enable the LIDAR system to scan the region of interest along a single scan line. Tilting of the mirror along a second axis may enable the LIDAR system to scan the region of interest in a 2D pattern of scan lines.

Figure 7A:
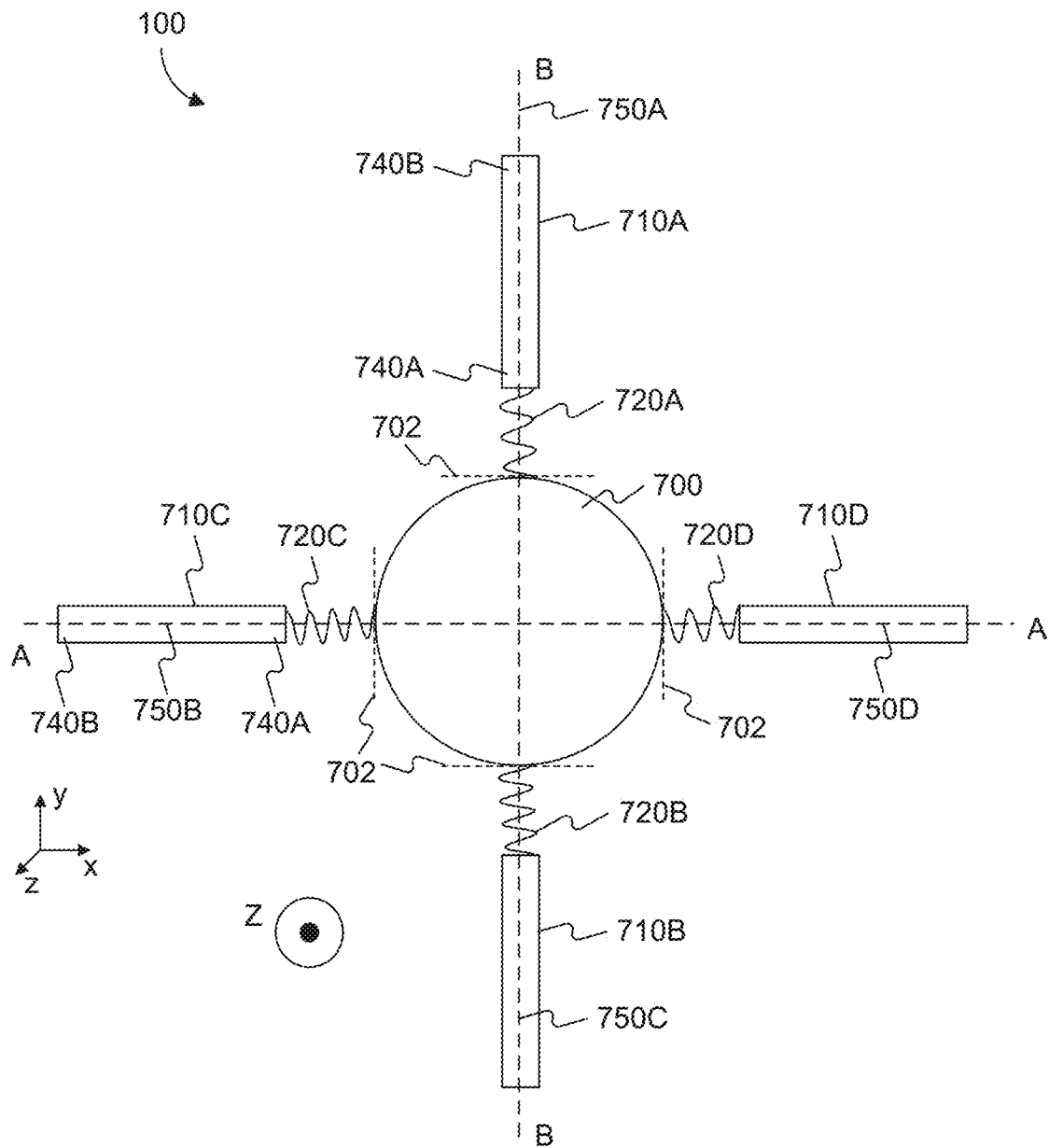
FIG. 7A is an illustration of a deflector unit of a LIDAR system.

In some embodiments, as schematically illustrated in FIG. 7A, a deflector unit for a light scanning system of LIDAR system 100 may include a mirror 700 and least one actuator arm 710A, 710B, 710C, 710D. Mirror 700 may be coupled to the at least one actuator arm 710A, 710B, 710C, 710D, and may be any type of mirror. For example, any of the previously described mirrors may be used as mirror 700. In some embodiments, mirror 700 is a MEMS mirror. It should be noted that, although mirror 700 is illustrated as circular in shape, this is only exemplary and not a requirement. In general, mirror 700 may have any shape (oval, elliptical, rectangular, hexagonal, pentagonal, octagonal, irregular-shaped, etc.). In some exemplary embodiments of LIDAR system 100 (as illustrated, for example, in FIG. 7A), mirror 700 may be coupled to a plurality of actuators or actuator arms 710A, 710B, 710C, 710D by couplers or coupling members 720A, 720B, 720C, 720D. That is, actuator arm 710A may be connected to mirror 700 using coupling member 720A, actuator arm 720A may be connected to mirror 700 using coupling member 720B, actuator arm 710C may be connected to mirror 700 using coupling member 720C, and actuator arm 710D may be connected to mirror 700 using coupling member 720D. For the sake of brevity, in the discussion below, actuator arms 710A, 710B, 710C, and 710D may be singly or collectively referred to as actuator arm(s) 710. Similarly, coupling members 720A, 720B, 720C, and 720D may be collectively or singly referred to as coupling member(s) 720. The coupling members 720 may be connected to the actuator arms 710 and to the mirror 710 by any known method. In some embodiments, the mirror 700, actuator arms 710, and coupling members 720 may be separately formed parts that are attached together (using adhesive, solder, weld, etc.). In some embodiments, the mirror 700, actuator arms 710, and coupling members 720 may be fabricated as a single component (i.e., integrally formed) using, for example, conventional Integrated Circuit (IC) fabrication methods, etc.

Although mirror 700 is illustrated as being connected to the actuator arms 710 via coupling members 720 in FIG. 7A, this is only exemplary. Mirror 700 may be coupled in any manner to an actuator arms 710. In some embodiments, the mirror 700 may be suspended between the actuator arms 710 by coupling members 720. Any number of actuator arms 710 may be used. In some embodiments, the at least one actuator arm includes at least one pair of actuator arms, wherein the coupler end of each actuator arm of the at least one pair of actuator arms is coupled to the mirror at opposite locations. In some embodiments, the at least one pair of actuator arms includes at least two pairs of actuator arms. For example, FIG. 7A illustrates two pairs of actuator arms (e.g., actuator arms 710A and 710B forming a first pair and actuator arms 710C and 710D forming a second pair). Each actuator arm of a pair of actuator arms may be coupled to the mirror 700 at opposite locations (ends, sides, etc.). For example, in the embodiment illustrated in FIG. 7A, actuator arms 710A and 710B are coupled at diametrically opposite ends or locations of mirror 700. Similarly, actuator arms 710C and 710D are coupled to the mirror 700 at diametrically opposite ends. It should be noted that coupling the actuator arms 710 at diametrically opposite ends of the mirror 700 is only exemplary and not a requirement. For example, in some embodiments, the actuator arms 710 may be coupled to opposite sides (corners, edges, vertices, etc.) of the mirror 700 (e.g., for non-circular mirrors, etc.).

Although not a requirement, in some embodiments, the plurality of actuator arms 710 may be symmetrically arranged about the mirror 700. In other words, in some embodiments, the at least one actuator arm may include multiple actuator arms symmetrically arranged with respect to the mirror. For example, in the embodiment of FIG. 7A, the four actuator arms 710 are spaced apart from each other by an angle of about 90 degrees. It should be noted that although four actuator arms 710 are illustrated in FIG. 7A, this is not a requirement. In general, any number of actuator arms 710 (e.g., two, three, four, five, six, seven, eight, nine, ten, etc.) may be provided. Although not a requirement, in some embodiments, an even number of actuator arms 710 (i.e., or one or more pairs of actuator arms 710) may be provided. Each actuator arm 710 may be coupled at one end to the mirror 700 (e.g., via coupling member 720, etc.) and its opposite end may be connected to an anchor location in LIDAR system 100.

In some embodiments, the deflector unit includes at least one actuator arm having an anchor end and a coupler end, the mirror being coupled to the coupler end of the at least one actuator arm. In this discussion, the end of the actuator arm 710 coupled to the mirror 700 is referred to as its coupler end 740A and the end of the actuator arm 710 coupled to the anchor location is referred to as its anchor end 740B. In other words, coupling members 720 connect the coupler ends 740A of the actuator arms 710 to mirror 700. The anchor end 740B of the actuator arm 710 may be relatively more fixed than its coupler end 740A such that the coupler end 740A can move in one or more directions (e.g., X, Y, and/or Z) relative to its anchor end 740B. For example, with reference to FIG. 7A, actuator arm 710 may be configured to deflect or bend about the X axis (in the YZ plane) such that its coupler end 740A translates more in the Z direction than its anchor end 740B. In some embodiments, the anchor end 740B of the actuator arm 710 may be fixed point such that it does not move. In some embodiments, the anchor end 740B of the actuator arm 710 may not be fixed, but it may be relatively more constrained from moving than its coupler end 740A.

In some embodiments, the mirror is configured to tilt about at least one tilting axis in response to a movement of the at least one actuator arm. For example, the actuator arms 710 may be coupled to the mirror 700 such that a movement (e.g., deflection, translation, bending, etc.) of one or more of the actuator arms 710 may result in a movement (e.g., tilting, rotation, etc.) of the mirror 700. For example, in the embodiment of FIG. 7A, a movement of the one or both of actuator arms 710A and 710B in the (±) Z-direction may cause a movement of the mirror 700. In some embodiments, a deflection of the coupler end of the at least one actuator arm along a first axis causes tilting of the mirror about the at least one tilting axis, the at least one tilting axis being orthogonal to the first axis. In some embodiments, the at least one tilting axis may include two mutually orthogonal axes. For example, a deflection or translation of the coupler ends 740A one or both of actuator arms 710A and 710B in the Z-direction (e.g., a relative movement of actuator arms 710A and 710B in the Z-direction) may cause the mirror 700 to tilt or rotate about the X axis (e.g., axis A-A in FIG. 7A). Similarly, a movement of the coupler ends 740A of one or both of actuator arms 710C and 710D in the Z-direction may cause mirror 700 to tilt or rotate about the Y axis (e.g., axis B-B). The relative movement between any two actuator arms 710 (e.g., 710A and 710B; 710B and 710C; 710C and 710D, etc.) may cause a corresponding movement of the mirror 700.

The actuator arms 710 may move in any manner to cause a movement of mirror 700. For example, in some embodiments, the coupler ends 740A of one or both of actuator arms 710A, 710B may translate in Z-direction more than their anchor ends 740B to cause the mirror 700 to tilt about axis A-A. In general, a deflection of the coupler end 740A of one or more actuator arms 710 along a first axis may cause tilting of the mirror about an axis orthogonal to the first axis. For example, a deflection of the coupler end 740A of one or more actuator arms 710 along the Z axis (i.e., in the +Z or –Z direction) may cause the mirror 700 to tilt about the X axis (i.e., axis A-A) or the Y axis (i.e., axis B-B), which are both orthogonal to the Z axis. In some embodiments, the mirror may be configured to tilt about the at least one tilting axis in response to a bending of the at least one actuator arm. Bending of the at least one actuator arm relative to a first plane may cause tilting of the mirror about the at least one tilting axis. The at least one tilting axis may be disposed on a second plane orthogonal to the first plane. For example, one or more actuator arms 710 may bend in one plane (e.g., in the XZ plane, YZ plane, etc.) to cause the mirror 700 to tilt about an axis extending in another plane (e.g., XY plane) orthogonal or normal to the plane of bending. For example, one or both of actuator arm 710A and 710B may bend in the YZ plane (such that their coupler ends 740A translate in the Z-direction relative to their respective anchor ends 740B) to cause the mirror 700 to tilt about axis A-A extending in the XY plane. Similarly, one or both actuator arm 710C and 710D may bend in the XZ plane to cause the mirror 700 to tilt about axis B-B extending in the XY plane. In general, any movement (e.g., translation, bending, etc.) of any one of actuator arms 710A-710D may result in a change in the position of a portion or all of mirror 700 along the Z axis.

In some embodiments, the at least one actuator arm includes a piezoelectric material configured to cause the at least one actuator arm to bend in response to a voltage applied to the piezoelectric material. For example, one or more (e.g., all) of the actuator arms 710 may include or incorporate one or more piezoelectric materials such that applying a voltage on the piezoelectric material(s) may cause a bending of the corresponding actuator arm 710 and a corresponding movement (or tilting) of the mirror 700. That is, in some embodiments, the actuator arms 710 may be electrically controlled to tilt the mirror 700. The actuator arms 710 may be controlled to move the mirror 700 and scan light relative to a region of interest. In one example, as diagrammatically illustrated in FIG. 7B, controlled movement of mirror 700 may be used to scan a field of view (FOV) 712 or a region of interest (ROI) within the FOV 712. For example, in an application where LIDAR system 100 is used in a vehicle, movement of the mirror 700 may be used to scan FOV 712 in an environment of the vehicle upon which the scanning LIDAR system 100 is mounted. FOV 712 may correspond to a field of view of the LIDAR system 100 or may correspond to a portion of the field of view. With reference to FIG. 7A, the actuator arms 710 may be selectively moved (e.g., translated, bent, etc.) in a manner to orient mirror 700 such that the scan of FOV 712 may be accomplished with a beam of laser light generated by a light source associated with the LIDAR system 100.

Figure 7B:
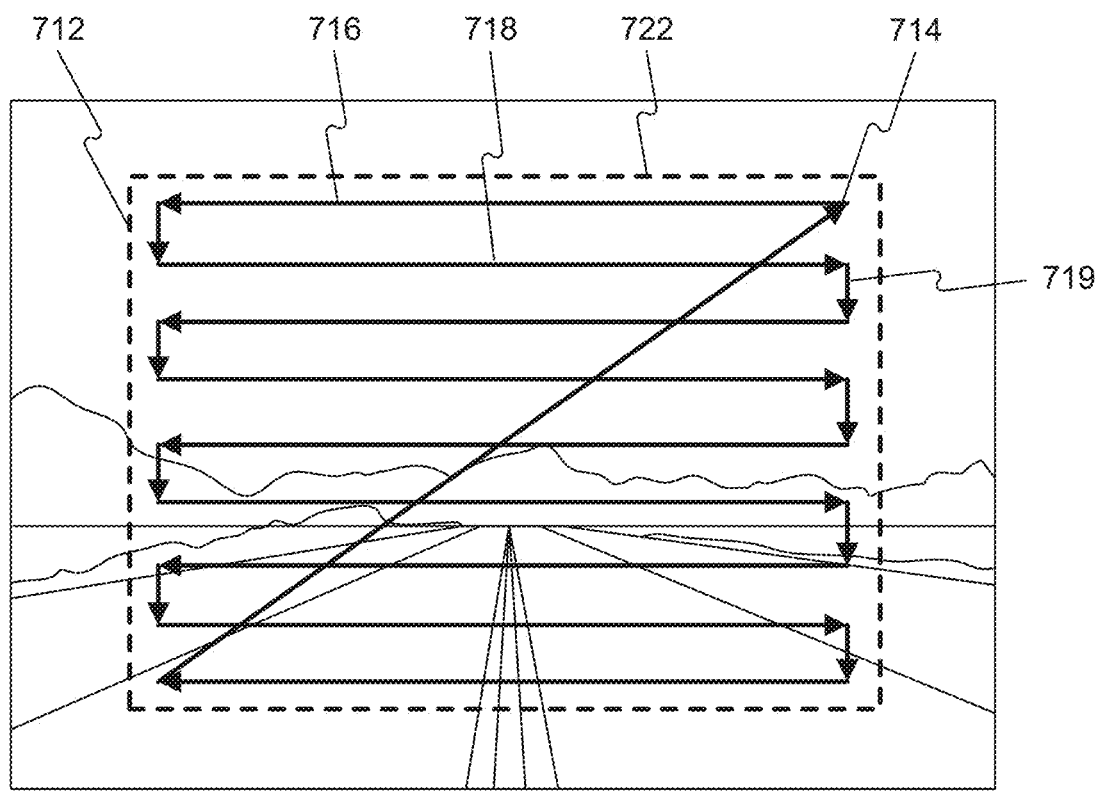
FIG. 7B is an illustration of an exemplary scan pattern obtained using the deflector unit of FIG. 7A.

It should be noted that FIG. 7B is only an exemplary scan pattern that may be used to scan FOV 712 using a deflector unit of the current disclosure. With reference to FIGS. 7A and 7B, actuator arm 710A may be bent, for example, in the +Z-direction (or upward) to tilt the mirror 700 about the X axis (or axis A-A), and actuator arm 710D may be bent upward to rotate the mirror 700 about the Y axis (or axis B-B) such that a generated laser beam may be deflected by mirror 700 toward a location 714 of FOV 712. The scan of FOV 712 may begin at location 714. Each scan line may be accomplished by selectively controlling the amount of bending of actuator arm 710D (and/or 710C) such that mirror 100 controllably tilts or rotates about axis B-B or the Y axis. As a result of this rotation, the generated laser beam may be scanned from right to left along a scan line 716 or from left to right along a scan line 718. Moving from one scan line to the next may be accomplished by controlling bending of actuator arm 710A and/or actuator arm 710B to rotate the mirror 700 about axis A-A (or the X axis) by an amount corresponding to a desired scan line increment (e.g., 1 degree, 0.5 degrees, 0.4 degrees, 0.2 degrees, etc.). This motion of the mirror 700 may provide scanning (in this example) along vertical lines 719 between the horizontal scan lines. Continued control of the bending of actuators 710A-710D may enable repeated raster scanning of the pattern shown in FIG. 7B or any other desired scanning pattern.

In the arrangement of the actuator arms 710 and mirror 700 shown in FIG. 7A, the rotational forces on the mirror 700 resulting from bending of the actuators 710 in response to applied voltage are in the +/−Z-direction. As a result, bending of any actuator 710 results in rotation of the mirror 700 about a corresponding axis. For example, bending of actuators 710A or 710B results in rotation about the X axis, while bending of actuators 710C or 710D results in rotation about the Y axis. In some applications, the arrangement of actuator arms 710 shown in FIG. 7A may have some practical limitations. For example, in scanning systems, space, size, manufacturability, and/or cost considerations may dictate the viability of a particular configuration. For example, MEMS devices may involve various silicon manufacturing techniques. The configuration shown in FIG. 7A, while possible, may have disadvantages in some applications. In the embodiment of FIG. 7A, the actuator arms 710 are arranged normal to the tangent 702 to the perimeter (i.e., circumference) of the mirror 700. That is, the actuator arms 710 are arranged such that a longitudinal axis 750A-750D of each actuator arm 710A-710D extends along a line normal to a tangent 702 to the perimeter or circumference of the mirror 700. In other words, the actuator arms are arranged normal to the mirror circumference. Placement of the actuator arms 710 normal to the mirror circumference (as shown in FIG. 7A) or perimeter may increase the size of the deflector unit. A large deflector unit, while acceptable in some applications, may not be suitable in other applications. For example, a large deflector unit may not be suitable in a closely packed mirror array configuration where space is at a premium. Further, such an arrangement may increase cost, exceed certain silicon manufacturing size constraints, and increase the probability of manufacturing defects. In some applications, such an arrangement of actuator arms 710 may also reduce light collection efficiency (e.g., capturing light reflected from the ROI and returned to the scanning system).

To alleviate one or more of the above-described limitations, some embodiments of the disclosed deflector units may include one or more MEMS mirrors isolated from, and connected to, actuator arms fabricated from the same material. Additionally, in some embodiments, the actuator arms may be arranged off-normal relative to the mirror perimeter (e.g., circumference of a circular mirror, outer boundary or edges of a non-circular mirror, etc.). That is, the actuator arms 710 may be arranged such that the longitudinal axes 750 of the actuator arms 710 are not normal to, or do not make an angle of 90° with, the tangent 702 to the mirror perimeter (as it does in the embodiment of FIG. 7A). Such an off-normal arrangement of the actuator arms 710 is shown conceptually in FIG. 8A. In contrast with the embodiment of FIG. 7A, in the embodiment of FIG. 8A, the actuator arms 710 are arranged such that the longitudinal axis 750 of each actuator arm 710 makes a non-zero angle with, or is inclined with respect to, a line normal to the tangent 702 of the mirror perimeter. Such an arrangement of actuator arms 710 is described as off-normal arrangement of actuator arms 710 relative to the mirror circumference or perimeter.

Figure 8A:
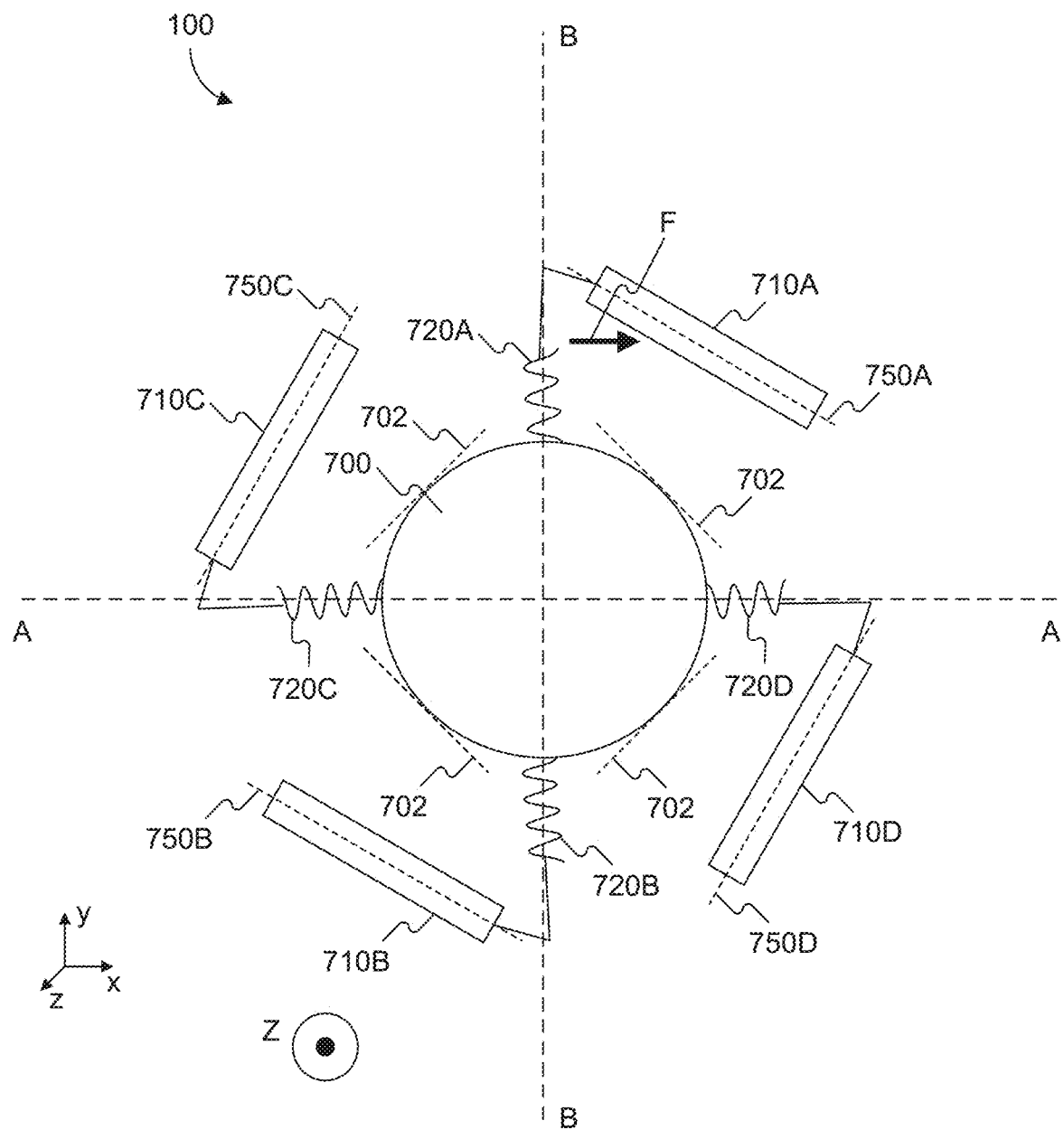
FIG. 8A is an illustration of another deflector unit of a LIDAR system.

In the embodiment of FIG. 8A, the actuator arms 710 are arranged along an edge of the mirror 700. In some embodiments, the actuator arms 710 may be arranged such that the longitudinal axis 750 of each actuator arm 710 is substantially parallel to the tangent 702 to the mirror circumference. In some embodiments (for example, where the mirror has straight sides or edges), the longitudinal axis 750 of each actuator arm 710 may be parallel to the mirror edge (i.e., the perimeter of the mirror). The longitudinal axis 750 of the actuator arm 710 may be spaced apart from the perimeter of the mirror 700 by any amount. In some embodiments, the actuator arms 710 may be positioned very close to the mirror perimeter. For example, the edge of each actuator arm 710 may be substantially coincident with the tangent 702 to the mirror perimeter. In other embodiments, they may be spaced further apart.

In some embodiments, the actuator arms 710 and the mirror 700 are made of a same material. In some embodiments, the actuator arms 710, the mirror 700, and the coupling members 720 that connect them may be made of a semiconductor material and/or formed as a single unitary component. In some embodiments, the actuator arms 710, the mirror 700, and the coupling members 720 may be made of a semiconductor material (such as, for example, silicon). In some embodiments, the actuator arms 710 and the mirror 700 may be fabricated on a silicon wafer using, for example, conventional IC fabrication techniques. Since IC fabrication techniques that may be used to fabricate such deflector units are known in the art, they are not described herein.

As described with reference to the embodiment of FIG. 7A, a movement (resulting for example, from a change in shape (e.g., bending, distortion) or translation, etc.) of one or more actuator arms 710 along a first axis (e.g., Z axis) may cause the mirror 700 to tilt about a second axis (e.g., X or Y axis) orthogonal to the first axis. The actuator arms 710 may be inclined with respect to the second axis. In some embodiments, the longitudinal axes 750 of the actuator arms 710 may be inclined with respect to the second axis. The mirror 700 and the longitudinal axes 750 of the actuator arm 710 may be disposed on a same plane (XY plane in FIG. 8A). Arranging the actuator arms 710 off-normal relative to the mirror perimeter as illustrated in FIG. 8A may enable the actuator arms 710 to be located closer to the mirror 700 and reduce the overall size of the deflector unit. As a result, the deflector unit comprising the mirror 700, the actuator arms 710, and the coupling members 720 may require significantly less space on the wafer as compared to the configuration of FIG. 7A.

While the exemplary configuration illustrated in FIG. 8A may address the space-related and manufacturing-related challenges associated with the configuration of FIG. 7A, in some cases, the configuration of FIG. 8A may result in scan pattern distortion. For example, due to the off-normal positioning of the actuator arms 710, bending of an actuator arm 710 results not just in force components along the Z axis, but will also result in force components (e.g., a "pulling" force) in the XY plane. As diagrammatically shown in FIG. 8A, bending of actuator arm 710A may result in a component of force F along the X axis. Force F may cause the mirror 700 to rotate about the Z axis (clockwise in FIG. 8A), which can cause distortion of the scanning pattern.

Figure 8B:
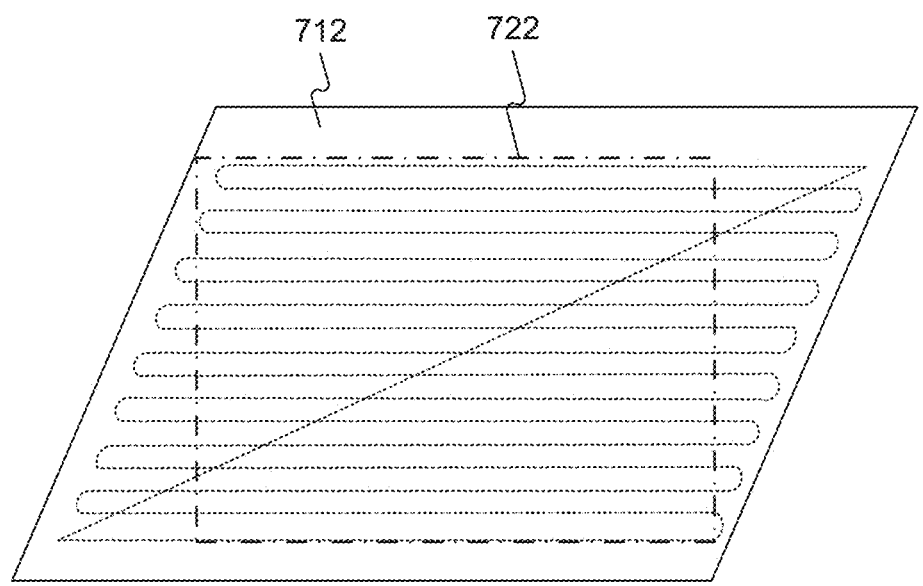
FIG. 8B is an illustration of an exemplary scan pattern obtained using the deflector unit of FIG. 8A.

FIG. 8B schematically illustrates an exemplary scan pattern of an FOV 712 that may result from the deflector unit of FIG. 8A in which the actuator arms 710 are arranged off-normal relative to the mirror perimeter. As compared to the FOV 712 of FIG. 7B, that results when the actuator arms 710 are arranged normal to the mirror perimeter (as illustrated in the embodiment of FIG. 7A), the clockwise rotation of mirror 700 resulting from force F along the X axis force may induce an offset in the scan lines, which may become more pronounced as mirror 700 is tilted toward its rotational limits about the X axis (e.g., where bending of actuator arms 710A and/or 710B approaches an operational maximum). The scan pattern shown in FIG. 8B shows the effects of distortion caused by clockwise rotation of the mirror 700 under the influence of forces, such as the above-described force F. In general, an amount of leftward or rightward shifting of the scan lines may increase as tilt increments (e.g., about the X axis in FIG. 8A) increase. Thus, as shown in FIG. 8B, scan lines near the top of the scan region are shifted to the right as a result of a clockwise rotation of mirror 700, and scan lines near the bottom of the scan region are shifted to the left as a result of the clockwise rotation of mirror 700. Such a distorted scan pattern may result in a reduction of the usable scan area (and effective field of view), as indicated by the reduction in size of the bounding rectangle 722 in FIG. 8B as compared with FIG. 7B. In some applications, deflector units with scanning mirror configurations that conform with manufacturing, space, and cost constraints, while reducing scan pattern distortion is desired. The below described embodiments of deflector units may satisfy one or more of these goals.

Figure 9A:
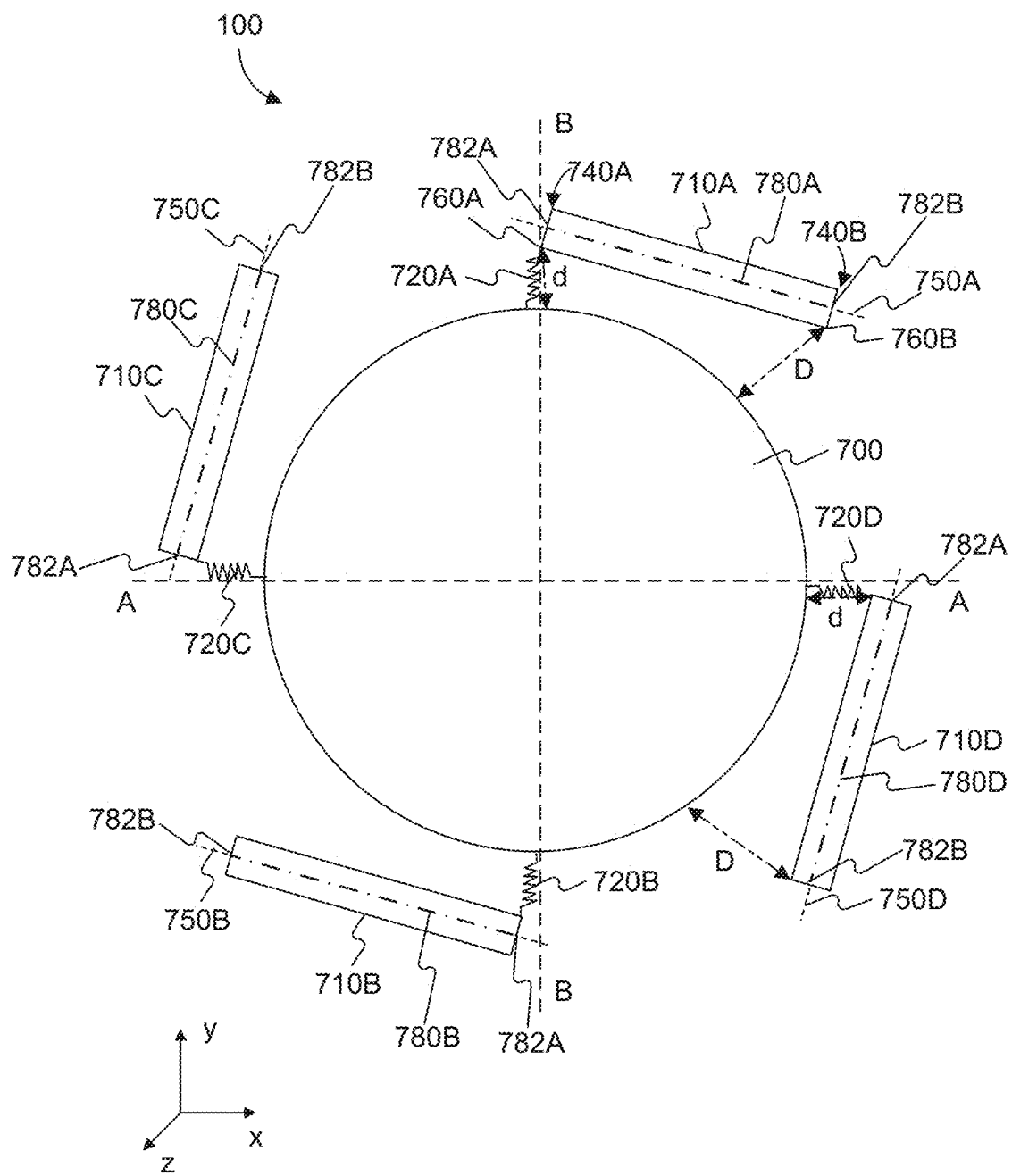
FIG. 9A is an illustration of an exemplary deflector unit of the current disclosure.

FIG. 9A illustrates an exemplary configuration of a deflector unit of the current disclosure. As evident from FIG. 9A, the deflector unit includes a mirror and at least one actuator arm. The at least one anchor arm includes an anchor end and a coupler end. In the embodiment of FIG. 9A, the deflector unit includes a mirror 700 and actuator arms 710A-710B (collectively referred to as actuator arm(s) 710), and each actuator arm 710 includes a coupler end 740A and an anchor end 740B. As shown in FIG. 9A, mirror 700 may be suspended between actuator arms 710 (710A-710D) by a plurality of corresponding couplers or coupling members 720 (720A-720D). In the example of FIG. 9A, at least one actuator arm includes an actuator axis that extends from a first midpoint to a second midpoint. The first midpoint is a midpoint of an edge of the at least one actuator arm at the coupler end, and the second midpoint is a midpoint of an edge of the at least one actuator arm at the anchor end. As can be seen in FIG. 9A, in an unactuated state, the mirror and the actuator axis of the at least one actuator arm are disposed on a same plane. For example, in the embodiment of FIG. 9A, the actuator axis 780A, 78B, 780C, and 780D of actuator arms 710A, 710B, 710C, and 710D and the mirror 700 are disposed in a common XY plane. The mirror is coupled to the coupler end of the at least one actuator arm. For example, as illustrated in FIG. 9A, an actuator axis 780A extends between a midpoint 782A of the edge of actuator arm 710A at the coupler end 740A to the midpoint 782B of the edge of the actuator arm 710A at the anchor end 740B. Similarly, actuator axis 780B, 780C, and 780D extend between the midpoints 782A of the edges of actuator arms 710B, 710C, and 710D at their coupler end 740A to the midpoints 782B of their edges at the anchor end 740B. In the illustrated embodiment of FIG. 9A, where the at least one actuator arm extends linearly from the coupler end to the anchor end, the actuator axis forms a longitudinal axis of the at least one actuator arm. For example, actuator axis 780A of actuator arm 710A forms, or is coincident with, the longitudinal axis 750A of actuator arm 710A. Similarly, actuator axis 780B of actuator arm 710B is coincident with its longitudinal axis 750B, actuator axis 780C of actuator arm 710C is coincident with its longitudinal axis 750C, and actuator axis 780D of actuator arm 710D is coincident with its longitudinal axis 750D. For the sake of brevity, in the discussion below, actuator axes 780A, 780B, 780C, and 780D may be singly or collectively referred to as actuator axis 780, and longitudinal axes 750A, 750B, 750C, and 750D may be singly or collectively referred to as longitudinal axis 750.

Mirror 700 is coupled to the coupler ends 740A of actuator arms 710. As described with reference the embodiments of FIGS. 7A and 8A, the mirror is configured to tilt about at least one tilting axis in response to a movement of the at least one actuator arm. For example, the actuator arms 710 may be coupled to mirror 700 such that a movement (e.g., deflection, translation, bending, shape distortion etc.) of one or more of the actuator arms 710 may result in a movement (e.g., tilting, rotation, etc.) of the mirror 700. For example, a movement of one or both of actuator arms 710A and 710B in the (±) Z-direction (i.e., into or out of the plane of the paper in FIG. 9A) may cause a tilting of mirror 700 about the X-axis, and a movement of one or both of actuator arms 710C and 710D in the (±) Z-direction may cause a tilting of mirror 700 about the Y-axis. As described with reference to the embodiment of FIG. 8A, the actuator arms 710 of FIG. 9A are arranged off-normal relative to the mirror perimeter (i.e., circumference for a circular mirror). That is, the actuator arms 710 are arranged such that their longitudinal axes 750 are not normal to the tangent 702 to the mirror circumference (as it is in the embodiment of FIG. 7A). While the actuator arms 710 are arranged parallel to the tangent 702 (or the mirror edge) in the embodiment of FIG. 8A, in the embodiment of FIG. 9A, as will be described in more detail below, the actuator arms 710 are inclined with respect to the tangent 702 (or the mirror edge). As also described with reference FIG. 8A, the coupler end 740A of each actuator arm 710 is coupled to the mirror 700 and the anchor end 740B of each actuator arm 710 is coupled to an anchor location. In the embodiment of FIG. 9A, the actuator arms 710 are arranged such that their coupler ends 740A are closer to the mirror 700 than their anchor ends 740B. That is, a distance between the mirror 700 and the actuator arm 710 is greater at the anchor end 740B than at the coupler end 740A. In some embodiments, a shortest distance of the coupler end to the mirror is less than a shortest distance of the anchor end to the mirror. For example, the actuator arms 710 may be arranged such that the shortest distance d of the coupler end 740A to the mirror 700 is less than the shortest distance D of the anchor end 740B to the mirror. As illustrated in FIG. 9A, the shortest distance d of the coupler end 740A to the mirror 700 is the distance between a point (or corner) of the actuator arm 710 at the coupler end 740A that is closest to the mirror 700 (e.g., point 760A) and the mirror 700. Similarly, the shortest distance D of the anchor end 740B to the mirror 700 is the distance between a point (or corner) of the actuator arm 710 at the anchor end 740B that is closest to the mirror 700 (e.g., point 760B) and the mirror 700. Distances d and D may extend in the XY plane along a line normal to the mirror edge. Alternatively, or additionally, in some embodiments, the distance of an inner edge or an outer edge of the actuator arm 710 may be greater at the anchor end 740B than a corresponding point at the coupler end 740A.

Figure 9B:
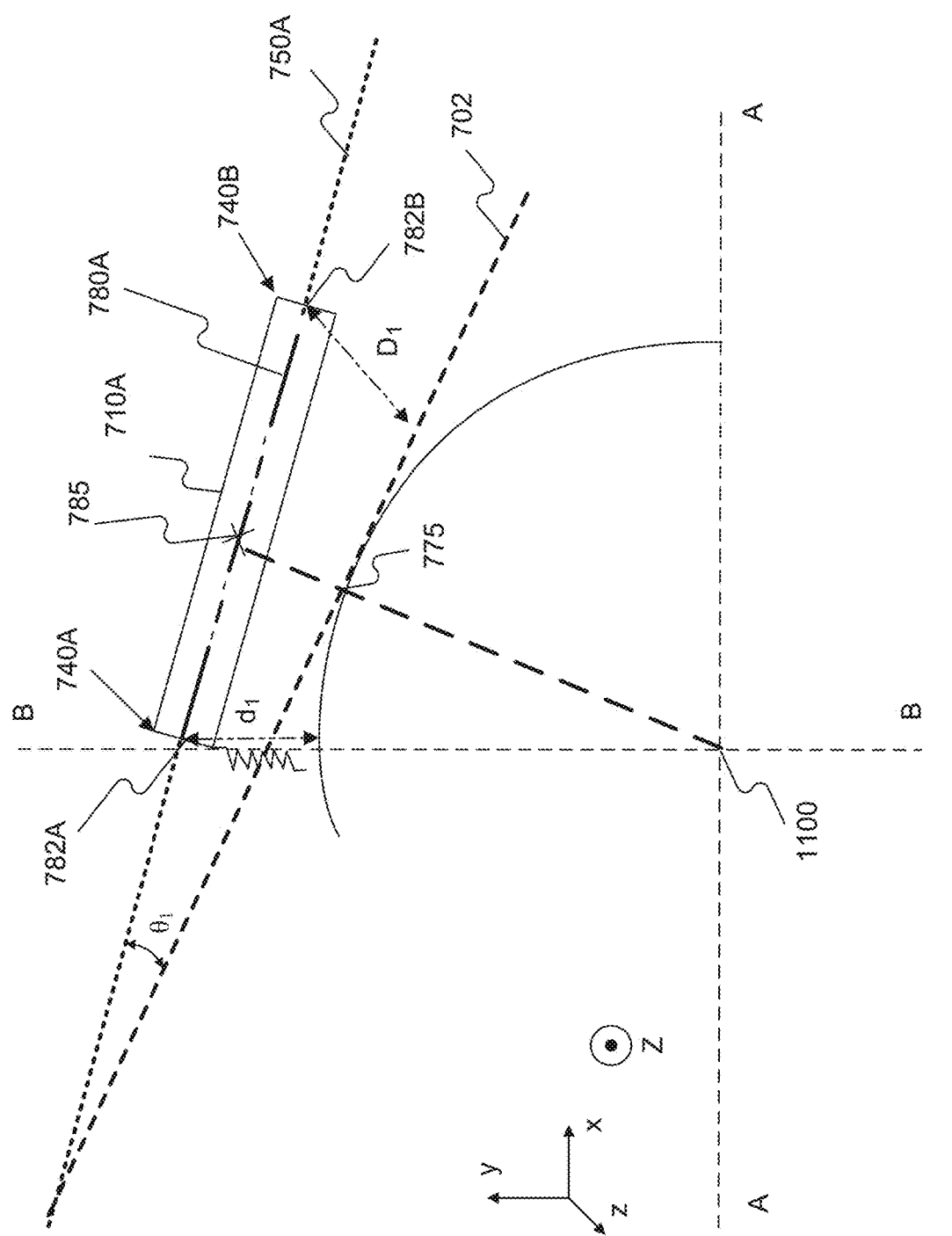
FIG. 9B is an illustration of a portion of the exemplary deflector unit of FIG. 9A.

In some embodiments, a shortest distance of the mirror from the first midpoint is less than a shortest distance of the mirror from the second midpoint. FIG. 9B illustrates a portion of the deflector unit of FIG. 9A showing a single actuator arm 710A. As described previously, the first midpoint 782A is the midpoint of the edge of each actuator arm 710 at its coupler end 740A and the second midpoint 782B is midpoint of the edge of that actuator arm 710 at its anchor end 740B. And the actuator axis 780A (which is coincident with the longitudinal axis 750A in the embodiment of FIG. 9A) extends between the first and second midpoints 782A, 782B of each actuator arm 710. As illustrated in FIG. 9B, the shortest distance $d_1$ of the mirror 700 from the first midpoint 782A may be less than a shortest distance D1 of the mirror 700 from the second midpoint 782B. In some embodiments, a virtual line between a midpoint of the actuator axis and a center of the mirror intersects a perimeter of the mirror at a first point. That is, as illustrated in FIG. 9B, a virtual line extending between a midpoint 785 of the actuator axis 780A and a center 1100 of the mirror 700 intersects a perimeter of the mirror 700 at a first point 775. Each actuator arm 710 may be arranged such that its actuator axis 780 is inclined with respect to a tangent 702 to the perimeter of the mirror 700 at the first point 775. At least one actuator arm may be arranged such that its actuator axis is inclined at an angle greater than zero degrees and less than ninety degrees with respect to a tangent to the perimeter of the mirror at the first point. For example, as illustrated in FIG. 9B, actuator arm 710A may be arranged such that its actuator axis 780A makes an angle $\theta_1$ with the tangent 702 to the perimeter 702 of the mirror 700 at the first point 775. In some embodiments, the inclination angle $\theta_1$ may be non-zero and less than 90 degrees (i.e., $0<\theta_1<90°$). In some embodiments, the actuator axis may be inclined at an angle greater than zero degrees (0°) and less than ninety degrees (90°) with respect to the tangent to the perimeter of the mirror at the first point.

Figure 10A:
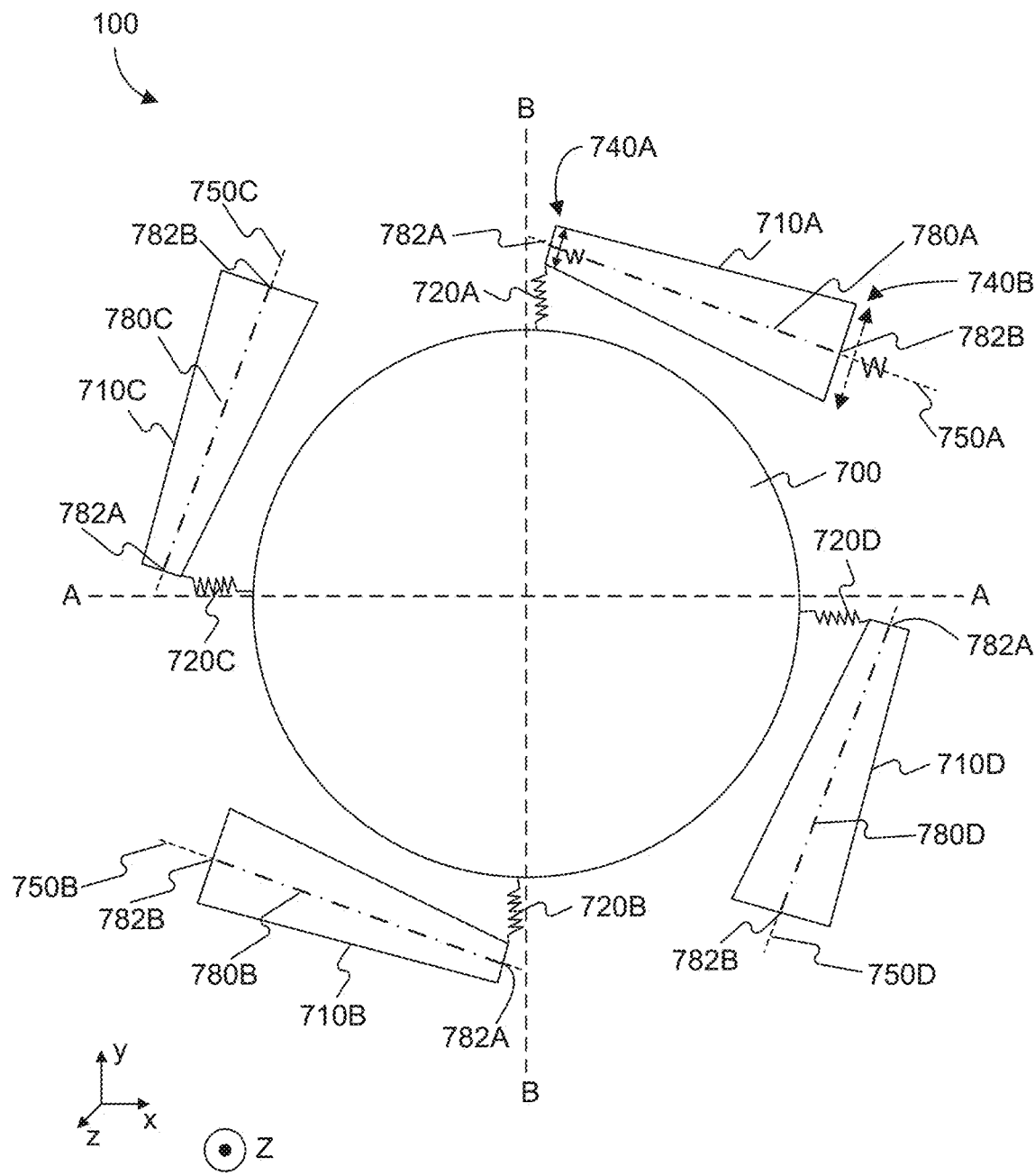
FIG. 10A is an illustration of another exemplary deflector unit of the current disclosure.

Although each actuator arm 710 is illustrated as having a rectangular shape in FIG. 9A, this is only an example configuration. In some embodiments, the actuator arms 710 may have other shapes. For example, in some embodiments, as illustrated in FIG. 10A, each actuator arm 710 may have a trapezoidal shape (in the XY plane). Although not a requirement, in some embodiments, each actuator arm 710 may have an isosceles trapezoidal shape. In some embodiments, the at least one actuator arm has a first width at the anchor end and a second width at the coupler end, and wherein the first width is greater than the second width. In some embodiments, the edge of the at least one actuator arm at the coupler end has a first width and the edge of the at least one actuator arm at the anchor end has a second width greater than the first width. For example, as shown in FIG. 10A, each actuator arm 710 may have a width W at the anchor end 740A and a smaller width w at the coupler end 740B. In some cases, the width profile of the actuator arm 710 may change linearly (as shown in FIG. 10), but in other cases the width profile may change in another suitable manner (e.g., curved, etc.). For example, in some cases, each actuator arm 710 may have one or more curved edges such that the width profile varies non-linearly from the anchor end 740B to the coupler end 740A. It should be noted that a trapezoidal shape of the actuator arm 710 is not a requirement in the embodiment of FIG. 10A. Instead, actuator arm 710 may have any shape so long as its width at the anchor end 740B is greater than its width at the coupler end 740A. As described previously with reference to FIGS. 9A and 9B, each actuator arm 710 in the embodiment of FIG. 10A may also have a first midpoint 782A at its coupler end 740A and a second midpoint 782B at its anchor end 740B. That is, first midpoint 782A is the midpoint of the edge of each actuator arm 710 at its coupler end 740A and the second midpoint 782B is midpoint of the edge of that actuator arm 710 at its anchor end 740B. Actuator axis 780A extends between the first and second midpoints 782A, 782B of each actuator arm 710. As in the embodiment of FIG. 9A, in the embodiment of FIG. 10A, the actuator axis 780 of each actuator arm 710 is coincident with its longitudinal axis 750.

Figure 10B:
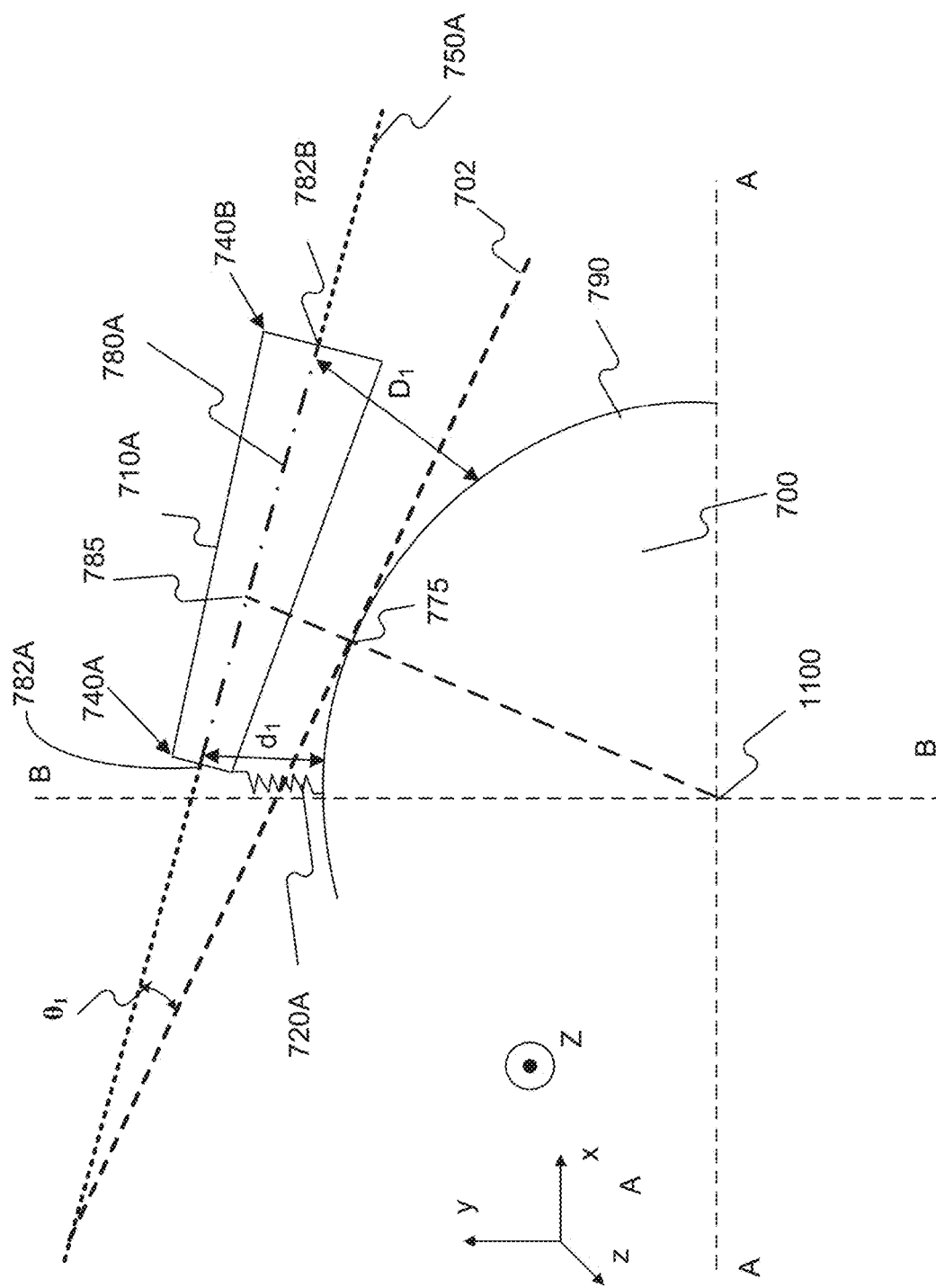
FIG. 10B is an illustration of a portion of the exemplary deflector unit of FIG. 10A.

FIG. 10B illustrates a portion of the deflector unit of FIG. 10A showing a single actuator arm 710. As described previously, the first midpoint 782A is the midpoint of the edge of each actuator arm 710 at its coupler end 740A and the second midpoint 782B is midpoint of the edge of that actuator arm 710 at its anchor end 740B, and actuator axis 780A extends between the first and second midpoints 782A, 782B. As in the embodiment of FIG. 9A, a shortest distance of the mirror from the first midpoint is less than a shortest distance of the mirror from the second midpoint. For example, in FIG. 10B, the shortest distance $d_1$ of the mirror 700 from the first midpoint 782A may be less than a shortest distance D1 of the mirror 700 from the second midpoint 782B. In some embodiments, a virtual line between the midpoint 785 of the actuator axis 780A and the mirror center 1100 intersects the perimeter of the mirror 700 at first point 775. As in the embodiment of FIGS. 9A and 9B, in the embodiment of FIGS. 10A and 10B, each actuator arm 710 may be arranged such that its actuator axis 780 is inclined with respect to the tangent 702 to the perimeter of the mirror 700 at the first point 775 by an angle $\theta_1$. For example, as illustrated in FIG. 10B, actuator arm 710A may be arranged such that its actuator axis 780A makes an angle $\theta_1$ with the tangent 702 to the perimeter 702 of the mirror 700 at the first point 775. In some embodiments, the inclination angle $\theta_1$ may be non-zero and less than 90 degrees (i.e., $0<\theta_1<90°$).

Figure 11:
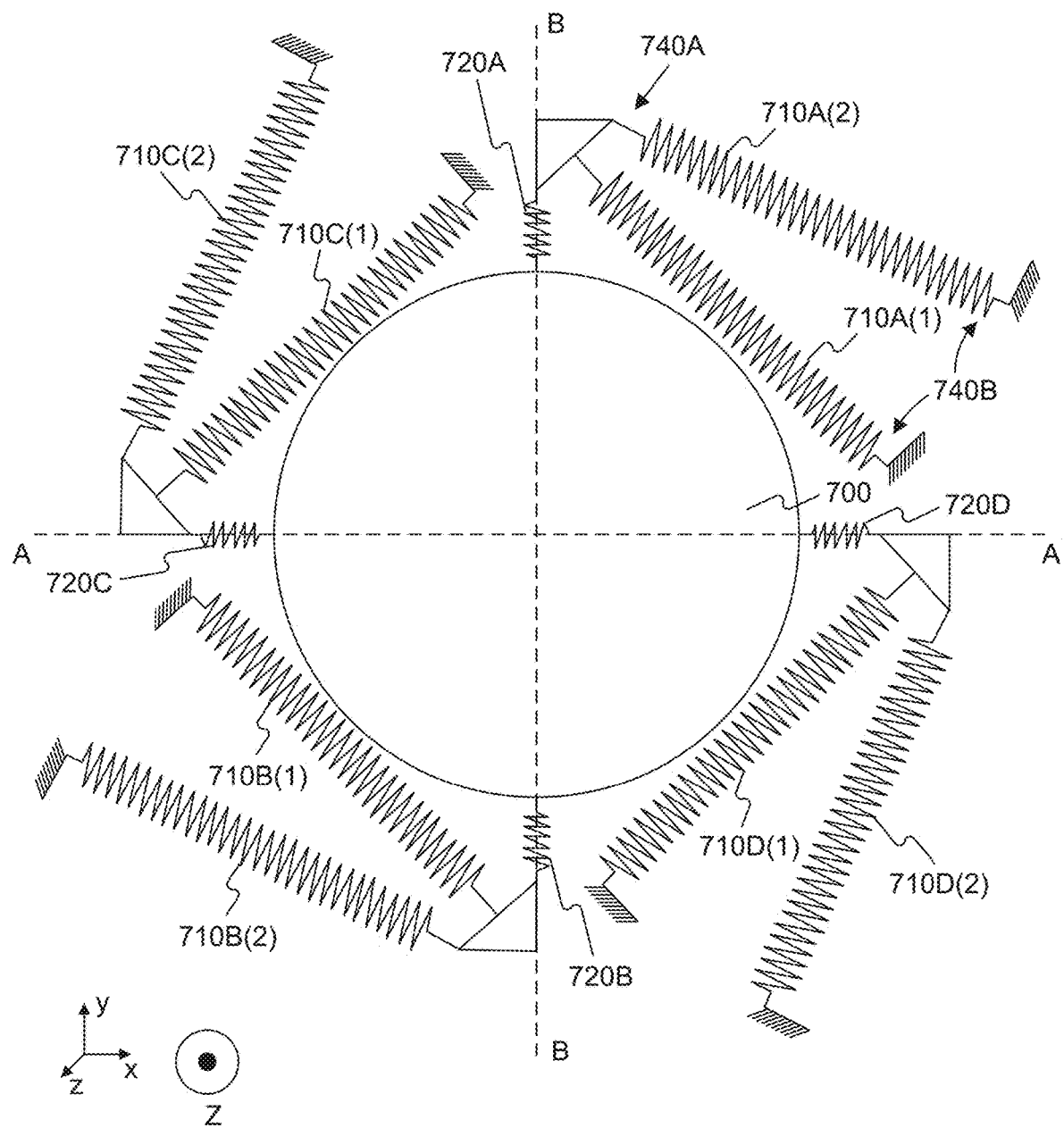
FIGS. 11 and 12A illustrate other exemplary deflector units of the current disclosure.

In the embodiments described above, each coupling member 720 is coupled to a single actuator arm 710. In some cases, each coupling member 720 may be attached to two or more actuator arms. In the example configuration schematically illustrated in FIG. 11, coupling member 720A is attached to two actuator arms (i.e., a pair of actuator arms), for example, an inner actuator arm 710A(1) and an outer actuator arm 710A(2). Coupling members 720B-720D are similarly attached to two actuator arms. That is, coupling member 720B is attached to inner actuator arm 710B(1) and outer actuator arm 710B(2), coupling member 720C is attached to inner actuator arm 710C(1) and outer actuator arm 710C(2), and coupling member 720D is attached to inner actuator arm 710D(1) and outer actuator arm 710D(2). For the sake of brevity, the configuration of only one set of inner and outer actuator arms (e.g., inner actuator arm 710A(1) and outer actuator arm 710A(2)) will be described.

This description is applicable to the other sets of inner and outer actuator arms (710B(1) and 710B(2); 710C(1) and 710C(2); and 710D(1) and 710D(2)). As evident in FIG. 11, and will be described in more detail with reference to FIGS. 12B-12E, the inner and the outer actuator arms 710A(1) and 710A(2) are arranged such that they diverge from each other from their coupler end 740A to their anchor end 740B. For example, the inner actuator arm 710A(1) may be inclined with respect to a tangent to the mirror perimeter first angle and the outer actuator arm 710A(2) may be inclined with respect to the tangent by a second angle greater than the first angle.

In some embodiments, each actuator arm of the at least one actuator arm includes an outer actuator arm and an inner actuator arm coupled together, wherein the coupler ends of the outer actuator arm and the inner actuator arm of each actuator arm are coupled to the mirror at a same location on the mirror. For example, Inner and outer actuator arms (e.g., inner actuator arm 710B(1) and outer actuator arm 710B(2)) may be coupled together (e.g., at their coupler ends 740A) and the coupler ends 740A of both the inner and outer actuator arms 710B(1), 710B(2) may be coupled to the same location on mirror 700. In some embodiments, the inner actuator arm 710A(1) may be configured similar to the actuator arms of FIG. 8A. For example, as in the embodiment of FIG. 8A, both the anchor end 740B and the coupler end 740A of the inner actuator arm 710A(1) may be approximately the same distance from the mirror 700. In some embodiments, the outer actuator arm 710A(2) may be configured similar to the actuator arms of FIG. 9A. For example, as described with reference to FIG. 9A, the anchor end 740B of the outer actuator arm 710A(2) may be located farther away from the mirror 700 than its coupler end 740A. This configuration of the inner and outer actuator arms 710A(1) and 710A(2) results in an angle between the inner and outer actuator arms 710A(1) and 710A(2). This angle may be non-zero and less than 90 degrees. In some cases, as the angle between the inner and outer actuator arms 710A(1) and 710A(2) is increased, the amount of clockwise rotation imparted to the mirror 700 by bending the actuator arms may be decreased.

Figure 12A:
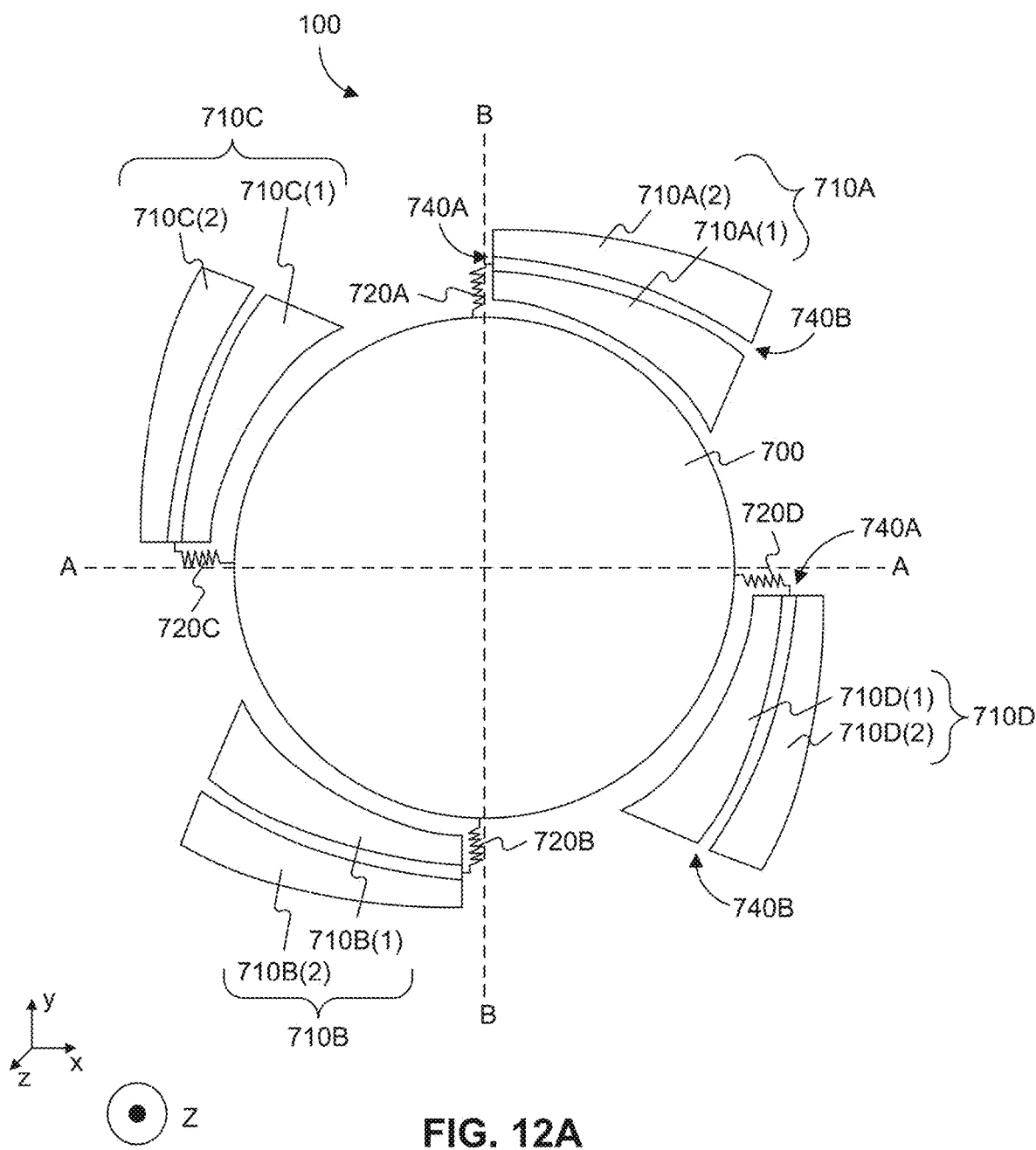

FIG. 12A is a diagrammatic representation of another exemplary embodiment of a deflector unit. In this embodiment, as in the embodiment of FIG. 11, each coupling member 720 is connected to two actuator arms, i.e., an inner actuator arm and an outer actuator arm. That is, coupling member 720A is connected to an inner actuator arm 710A(1) and an outer actuator arm 710A(2), etc. While all actuator arms are positioned along the perimeter of mirror 700, the outer actuator arm 710A(2) is configured such that the distance of its anchor end 740B from the mirror 700 is greater than the distance of its coupler end 740A from the mirror 700. Additionally, inner actuator arm 710A(1) may be configured such that its width at the anchor end 740B is greater than its width at the coupler end 740A. Although not a requirement, in some embodiments, outer actuator arm 710A(2) may also have a larger width at the anchor end 740B than at its coupler end 740A. In some embodiments, outer actuator arm 710A(2) may have a substantially constant width from its anchor end 740B to its coupler end 740A. In some embodiments, the coupler ends of the outer actuator arm and the inner actuator arm of each actuator arm are coupled together and a coupling member connects the coupler end of the outer actuator arm to the mirror. That is, in some embodiments, inner actuator arm 710A(1) may be connected to outer actuator arm 710A(2) at the coupler end 740A, and the coupling members 720 may be connected to the outer actuator arm 710A(2) to enable the widest range of rotation and/or bending. As illustrated in FIG. 12A, inner and outer actuator arms 710A(1) and 710A(2) are coupled to the mirror 700 at the same location in the mirror 700 via coupling member 720A.

Figure 12B:
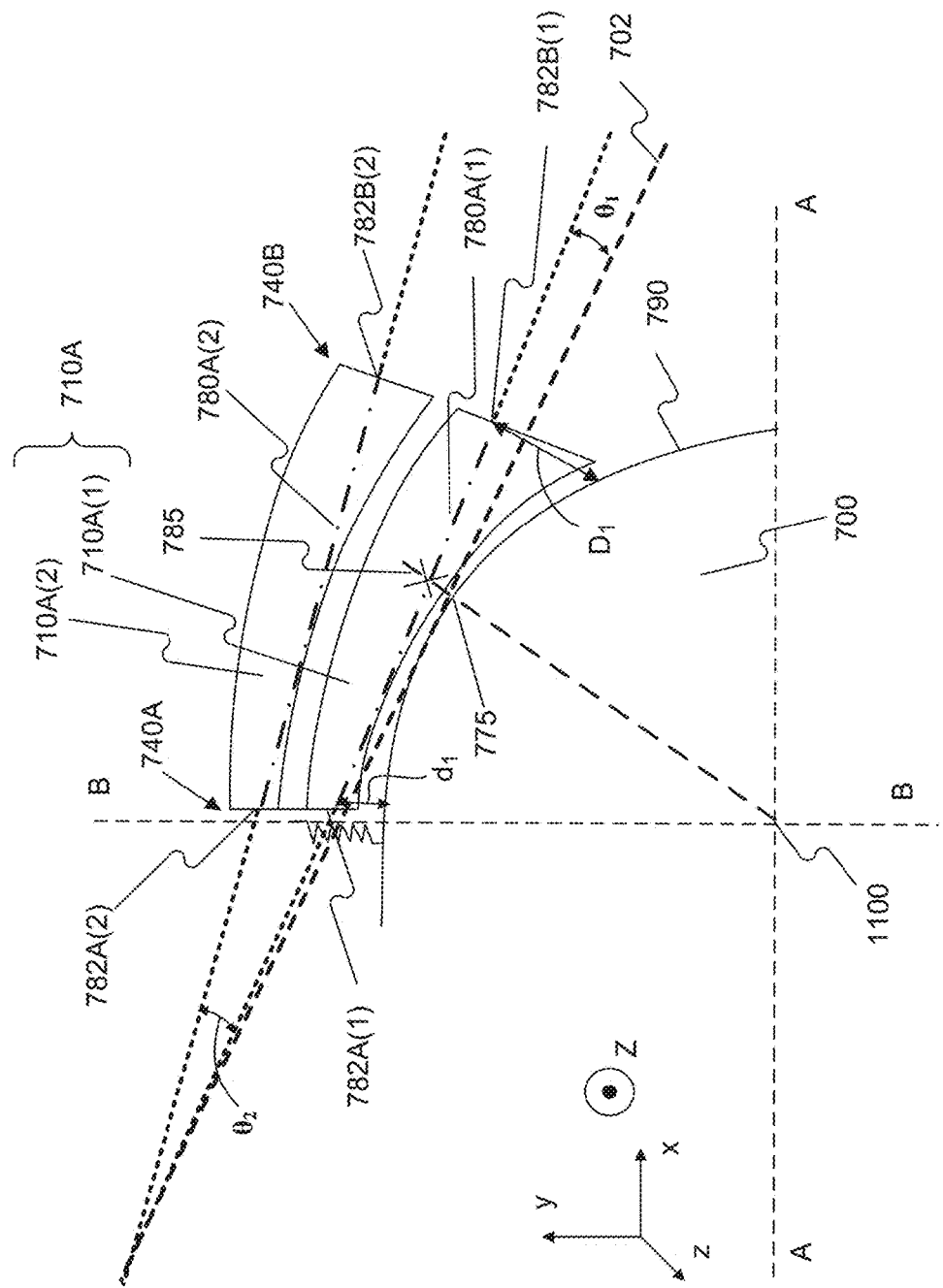
FIG. 12B is an illustration of a portion of the exemplary deflector unit of FIG. 12A.

In some embodiments, each actuator arm of the at least one actuator arm includes an outer actuator arm and an inner actuator arm coupled together, and the coupler ends of the outer actuator arm and the inner actuator arm of each actuator arm are coupled to the mirror at a same location on the mirror. FIG. 12B illustrates a portion of the deflector unit of FIG. 12A showing a single actuator arm 710A comprising inner actuator arm 710A(1) and outer actuator arm 710A(2). The coupler ends 740A of the outer actuator arm 710A(2) and the inner actuator arm 710A(1) of each actuator arm 710 are coupled to the mirror 700 at a same location on the mirror 700. In some embodiments, the actuator axis of the at least one actuator arm is a first actuator axis that extends from the first midpoint to the second midpoint of the inner actuator arm. The outer actuator arm includes a second actuator axis that extends from a third midpoint to a fourth midpoint. The third midpoint is the midpoint of an edge of the outer actuator arm at the coupler end and the fourth midpoint is the midpoint of an edge of the outer actuator arm at the anchor end. Inner actuator arm 710A(1) has a first midpoint 782A(1) and outer actuator arm 710A(2) has a third midpoint 782A(2) at their respective coupler ends 740A. And inner actuator arm 710A(1) has a second midpoint 782B(1) and outer actuator arm 710A(2) has a fourth midpoint 782B(2) at their respective anchor ends 740B. The first and third midpoints 782A(1), 782A(2) of the inner and outer actuator arms 710A(1), 710A(2) are the midpoints of the edges of the respective actuator arm 710A(1), 710A(2) at their coupler end 740A. And the second and fourth midpoints 782B(1), 782B(2) are the midpoints of the edges of the respective actuator arm 710A(1), 710A(2) at their anchor ends 740B. An inner or first actuator axis 780A(1) extends between the first and second midpoints 782A(1), 782B(1) of the inner actuator arm 710A(1), and an outer or second actuator axis 780A(2) extends between the third and fourth midpoints 782A(2), 782B(2) of the outer actuator arm 710A(2).

As illustrated in FIG. 12B, the shortest distance ($d_1$) of the mirror 700 from the first midpoint 782A(1) of the inner actuator arm 710A(1) may be less than the shortest distance ($D_1$) of the mirror 700 from the second midpoint 782B(1) of the inner actuator arm 710A(1). Similarly, in some embodiments, the shortest distance of the mirror 700 from the third midpoint 782A(2) of the outer actuator arm 710A(2) may be less than the shortest distance of the mirror 700 from the fourth midpoint 782B(2) of the outer actuator arm 710A(2). As illustrated in FIG. 12B, the width of the inner actuator arm 710A(1) at the coupler end 740A may be less than its width at the anchor end 740B. Alternatively, or additionally, in some embodiments, the width of the outer actuator arm 710A(2) at the coupler end 740A may be less than its width at the anchor end 740B.

Figure 12C:
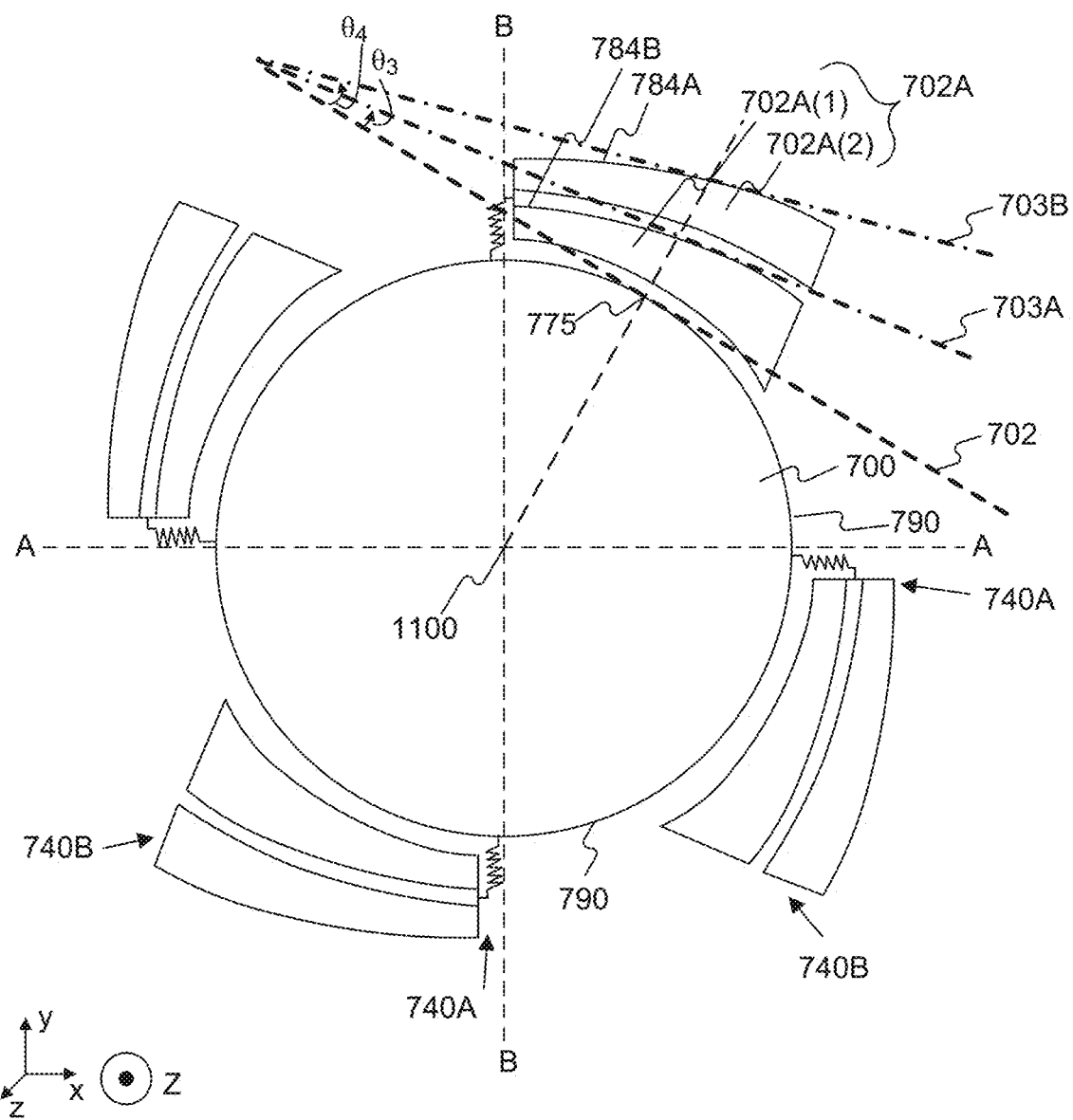
FIGS. 12C, 12D, and 12E are illustrations of exemplary configurations of the deflector unit of FIG. 12A.
Figure 12D:
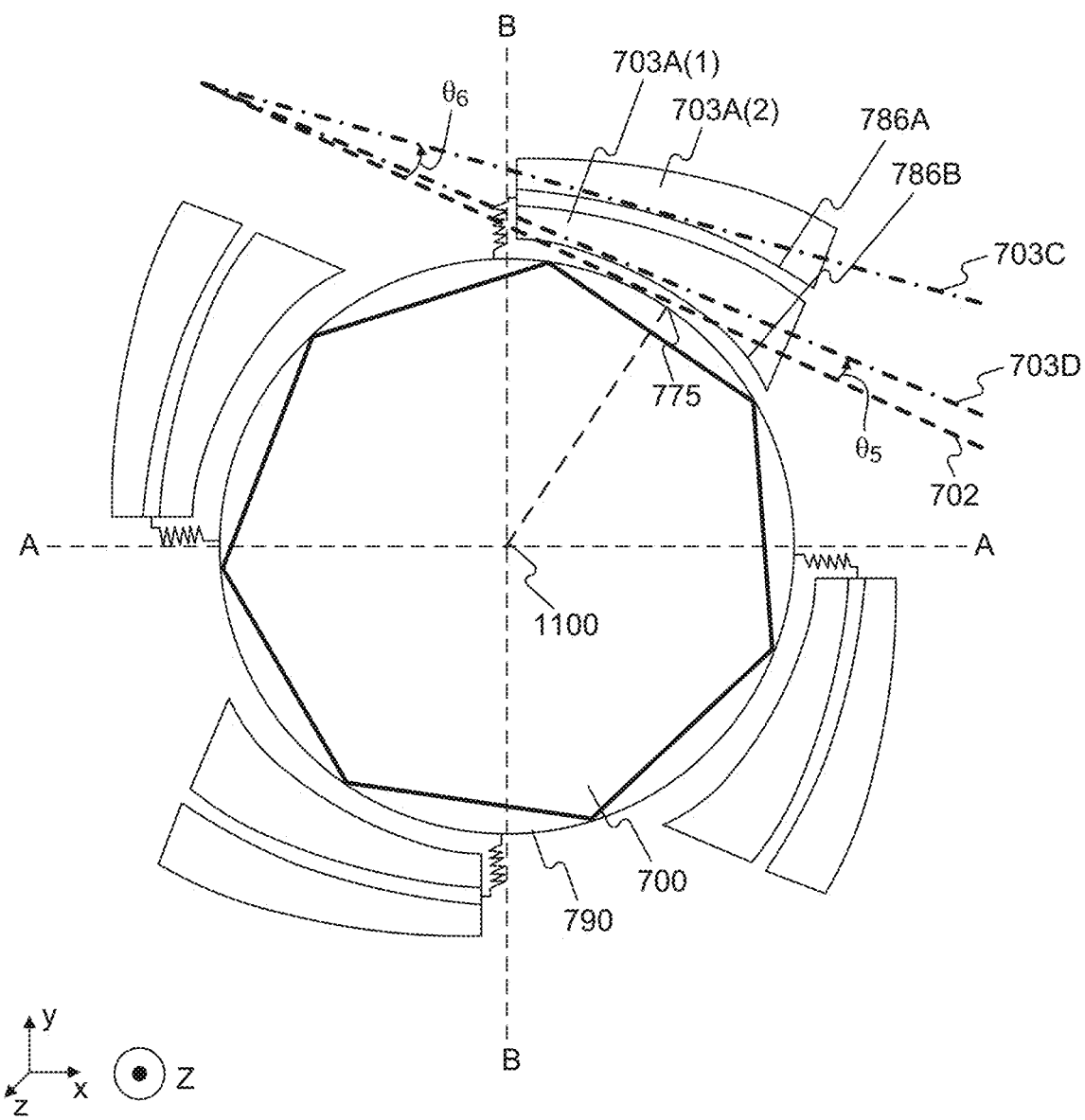
Figure 12E:
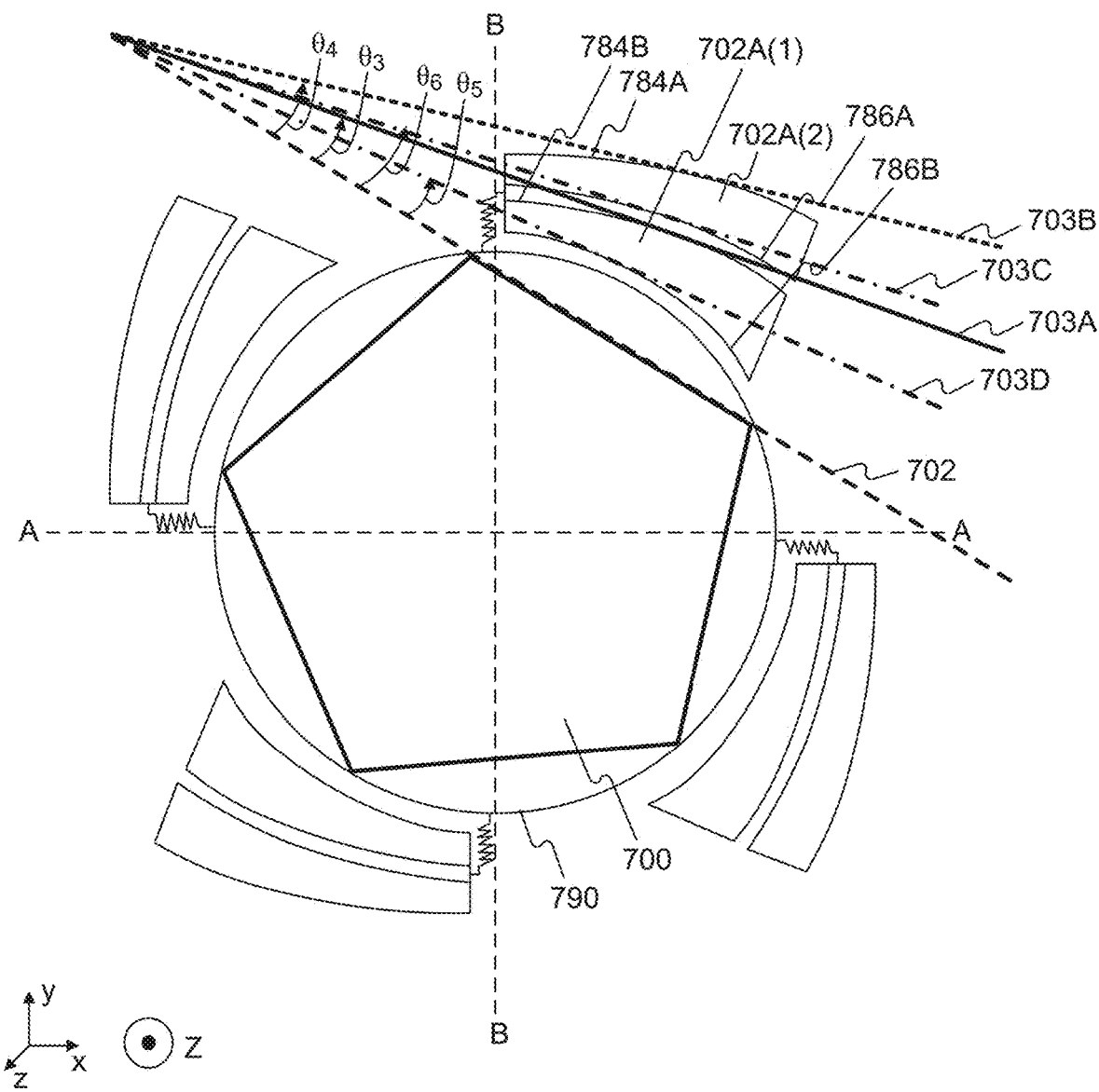

As explained previously, in embodiments of the current disclosure, mirror 700 may have any suitable shape. For example, in some embodiments, mirror 700 may have a perimeter with a curved external boundary (e.g., circular, elliptical, oval, etc.) and in some embodiments, mirror 700 may have a perimeter comprised of linear boundary elements (e.g., square, rectangular, hexagonal, pentagonal, octagonal, etc.). It is also contemplated that, in some embodiments, the mirror 700 may have an outer surface comprised of both curved and linear sections or an irregular external boundary (see, for example, FIGS. 12D and 12E). It should be noted that the current description is equally applicable to mirrors of all shapes. In embodiments where mirror 700 is circular (as illustrated in FIG. 12B), the outer profile 790 corresponds to the circumference of the mirror 700. In embodiments where the mirror 700 has linear boundary elements (as illustrated in FIGS. 12D and 12E) or an irregular boundary, the outer profile 790 corresponds to the perimeter of a curve that circumscribes the boundary of the mirror 700.

A virtual line between a midpoint of the first actuator axis and a center of the mirror intersects an outer profile of the mirror at a first point. As illustrated in FIG. 12B, a virtual line extending between the midpoint 785 of the first actuator axis 780A(1) and the mirror center 1100 intersects the perimeter or outer profile 790 of the mirror 700 at first point 775. The first actuator axis is inclined with respect to a tangent to the outer profile of the mirror at the first point by a first angle and the second actuator axis is inclined with respect to the tangent to the outer profile of the mirror at the first point by a second angle. The second angle may be greater than the first angle. As shown in FIG. 12B, the inner or first actuator axis 780A(1) may be inclined with respect to the tangent 702 to the outer profile 790 or perimeter of the mirror 700 at the first point 775 by an angle $\theta_1$. In the discussion below, the inclination of the actuator axis of an actuator arm with respect to tangent 702 is referred to as the inclination of the actuator arm. In some embodiments, the inclination angle $\theta_1$ of the inner actuator arm 710A(1) may be non-zero and less than 90 degrees (i.e., 0<$\theta_1$<90°). The outer or second actuator axis 780A(2) may be inclined with respect to the tangent 702 by an angle $\theta_2$. In some embodiments, the inclination angle of the outer actuator arm 710A (2) (i.e., angle $\theta_2$) may be greater than the inclination angle of the inner actuator arm 710A(1) (i.e., angle $\theta_1$). That is, in some embodiments, $\theta_2 > \theta_1$. In some embodiments, the inclination angle $\theta_2$ of the outer actuator arm 710A(2) may also be non-zero and less than 90 degrees (i.e., 0<$\theta_1$<90°). When $\theta_2 > \theta_1$, the inner and outer actuator arms 710A(1), 710A(2) diverge from each other from their coupler to anchor ends 740A, 740B.

In some embodiments, the at least one actuator arm is curved between the coupler end and the anchor end and the actuator axis forms a chord of the curved at least one actuator arm. In the embodiment of FIGS. 12A and 12B, both inner and outer actuator arms 710A(1) and 710A(2) are curved between the coupler and anchor ends 740A, 740B. As illustrated in FIG. 12B, the inner or first actuator axis 780A(1) extends between the first and second midpoints 782A(1), 782B(1) of the inner actuator arm 710A(1) such that the first actuator axis 780A(1) forms a chord of the arc-shaped or curved inner actuator arm 710A(1). In the current disclosure, the term "chord" is used to refer to a straight-line segment that connects the end points of a curved or arc-shaped segment. In a similar manner, the outer or second actuator axis 780A(2) extends between the third and fourth midpoints 782A(2), 782B(2) of the outer actuator arm 710A(2) such that the second actuator axis 780A(2) forms a chord of the curved outer actuator arm 710A(2).

In some embodiments, the outer actuator arm has a first curved outer surface facing away from the mirror and the inner actuator arm has a second curved outer surface facing away from the mirror, and an angle between a tangent to the first curved outer surface and the tangent to the outer profile of the mirror at the first point is greater than an angle between a tangent to the second curved outer surface and the tangent to the outer profile of the mirror at the first point. With reference to FIG. 12C, both inner and outer actuator arms 710A(1), 710A(2) includes a curved outer surface oriented away from the mirror 700. That is, outer actuator arm 710A(2) includes a first curved outer surface 784A facing away from the mirror 700 and inner actuator arm 702A(1) includes a second curved outer surface 784B facing away from the mirror 700. The curvatures of the inner and outer actuator arms 710A(1) and 710A(2) may be configured to increase the efficiency of the deflector unit. As explained with reference to FIG. 12B, a virtual line extending between the midpoint 785 of the first actuator axis 780A(1) of the inner actuator arm 710A(1) and the mirror center 1100 intersects the perimeter or outer profile 790 of the mirror 700 at first point 775. In some embodiments, an angle $\theta_4$ between a tangent 703B to the first curved outer surface 784A (of the outer actuator arm 710A(2)) and the tangent 702 to the outer profile 790 (or perimeter) of the mirror 700 is greater than an angle $\theta_3$ between a tangent to the second curved outer surface 784B (of the inner actuator arm 710A(1)) and the tangent 702 to the outer profile 790 of the mirror 700. That is, in some embodiments, $\theta_3$ and $\theta_4$ may be greater than zero, and $\theta_4$ may be greater than $\theta_3$.

In some embodiments, the outer actuator arm has a first curved inner surface facing the mirror and the inner actuator arm has a second curved inner surface facing the mirror, and an angle between a tangent to the first curved inner surface and the tangent to the outer profile of the mirror at the first point is greater than an angle between a tangent to the second curved inner surface and the tangent to the outer profile of the mirror at the first point. For example, with reference to FIG. 12D, the outer actuator arm 710A(2) has a first curved inner surface 786A facing (or oriented towards) the mirror 700 and the inner actuator arm 702A(1) has a second curved inner surface 786B facing the mirror 700. In some embodiments, the curvatures of these inner surfaces may be configured such that the angle $\theta_6$ (or the magnitude of the angle) between the tangent 703C to the first curved inner surface 786A and the tangent 702 to an outer profile 790 of the mirror 700 at the first point 775 is greater than the angle $\theta_5$ (or the magnitude of the angle) between the tangent 703D to the second curved inner surface 786B and the tangent 702. As explained previously, in embodiments where mirror 700 is circular, the outer profile 790 corresponds to the circumference of the mirror 700, and in embodiments where the mirror 700 has linear or other types of boundary elements, the outer profile 790 corresponds to the perimeter of a curve that circumscribes the boundary of the mirror 700.

In some embodiments, as illustrated in FIG. 12E, the curvatures of the inner and outer actuator arms 710A(1) and 710A(2) may be such that the angle $\theta_4$ between the tangent 703B to the first curved outer surface 784A (of the outer actuator arm 710A(2)) and the external edge (or the tangent to the outer profile 790) of the mirror 700 is greater than the angle $\theta_3$ between the tangent 703A to the second curved outer surface 784B (of the inner actuator arm 710A(1)) and the external edge (or the tangent to the outer profile 790) of the mirror 700. Alternatively, or additionally, the angle $\theta_6$ between the tangent 703C to the first curved inner surface 786A (of the outer actuator arm 710A(2)) and the external edge (or the tangent to the outer profile 790) is greater than the angle $\theta_5$ between the tangent 703D to the second curved inner surface 786B (of the inner actuator arm 710A(1)) and the external edge (or the tangent to the outer profile 790). It should be noted that, in general, the tangents 703A-703D on the curved outer and inner surfaces of the inner and outer actuator arms 710A(1), 710A(2) may be located at any point on these surfaces. In some embodiments, these tangents may be located at a point on the surface where the virtual line between the midpoint of the first actuator axis 780A(1) and the mirror center 1100 intersects these surfaces (see FIG. 12B). For example, tangent 703A to the second curved outer surface 784B of the inner actuator arm 710A(1) may be formed at a location on the outer surface 784B where the virtual line intersects the outer surface 784B, etc.

It should be noted that any of the described actuator arm features may be incorporated together in any combination. Further, in some cases, a total footprint (or the area in the XY plane) of the deflector units described with reference to FIGS. 8A-12A may be similar to, or less than the footprint associated with the embodiment of FIG. 7A. Additionally, while the embodiments described above are shown with one actuator arm per coupling member or two actuator arms per coupling member, other combinations of the actuator arms and coupling member may be used. For example, in some cases three or more actuator arms may be attached to a single coupling member.

Each of the embodiments of deflector units described above in FIGS. 9A-12A, and various combinations or obvious modifications thereof, may offer improved performance of a scanning system by, for example, reducing scanning distortion. For example, the described configurations of actuator arms may inhibit rotation of the mirror 700 under the influence of forces such as force component FIG. 8A. In some cases, the above-described embodiments of deflector units, or combinations thereof, may reduce the rotation of mirror 700 about the Z axis (e.g., in the clockwise direction) by about 50%, as compared to the embodiment of FIG. 8A. In some examples, the clockwise rotation of mirror 700 in the embodiment of FIG. 8A may be about 7-8 degrees (at a 10 degree×10 degree orientation of the mirror about the X and Y axes, respectively), whereas the clockwise rotation of mirror 700 in the configurations of FIGS. 9A-12A may be 4.5 degrees or less. It should be noted that while the embodiments of FIGS. 9A-12A may reduce clockwise rotation of the mirror 700, other comparable configurations may reduce counter-clockwise rotations of the mirror. This reduction in clockwise rotation of the mirror can provide less distorted scan patterns and may increase the effective field of view of a scanning system (such as a scanning LIDAR system) by 1.5 degrees or more.

In some cases, the described embodiments may also enable larger Z axis forces to be applied to the mirror 700 through the coupling members such that greater translations of the mirror 700 in the +/−Z direction may be achieved. In some cases, the embodiments of FIGS. 9A-12A may increase the translation of the mirror in the Z direction by 10%, 15%, 20% or more.

Example Implementation: Coupler for a Scanning MEMS Mirror

In some embodiments, a deflector unit for a light scanning system may include a mirror, at least one actuator arm including an anchor end and a coupler, and a coupling member coupling the at least one actuator arm to the mirror. For example, as described with reference to FIGS. 7A-12E, in light deflections units of the current disclosure, mirror 700 is coupled to a plurality of actuator arms 710 via couplers or coupling members 720, and a deflection (bending, translation, etc.) of one or more of the actuator arms 710 translates into a corresponding movement (e.g., tilting, etc.) of the mirror 700. In some cases, when scanning mirrors 700 are coupled to actuator arms (e.g., actuator arms 710A-710D of FIG. 9A) via couplers (such as coupling members 720A-720D), the efficiency with which forces applied by the actuator arms are transferred to the mirror 700 through the coupling members may be limited. The coupling members may be highly efficient at transferring force from the actuator arms to the mirror 700 and may provide significant motion of the mirror 700 with relatively little force input. On the other hand, coupling members that are less efficient at transferring force from the actuator arms to the mirror 700 may cause less motion of the mirror 700 even with a greater input force.

Another important characteristic of a scanning mirror system is linearity of operation. For example, in some cases, a scanning mirror system may exhibit a resonance frequency of oscillation at or near which a mirror (such as the mirror shown in FIG. 9A) rapidly oscillates about the X or Y axes even with a relatively small force input from the actuator arms. Such resonance oscillation, however, may be undesirable for certain applications, as the rotation of the mirror 700 may follow a sine wave oscillation pattern. Such a pattern is associated with certain mirror orientations (e.g., at or near the maximum + and − rotational displacements of the mirror) where the rotational speed is at or near 0. Rotational speed of the mirror increases, however, as the mirror rotates back toward an equilibrium position. At an orientation parallel to the XY plane (i.e., the equilibrium position), the rotational speed of the mirror will be at its maximum. These changes in the rotational speed in a resonance oscillation mode may be undesirable in certain systems, such as scanning LIDAR systems, where it may be more beneficial to scan an ROI at a constant or near constant scan rate. Such a constant scan rate, for example, may result in evenly spaced data points in a point cloud. Varying rotational speeds of a scanning mirror, on the other hand, may result in variable spacing between data points in a point cloud, which can result in undesirable gaps in the point cloud. To achieve a constant or near constant scan rate, it may be desirable to tilt the mirror 700 of a scanning mirror system at a constant or near constant rotational rate with little to no variation in rotational speed over most, if not all, of the mirror's range of motion. In some cases, there may be a linear relationship between a voltage applied to the actuator arms (e.g., actuator arms comprising a piezoelectric material) and an amount of tilt of the mirror 700 about either the X or Y axis, for example. The disclosed exemplary configurations of coupling members may assist in addressing one or more challenges associated with scan pattern distortion, force transfer efficiency, and/or operational linearity.

Figure 13A:
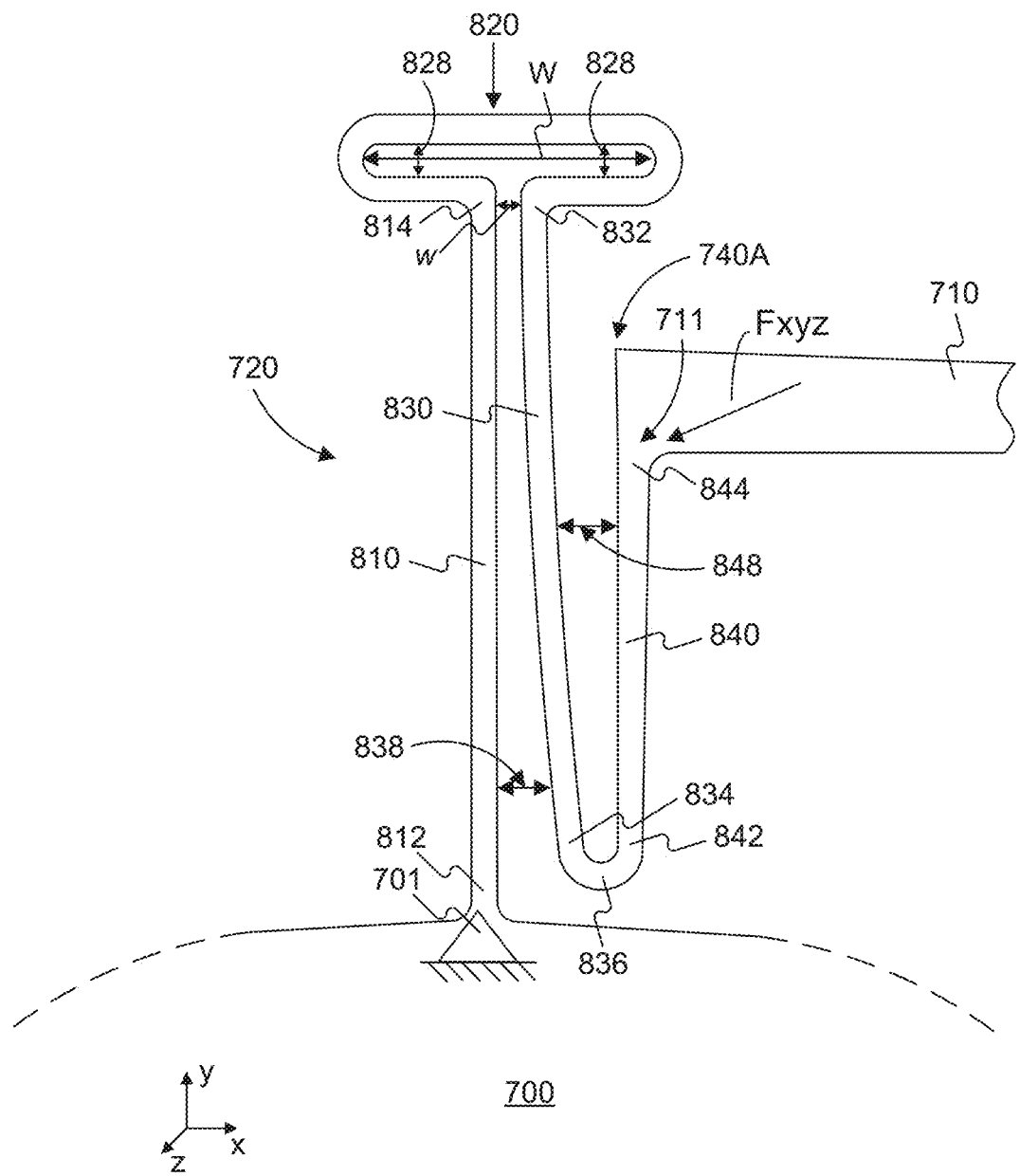
FIG. 13A illustrates a top view of an exemplary coupling member of the current disclosure.
Figure 13B:
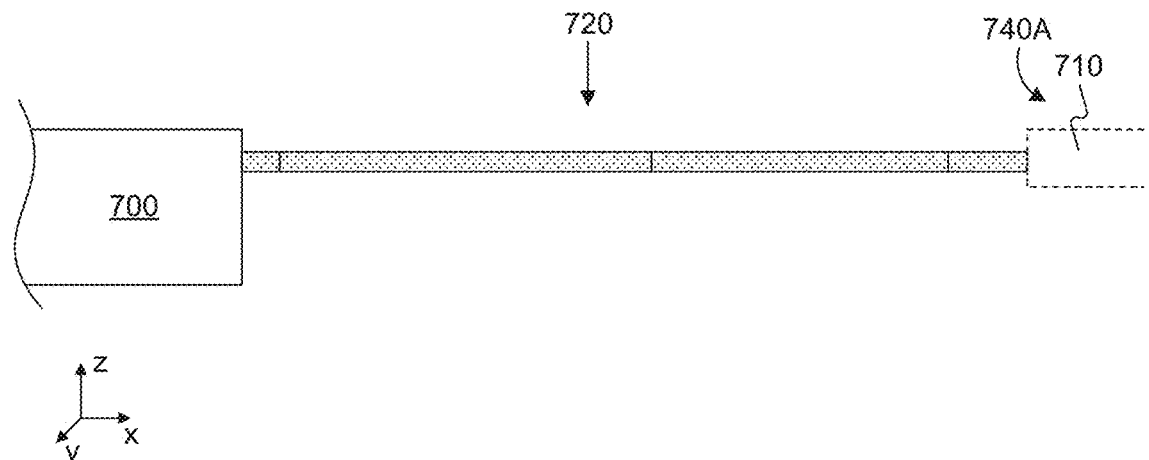
FIG. 13B illustrates a side view of the coupling member of FIG. 13A in its undeflected state.
Figure 13C:
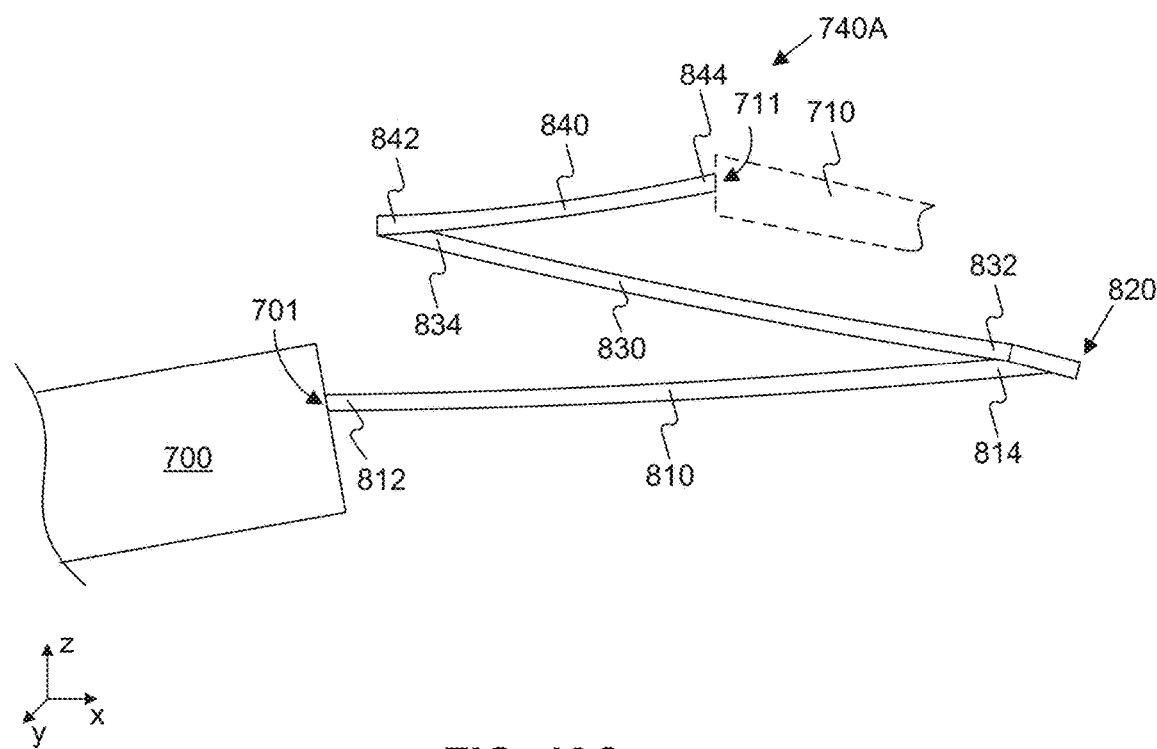
FIG. 13C illustrates a side view of the coupling member of FIG. 13A in its deflected state.

FIGS. 13A-13C are diagrammatic representations an exemplary coupling member 720 that may address one or more of the challenges described above. For example, coupling member 720 may reduce scan pattern distortion, increase linearity, and/or increase force transmission efficiency in a scanning mirror system. As previously explained with reference to FIG. 9A, coupling members 720 connect the coupler ends 740A of one or more actuator arms 710 to a scanning mirror 700. In the discussion below, only a single coupling member 720 that connects one exemplary actuator arm 710 to the mirror 700 will be described. Although not a requirement, all coupling members 720 of the deflector unit may have a similar configuration. FIG. 13A shows a top view of a coupling member 720 in the XY-plane and FIGS. 13B and 13C show a side view of the coupling member 720 in the XZ-plane. FIG. 13B shows the undeformed state of the coupling member 720, for example, when mirror 700 is in its neutral state in the XY plane. FIG. 13C shows an exemplary deformed state of the coupling member 720, for example, as a result of a deflection of the actuator arm 710 in the Z-direction that causes the mirror 700 to tilt about the Y axis.

As shown in FIGS. 13A-13C, coupling member 720 may connect to actuator arm 710 at a location 711 (e.g., point, region, area, etc.), and may connect to mirror 700 at a point 701. In some embodiments, location 711 may be a portion of an edge of the actuator arm 710 at its coupler end 740A. When the actuator arm 710 bends (as illustrated in FIG. 13C), its coupler end 740A deflects in the Z-direction resulting in a force $F_{xyz}$ on point 711. The coupling member 720 transmits the force to the mirror 700 and causes the mirror 700 to tilt about the Y axis (as illustrated in FIG. 13C). In general, the force induced on coupling member 720 (as a result of the movement of the actuator arm 710) causes movement in the mirror 700 corresponding to the applied force (e.g., cause the mirror 700 to tilt about an axis in the XY plane). The configuration of coupling member 720 determines not only how forces applied at point 711 of actuator arm 710 are translated to the mirror 700 via the coupling member 720, but may also affect various other performance characteristics of the scanning mirror system.

In some embodiments, the coupling member includes a first portion, a second portion, and a third portion, wherein the first portion includes a first end coupled to the mirror and a second end extending away from the mirror, the second portion includes a third end coupled to the second end of the first portion and a fourth end extending towards the mirror, and the third portion includes a fifth end coupled to the fourth end of the second portion and a sixth end coupled to the coupler end of the at least one actuator arm. The at least one actuator arm may include two or more actuator arms coupled to the mirror by the coupling member For example, in the embodiment of coupling member 720 illustrated in FIGS. 13A-13C, coupling member 720 includes a first portion 810, a head portion 820, a second portion 830, and a third portion 840. One end (first end 812) of the first portion 810 is attached to the mirror 700 at point 701. The opposite end (second end 814) extends away from the mirror 700. One end (third end 832) of the second portion 830 is coupled to the second end 814 of the first portion 810, for example, via head portion 820. The opposite end (fourth end 832) of the second portion 830 extends towards the mirror 700. One end (fifth end 842) of the third portion 840 is coupled to the fourth end 834 of the second portion 830, for example, via a bent section 836. The opposite end (sixth end 844) of the third portion 840 is connected to point 711 on the coupler end 740A of the actuator arm 710.

In some embodiments, the sixth end of the coupling member is coupled to the coupler end of the at least one actuator arm on at least a portion of an edge of the at least one actuator arm. For example, the sixth end 844 of coupling member 720 may be coupled to the coupler end 740A of actuator arm 710 on at least a portion of the edge of actuator arm 710. In some embodiments, as seen in, for example, FIG. 13A, the second portion 830 of coupling member 720 may be angled with respect to at least one of the first portion 810 and the third portion 840. It should be noted that all the above-described portions of the coupling member 720 are not required. In some embodiments, the coupling member 710 that connects the actuator arm 710 to the mirror 700 may include more or fewer portions.

With reference to FIGS. 13B and 13C, the force (e.g., Fxyz) applied at point 711 of actuator arm 710 during its actuated state may result in displacement and/or bending of the different portions of coupling member 720. For example, an upward force (in the +Z-direction) at point 711 (e.g., applied by bending actuator arm 710) may result in upward displacement and/or bending of the first, second, and third portions 810, 830, 840 of coupling member 720. In the illustrated embodiment, third portion 840 is joined to the second portion 830 by a junction or bent section 836. Similarly, second portion 830 is joined to first portion 810 via head portion 820. In some embodiments, bent section 836 may be a U-shaped portion of the coupling member 720. Bent section 836 and the head portion 820 enable the transmission of force (e.g., $F_{xyz}$) from point 701 through first, second, and third portions 810, 830, and 840 of coupling member 720 to cause a desired displacement/motion of mirror 700. In addition to the displacements and bending of the first, second, and third portions 810, 830, 840 shown in FIG. 13C in the actuated state, a force applied at point 701 may also result in displacements in the XY-plane. Such displacements may include, for example, relative displacement between second and third portions 830, 840 as indicated by arrows 848 (in FIG. 13C); between first and second portions 810, 830 as indicated by arrows 838; and/or within elements of head portion 820 as indicated by arrows 828.

Coupling member 720 has several features that taken alone or in combination may reduce scan pattern distortion, increase linearity, and/or increase force transmission efficiency in a scanning mirror system. For example, in the illustrated embodiment of FIGS. 13A-13C, the first, second, and third portions 810, 830, 840 are disposed in a common plane (XY plane) are each oriented generally in a radial direction relative to mirror 700. Any or all of first, second, and third portions 810, 830, 840 may be straight (linear) sections or elements or may include one or more bends or curved sections. As illustrated in FIG. 13A, in the undeflected state, the first and third portions 810, 840 are generally straight segments, while the second portion 830 is inclined (or curved) between the first and third portions 810, 840. The first and third portions 810, 840 may be substantially parallel and the second portion 820 may be inclined with respect to the first and third portions 810, 840. Specifically, the distance between the second end 814 (of the first portion 810) and the third end 832 (of the second portion 830) is less than the distance between the first end 812 (of the first portion 810) and the fourth end 834 (of the second portion 830). That is, second portion 830 is inclined with respect to the first portion 810. Similarly, the fifth end 842 of the third portion 840 is positioned closer to the second portion 830 than its sixth end 844. That is, the second portion 830 is inclined with respect to the second portion 830.

As explained previously, in the undeflected state, the first, second, third, and head portions 810, 830, 840, 820 of coupling member 720 are disposed (or folded) in a first plane (e.g., the same XY plane). In some embodiments, a bending of the at least one actuator arm is configured to tilt the mirror about an axis disposed on the first plane. In the deflected state (when actuator arm 710 bends), the first, second, and third portions 810, 830, 840 unfold to cause (some or all of) the first, second, and third portions 810, 830, 840 to deflect in the XZ plane. See FIG. 13C. In some embodiments, a bending of the at least one actuator arm is configured to cause at least one of the first, second, or third portions of the coupling member to be inclined with respect to the first plane. For example, when actuator arm 710 bends (e.g., in the XZ plane), the first, second, and third portions 810, 830, 840 of coupling member 720 deflects in the XZ plane, and the mirror 700 tilts about an axis disposed on the XY plane (Y axis in FIG. 13C). In the deflected state, the first, second, and third portions 810, 830, 840 of the coupling member 720 are inclined with respect to each other in the XZ plane. In some embodiments, the bending of the at least one actuator arm is configured to cause the second portion to be inclined with respect to the first and third portions. For example, as can be seen in FIG. 13C, when actuator arm 710 bends, the second portion 830 may be inclined with respect to the first and third portions 810, 840. The flexibility between the first, second, and third portions 810, 830, 840 in the XY plane (e.g., as represented by any of arrows 828, 838, 848 in FIG. 13A) enables the coupling member 720 to absorb the pulling forces exerted in the coupling member 720 when the actuator arm 710 bends. As a result of this flexibility in the XY plane, the amount of pulling force transmitted to the mirror 100 may be reduced In some embodiments, the coupling member further includes a head portion that connects the second end of the first portion to the third end of the second portion. In other words, the head portion includes one end connected to the second end of the first portion and another end connected to the third end of the second portion. For example, head portion 820 connects the first portion 810 and the second portion 830 of the coupling member 720 together. Specifically, the second end 814 of the first portion 810 and the third end 832 of the second portion 830 are connected to the head portion 820 such that a neck region is formed between the second end 814 and the third end 832. In some embodiments, the head portion may have one of an oblong shape, a rectangular shape, an elliptical shape, a circular shape, or another suitable shape. In the example shown in FIG. 13A, head portion 820 has a generally oblong shape. In some embodiments, a width of the head portion is greater than a distance between the second end and the third end. For example, a width W of head portion 820 is greater than a width w of the neck region formed between the second and third ends 814, 832 of the first and second portions 810, 830, respectively. The oblong-shaped head portion 820 is formed by parallelly arranged linear segments connected together by curved segments to define the shape of the head portion 820. Head portion 820 is not limited to an oblong shape. In general, head portion 820 may have any shape so long as the width W of the head portion 820 is greater than the width w of the neck region. FIGS. 14A-14C show some additional exemplary examples of head portion configurations. For example, as shown in FIG. 14A, head portion 820 may have a rectangular shape made of linear segments that are connected together. In some embodiments, as shown in FIG. 14B, head portion 820 may have an elliptical shape. In some embodiments, head portion 820 may have a circular shape as shown in FIG. 14C. The shape of the head portion 820 is not limited to these shapes. Instead, head portion 820 may have any shape where the width W of the head portion 820 is greater than the width w of the neck region.

In general, coupling member 720 may be made of any suitable material. In some embodiments, coupling member 720 may include at least one of silicon, polysilicon, a silicon stack, or silicon dioxide and a polysilicon stack. In some embodiments, the at least one actuator arm and the mirror are made of a same material. For example, the actuator arms 710, the mirror 700, and the coupling members 720 may be made of a semiconductor material (such as, for example, silicon). In some embodiments, the actuator arms 710, coupling member 720, and the mirror 700 may be fabricated on a silicon wafer using, for example, conventional IC fabrication techniques.

The disclosed features of coupling member 720, taken alone or in combination, may reduce scan pattern distortion, increase linearity, and/or increase force transmission efficiency in a scanning mirror system. For example, the three radial member configuration (i.e., the first, second, and third portions 810, 830, 840) and the head portion 820 may provide flexibility in the X-direction that may reduce an amount of clockwise rotation imparted to the mirror 700 by a "pulling" force associated with bending of actuator arm 710. For example, flexibility in the XY plane between the first, second, and third portions 810, 830, 840 of coupling member 720 (e.g., as represented by any of arrows 828, 838, 848 in FIG. 13A) may enable coupling member 720 to absorb the pulling force induced thereupon due to the bending of the actuator arm 710. As a result of the flexibility resulting from its configuration, coupling member 720 may deform in the XY plane, and reduce the amount of pulling force transmitted to the mirror 700. Reducing the transmission of the pulling force reduces the clockwise rotation imparted to the mirror 700 as a result of the bending of the actuator arm 710. Reducing the clockwise rotation imparted to the mirror may in turn reduce distortion in scan patterns.

Additionally, the three radial member configuration and the head portion 820 of the disclosed coupling members 720 may increase the force transfer efficiency between the actuator arms 710 and the scanning mirror 700 and may also reduce resonant oscillations in favor of linear scan motion. Such reduction in resonant oscillations may derive, at least partially, from the configuration of the first, second, and third portions 810, 830, 840, which results in the actuated and non-actuated states conceptually represented in FIGS. 17B and 17C.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A deflector unit for a light scanning system, comprising:
   a mirror;
   at least one actuator arm including an anchor end and a coupler end; and
   a coupling member coupling the at least one actuator arm to the mirror, wherein the coupling member includes a first portion, a second portion, and a third portion, wherein
   (a) the first portion includes a first end coupled to the mirror and a second end extending away from the mirror,
   (b) the second portion includes a third end coupled to the second end of the first portion and a fourth end extending towards the mirror, and
   (c) the third portion includes a fifth end coupled to the fourth end of the second portion and a sixth end coupled to the coupler end of the at least one actuator arm, and
   the coupling member further includes a head portion that connects the second end of the first portion to the third end of the second portion.

2. The deflector unit of claim 1, wherein a width of the head portion is greater than a distance between the second end and the third end.

3. The deflector unit of claim 1, wherein the head portion has an oblong shape.

4. The deflector unit of claim 1, wherein the head portion has a rectangular shape.

5. The deflector unit of claim 1, wherein the head portion has an elliptical shape.

6. The deflector unit of claim 1, wherein the head portion has a circular shape.

7. The deflector unit of claim 1, wherein the at least one actuator arm includes a piezoelectric material configured to cause the at least one actuator arm to bend in response to a voltage applied to the piezoelectric material.

8. The deflector unit of claim 1, wherein the first, second, and third portions of the coupling member are disposed on a first plane.

9. A deflector unit for a light scanning system, comprising:
   a mirror;
   at least one actuator arm including an anchor end and a coupler end; and
   a coupling member coupling the at least one actuator arm to the mirror, wherein the coupling member includes a first portion, a second portion, and a third portion, wherein
   (a) the first portion includes a first end coupled to the mirror and a second end extending away from the mirror,
   (b) the second portion includes a third end coupled to the second end of the first portion and a fourth end extending towards the mirror, and
   (c) the third portion includes a fifth end coupled to the fourth end of the second portion and a sixth end coupled to the coupler end of the at least one actuator arm, and
   wherein the first, second, and third portions of the coupling member are disposed on a first plane, and wherein a bending of the at least one actuator arm is configured to cause at least one of the first, second, or third portions of the coupling member to be inclined with respect to the first plane.

10. The deflector unit of claim 9, wherein the bending of the at least one actuator arm is configured to cause the second portion to be inclined with respect to the first and third portions.

11. The deflector unit of claim 8, wherein a bending of the at least one actuator arm is configured to tilt the mirror about an axis disposed on the first plane.

12. The deflector unit of claim 1, wherein the at least one actuator arm includes two or more actuator arms coupled to the mirror by the coupling member.

13. The deflector unit of claim 1, wherein a material of the coupling member includes at least one of silicon, polysilicon, a silicon stack, or silicon dioxide and a polysilicon stack.

14. The deflector unit of claim 1, wherein the second portion of the coupling member is angled with respect to at least one of the first portion and the third portion.

15. The deflector unit of claim 1, wherein the sixth end of the coupling member is coupled to the coupler end of the at least one actuator arm on at least a portion of an edge of the at least one actuator arm.

16. A deflector unit for a light scanning system, comprising:
   a mirror; and
   at least one actuator arm including an anchor end and a coupler end; and
   a coupling member coupling the at least one actuator arm to the mirror, wherein the coupling member includes a first portion, a second portion, a head portion, and a third portion, the second portion being angled with respect to at least one of the first portion and the third portion, and wherein
   (a) the first portion includes a first end coupled to the mirror and a second end extending away from the mirror,
   (b) the second portion includes a third end positioned proximate the second end of the first portion and a fourth end extending towards the mirror,
   (c) the head portion includes one end connected to the second end of the first portion and another end connected to the third end of the second portion, and
   (d) the third portion includes a fifth end coupled to the fourth end of the second portion and a sixth end coupled to the coupler end of the at least one actuator arm.

17. The deflector unit of claim 16, wherein a width of the head portion is greater than a distance between the second end and the third end.

18. The deflector unit of claim 16, wherein the head portion has one of an oblong shape, a rectangular shape, an elliptical shape, or a circular shape.

19. The deflector unit of claim 16, wherein the first portion, the head portion, the second portion and the third portion of the coupling member are disposed on a first plane.

20. The deflector unit of claim 19, wherein a bending of the at least one actuator arm is configured to cause at least one of the first, second, or third portions of the coupling member to be inclined with respect to the first plane.

21. The deflector unit of claim 16, wherein the at least one actuator arm includes a piezoelectric material configured to cause the at least one actuator arm to bend in response to a voltage applied to the piezoelectric material.

* * * * *